(12) United States Patent
Nishino et al.

(10) Patent No.: US 8,992,878 B2
(45) Date of Patent: Mar. 31, 2015

(54) COMPOSITION CONTAINING CARBON NANOTUBES, CATALYST FOR PRODUCING CARBON NANOTUBES, AND AQUEOUS DISPERSION OF CARBON NANOTUBES

(75) Inventors: Hidekazu Nishino, Nagoya (JP); Hajime Kato, Nagoya (JP); Naoyo Okamoto, Nagoya (JP); Shuko Ikeuchi, Nagoya (JP); Kenichi Sato, Nagoya (JP); Shiho Tanaka, Nagoya (JP); Kazuyoshi Higuchi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 7 days.

(21) Appl. No.: 13/138,553

(22) PCT Filed: Mar. 4, 2010

(86) PCT No.: PCT/JP2010/053500
§ 371 (c)(1),
(2), (4) Date: Nov. 21, 2011

(87) PCT Pub. No.: WO2010/101205
PCT Pub. Date: Sep. 10, 2010

(65) Prior Publication Data
US 2012/0058889 A1    Mar. 8, 2012

(30) Foreign Application Priority Data

Mar. 4, 2009 (JP) ................................. 2009-050166
Mar. 31, 2009 (JP) ................................. 2009-088442
Dec. 25, 2009 (JP) ................................. 2009-294873

(51) Int. Cl.
*C01B 31/04* (2006.01)
*B01J 21/10* (2006.01)
(Continued)

(52) U.S. Cl.
CPC  *B01J 21/10* (2013.01); *B01J 23/40* (2013.01); *B01J 23/74* (2013.01); *B01J 23/745* (2013.01);
(Continued)

(58) Field of Classification Search
USPC ......... 423/447.1, 447.3, 445 B; 977/742, 752
See application file for complete search history.

(56) References Cited

U.S. PATENT DOCUMENTS 8,038,908 B2 * 10/2011 Hirai et al. .................... 252/502
2009/0001326 A1    1/2009 Sato et al. .................... 252/511
(Continued)

FOREIGN PATENT DOCUMENTS

JP    2004-002156 A    1/2004
JP    2004-182548 A    7/2004
(Continued)

OTHER PUBLICATIONS

Thermoscientific. "Chacterizing Graphene with Ramen Spectroscopy". https://fscimage.thermoscientific.com/images/D19505~.pdf © 2010.*

*Primary Examiner* — Richard M Rump
(74) *Attorney, Agent, or Firm* — Kubovcik & Kubovcik

(57) ABSTRACT

Disclosed is a composition containing carbon nanotubes which meets all of the following conditions (1) to (4). (1) When observed via transmission electron microscopy, at least 50 out of every 100 carbon nanotubes are double-walled carbon nanotubes. (2) The carbon nanotubes have an average outer diameter in the range of 1.0 to 3.0 nm. (3) During thermogravimetric analysis under atmosphere at a temperature increase rate of 10° C./minute, a high temperature combustion peak is at 700 to 850° C., and the relationship between low temperature weight loss (TG(L)) and high temperature weight loss (TG(H)) is TG(H)/(TG(L)+TG(H))≥0.75. (4) The composition containing carbon nanotubes has a volume resistance value between $1.0 \times 10^{-2}$ Ω·cm and $1.0 \times 10^{-4}$ Ω·cm, inclusive. The disclosed composition containing carbon nanotubes primarily has double-walled carbon nanotubes with high electrical conductivity and high heat resistance.

2 Claims, 7 Drawing Sheets

(51) Int. Cl.
*B01J 23/40* (2006.01)
*B01J 23/74* (2006.01)
*B01J 23/745* (2006.01)
*B01J 23/78* (2006.01)
*B01J 37/02* (2006.01)
*B01J 37/10* (2006.01)
*B82Y 30/00* (2011.01)
*B82Y 40/00* (2011.01)
*C01B 31/02* (2006.01)
*B01J 35/02* (2006.01)

(52) U.S. Cl.
CPC .............. *B01J 23/78* (2013.01); *B01J 37/0201* (2013.01); *B01J 37/0203* (2013.01); *B01J 37/10* (2013.01); *B82Y 30/00* (2013.01); *B82Y 40/00* (2013.01); *C01B 31/0233* (2013.01); *C01B 31/0253* (2013.01); *C01B 31/0273* (2013.01); *B01J 35/02* (2013.01); *C01B 2202/22* (2013.01); *C01B 2202/34* (2013.01); *C01B 2202/36* (2013.01); *Y10S 977/742* (2013.01); *Y10S 977/752* (2013.01)
USPC .................. 423/447.1; 977/742; 977/752

(56) References Cited

U.S. PATENT DOCUMENTS

| | | | |
|---|---|---|---|
| 2009/0022652 A1 | 1/2009 | Sato et al. | 423/447.2 |
| 2010/0254886 A1 | 10/2010 | McElrath et al. | 423/447.2 |

FOREIGN PATENT DOCUMENTS

| | | |
|---|---|---|
| JP | 2006-261131 A | 9/2006 |
| JP | 2006-335604 A | 12/2006 |
| JP | 2009-029695 A | 2/2009 |
| WO | 2008/102746 A1 | 8/2008 |
| WO | 2009/069344 A1 | 6/2009 |
| WO | WO 2009069344 A1 * | 6/2009 |
| WO | 2009/157529 A1 | 12/2009 |

* cited by examiner

COMPOSITION CONTAINING CARBON NANOTUBES, CATALYST FOR PRODUCING CARBON NANOTUBES, AND AQUEOUS DISPERSION OF CARBON NANOTUBES

This application is a 371 of international application PCT/JP2010/053500, filed Mar. 4, 2010, which claims priority based on Japanese patent application Nos. 2009-050166, 2009-088442, and 2009-294873 filed Mar. 4, 2009, Mar. 31, 2009, and Dec. 25, 2009, respectively, and which are incorporated herein by reference.

TECHNICAL FIELD

The present invention relates to a composition containing carbon nanotubes and a process for producing the same. Also, the present invention relates to a catalyst for producing carbon nanotubes and a process for producing the same. Also, the present invention relates to an aqueous dispersion of carbon nanotubes and a process for producing the same.

BACKGROUND ART

A carbon nanotube is a substance whose various industrial applications are expected by a variety of properties due to its ideal one dimensional structure, for example, good electrical conductivity, heat conductivity and a mechanical strength. Improvement in performance and widening of applicability are expected, by controlling a diameter, the layer number and a length of the carbon nanotube.

The carbon nanotube usually has the high graphite structure when the layer number is smaller. It is known that since a single-walled carbon nanotube and a double-walled carbon nanotube have the high graphite structure, they have high properties such as electrical conductivity and heat conductivity. In addition, among carbon nanotubes, since double-walled to quintuple-walled carbon nanotubes having the relatively small layer number have properties of both of a single-walled carbon nanotube and a multi-walled carbon nanotube, they attract an attention as a promising material in a variety of utilities.

As the known process for producing a carbon nanotube, synthesis by a laser ablation method or a chemical vapor deposition method (CVD method) is known. In a method of synthesizing carbon nanotubes by a catalyst chemical vapor deposition method (CCVD method), a catalyst body in which a catalyst metal is supported on a support is used. There are a variety of shapes of the catalyst body such as a powder shape, a gel shape and a plate shape. In respect of a yield of the resulting carbon nanotube relative to an amount of a catalyst to be used, it is good to use a powder-like or aerosol-like support having a great specific surface area and, in respect of easy handling, it is preferred that a plate-like or powder-like support is used. When balance between both of a yield and easy handling is taken into consideration, use of a powder-like support is preferred. In addition, as a material of a support, organic substances and inorganic substances are used, but from respect of easy handling and general versatility, inorganic substances are used in many cases. As an inorganic support, supports having a variety of compositions such as oxide, hydroxide, other metal salt etc. are used.

As a support, from respect of easy removal after synthesis, powder-like magnesium salt and magnesium oxide which can be easily removed only by acid treatment are used in many cases. As an example using magnesium oxide, Patent Documents 1 to 3 are exemplified, but when the method described in Patent Document 1 was merely used, a composition containing carbon nanotubes having a high purity was not obtained. In addition, in the method shown in Patent Document 2, it is necessary to separately produce a catalyst which makes a carbon source to be easily degraded, in addition to a catalyst for synthesizing carbon nanotubes, and the number of steps is increased. In a method of heating a precursor of magnesium oxide to convert it into magnesium oxide (Patent Document 3), it was necessary to make a device, such as rapid heating of an aqueous solution at 650° C. at production of a catalyst body, addition of a foaming agent such as citric acid etc. and combustion in order to increase a surface area of a catalyst body. In addition, since the catalyst body obtained herein is very easily reactive with water and carbon dioxide in the air, and has a very small bulk density, there was a problem on handling, such as easy flying etc.

In addition, in the case of a catalyst obtained by simply mixing and heating a magnesium salt and a catalyst metal salt, without the aforementioned device, it is difficult to obtain a carbon nanotube having a high purity at a good yield.

The carbon nanotube is a material having high electrical conductivity, and can be expected as a transparent electrically conductive material. Upon actual use, in order to attain high electrical conductivity with a smaller amount, it is necessary that the carbon nanotube is uniformly dispersed in a matrix. The dispersing method can be roughly classified into two methods of a method of dispersing by modifying the carbon nanotube itself, and a method of dispersing the carbon nanotube using a dispersant such as a surfactant and a polymer, and since uniform high dispersion is possible while electrical conductivity is maintained, the method using a dispersant is preferably used (Patent Documents 4, 5).

A diameter (outer diameter) of the carbon nanotube is from a few nm to a few hundreds nm and, inter alia, when a carbon nanotube having a small average outer diameter is used, since an electrically conductive network can be formed effectively with a small amount, an electrically conductive composite having high transparency can be obtained. However, a carbon nanotube having a small average outer diameter has a problem that, generally, in purification and dispersing steps, a defect is easily generated on a graphite surface, and electrical conductivity is reduced. In addition, since the carbon nanotube having a small average outer diameter has a strong aggregating force, and is dispersed with difficulty, in order to obtain sufficient dispersibility, an excessive amount of a dispersant is necessary, and a long dispersing time and a strong dispersing force become necessary and, therefore, it was difficult to simply obtain a dispersion having high transparent electrical conductivity.

PRIOR ART DOCUMENTS

Patent Document

Patent Document 1: JP-A No. 2004-182548
Patent Document 2: JP-A No. 2006-335604
Patent Document 3: JP-A No. 2006-261131
Patent Document 4: JP-A No. 2004-2156
Patent Document 5: WO2008/102746

SUMMARY OF THE INVENTION

Problems to be Solved by the Invention

An object of the present invention is to provide a composition containing carbon nanotubes including double-walled carbon nanotubes and a process for producing the same. Also, another object of the present invention is to provide a catalyst body which can produce a composition containing carbon nanotubes having good quality at a good yield and a process for producing the same. In addition, another object of the present invention is to provide an aqueous dispersion exerting high transparent electrical conductivity without remarkably deteriorating electrically conductive property originally possessed by carbon nanotubes and a process for producing the same.

Solutions to the Problems

In order to solve the aforementioned problems, the present inventors intensively studied and, as a result, found out that when a high temperature combustion peak of a composition containing carbon nanotubes is at 700 to 850° C. by thermogravimetric analysis, and an oxidation reaction is performed until the relationship between low temperature weight loss (TG(L)) and high temperature weight loss (TG(H)) becomes TG(H)/(TG(L)+TG(H))≥0.75, a composition containing carbon nanotubes comprising mainly double-walled carbon nanotubes having high electrical conductivity and high heat resistance can be obtained. In addition, it was found out that in a catalyst body obtained by heating a catalyst precursor obtained by heating water containing a relatively small amount of a Group 8 to Group 10 transition metal compound and a Mg compound under a pressure, fine particles containing a Group 8 to Group 10 transition metal are highly dispersed in magnesium oxide (MgO) flakes, and sites for generating carbon nanotubes are increased and, by using this as a catalyst, carbon nanotubes of a high purity and high quality, and having a relatively small diameter can be produced at a good yield. Further, by variously studying a dispersing procedure, it was found that, by dispersing carbon nanotubes having an average outer diameter of 3 nm or less in an aqueous solvent using a dispersant so that an average particle diameter becomes 200 nm or more and 1500 nm or less, excellent transparent electrical conductivity can be exerted. That is, the present invention consists of the following construction.

The present invention is a composition containing carbon nanotubes which meets all of the following conditions (1) to (4);
(1) When observed via transmission electron microscopy, 50 or more of 100 carbon nanotubes are double-walled carbon nanotubes;
(2) The carbon nanotubes have an average outer diameter in the range of 1.0 to 3.0 nm;
(3) By thermogravimetric analysis under atmosphere at a temperature increase rate of 10° C./minute, a high temperature combustion peak is at 700 to 850° C., and the relationship between low temperature weight loss (TG(L)) and high temperature weight loss (TG(H)) is TG(H)/(TG(L)+TG(H)) ≥0.75;
(4) The composition containing carbon nanotubes has a volume resistance value of $1.0 \times 10^{-2}$ Ω·cm or less and $1.0 \times 10^{-4}$ Ω·cm or more.

Also, the present invention is a process for producing a composition containing carbon nanotubes, comprising performing an oxidation reaction of the composition containing carbon nanotubes which have a high temperature combustion peak of 700 to 850° C. before the oxidation reaction, by thermogravimetric analysis under atmosphere at a temperature increase rate of 10° C./minute, wherein the oxidation reaction is performed until the relationship between low temperature weight loss (TG(L)) and high temperature weight loss (TG(H)) becomes TG(H)/(TG(L)+TG(H))≥0.75.

Also, the present invention is a process for producing a composition containing carbon nanotubes comprising contacting a catalyst body for producing carbon nanotubes and a carbon-containing compound under heating, wherein the following conditions 1 to 3 are met:
(1) A contact time (W/F) obtained by dividing a weight of a catalyst body for producing carbon nanotubes by a flow rate of a carbon-containing compound is in the range of 100 to 400 min·g/L;
(2) A linear velocity of a gas comprising a carbon-containing compound is in the range of 2 to 8 cm/sec;
(3) A particle diameter of an aggregate of a catalyst body for producing carbon nanotubes is in the range of 0.2 to 2 mm, and a bulk density of the catalyst body is in the range of 0.1 to 1 g/mL.

Also, the present invention is a catalyst body for producing carbon nanotubes comprising a fine particle comprising a Group 8 to Group 10 transition metal and magnesium oxide flakes, wherein the fine particle comprising a transition metal has an average particle diameter of 1 nm to 30 nm, and a content of the transition metal is 0.1 to 1 wt % relative to the catalyst body.

Also, the present invention is a process for producing a catalyst body for producing carbon nanotubes, comprising heating a Group 8 to Group 10 transition metal compound and a Mg compound to 100 to 250° C. under a pressure in water to obtain a catalyst precursor and, thereafter, heating the catalyst precursor to 400 to 1200° C., to obtain MgO flakes containing the Group 8 to Group 10 transition metal in the range of 0.1 to 1 wt %.

Also, the present invention is an aqueous dispersion of carbon nanotubes, comprising carbon nanotubes having an average outer diameter of 3 nm or less and a dispersant, wherein an average particle diameter of the carbon nanotubes as measured by a dynamic light scattering method is 200 nm or more and 1500 nm or less.

Advantages of the Invention

According to the present invention, it has become possible to obtain a composition containing carbon nanotubes comprising mainly double-walled carbon nanotubes having high electrical conductivity and high heat resistance. Also, according to the present invention, it becomes possible to obtain a carbon nanotube having a high purity and high quality at a good yield. Also, according to the present invention, an aqueous dispersion of carbon nanotubes excellent in transparent electrical conductivity is obtained.

EMBODIMENTS OF THE INVENTION

Figure 1:
FIG. 1 shows a photograph of a composition containing carbon nanotubes of Example 4, observed via transmission electron microscopy.

One of preferable aspects of the present invention is a composition containing carbon nanotubes which meets all of the following conditions 1 to 4, (1) When observed via transmission electron microscopy, 50 or more of 100 carbon nanotubes are double-walled carbon nanotubes;

(2) The carbon nanotubes have an average outer diameter in the range of 1.0 to 3.0 nm;

(3) By thermogravimetric analysis under atmosphere at a temperature increase rate of 10° C./minute, a high temperature combustion peak is at 700 to 850° C., and the relationship between low temperature weight loss (TG(L)) and high temperature weigh loss (TG(H)) is TG(H)/(TG(L)+TG(H)) ≥0.75;

(4) The composition containing carbon nanotubes has a volume resistance value of $1.0 \times 10^{-2}$ Ω·cm or less and $1.0 \times 10^{-4}$ Ω·cm or more.

The composition containing carbon nanotubes in the present invention means an integral in which a plurality of carbon nanotubes are present. The existence form of carbon nanotubes in the composition is not particularly limited, but each may be independently present, or carbon nanotubes may be present in a bundle-like form, a form of entanglement, or a mixed form of them. Alternatively, carbon nanotubes having a variety of layer numbers or diameters may be contained. In addition, the composition containing carbon nanotubes may contain impurities derived from production of carbon nanotubes, for example, a catalyst and amorphous carbon. In addition, the composition containing carbon nanotubes may be dispersed in a dispersing medium or may be complexed with other components.

The carbon nanotube has an shape obtained by winding one plane of graphite into a tube, the carbon nanotube which is wound into one layer is referred to as a single-walled carbon nanotube, and the carbon nanotube which is wound into a multilayer is referred to as multi-walled carbon nanotube and, among them, particularly, the carbon nanotube which is wound into a dilayer referred to as double-walled carbon nanotube.

Any carbon nanotube of singe-walled, double-walled or triple or more-walled may be used, but usually, there is a tendency that as the layer number of the carbon nanotubes is smaller, a graphitization degree is higher, and as the layer number is increased, a graphitization degree is reduced. As a graphitization degree is higher, electrical conductivity becomes higher. The carbon nanotube which is from single-walled to quintuple-walled has high electrical conductivity, and is excellent in transparency, being preferable. Among them, a single-walled carbon nanotube and a double-walled carbon nanotube have a higher graphitization degree as compared with a triple or more-walled carbon nanotube. In addition, since a double-walled carbon nanotube has the larger layer number than that of a single-walled carbon nanotube, it has high durability. In a double-walled carbon nanotube, even when a surface is functionalized by acid treatment, the original function such as electrical conductivity is not deteriorated. For this reason, in order to obtain a composition containing carbon nanotubes having high durability and high electrical conductivity, a ratio of a double-walled carbon nanotube to be contained is preferably greater.

In the composition containing carbon nanotubes, when observed via transmission electron microscopy, it is preferable that 50 or more of 100 carbon nanotubes are a double-walled carbon nanotube, 70 or more of 100 is more preferable, 75 or more of 100 is further preferable, 80 or more of 100 is most preferable.

The layer number of carbon nanotubes contained in the composition containing carbon nanotubes can be measured, for example, by making a sample as follows. When the composition containing carbon nanotubes is a dispersion, in the case of a solvent of water, the composition is appropriately diluted with water to such a concentration that the composition is well seen, a few μL is added dropwise on a collodion membrane, and air-dried and, thereafter, carbon nanotubes on the collodion membrane are directly examined via transmission electron microscopy. In the case where a solvent is non-aqueous, after the solvent is once removed by drying, the composition is dispersed again in water, this is appropriately diluted, a few μL is added dropwise on the collodion membrane, and air-dried and, thereafter, this is observed via transmission electron microscopy. When directly observed from a composite containing the composition containing carbon nanotubes, after the composite is embedded with an epoxy resin etc., a section cut thin to 0.1 μm or less using a razor etc. can be observed via transmission electron microscopy. Alternatively, carbon nanotubes are extracted with a solvent from the composite, and can be also observed via transmission electron microscopy like the case of a dispersion. A carbon nanotube concentration in a liquid to be added dropwise on the collodion membrane may be such a concentration that carbon nanotubes can be observed one by one, and the concentration is, for example, 0.01 mg/mL. Carbon nanotubes are observed via transmission electron microscopy at magnification of 400000, and the layer number is assessed regarding 100 carbon nanotubes arbitrarily extracted from the field where carbon nanotubes are present in 10% or more of a field area in a 75 nm square field. When 100 cannot be measured in one field, carbon nanotubes are measured from a plurality of fields until the number of carbon nanotubes becomes 100. At this time, one carbon nanotube is such that when a part of a carbon nanotube is seen in the field, this is counted as one, and it is not necessarily required that both ends are seen. In addition, even when the number is recognized to be two in the field, they may be one by connection outside the field and, in that case, the number is counted as two.

In addition, it is preferable that an average outer diameter of carbon nanotubes contained in the composition containing carbon nanotubes is 3.0 nm or less. Since carbon nanotubes having a great diameter are multi-walled, they have low electrical conductivity, and a low transmittance. Further, the carbon nanotubes are entangled to form an aggregate, and are bad in dispersibility and dispersion stability. More preferably, an average outer diameter is 2.5 nm or less, more preferably 2 nm or less. And, a lower limit is preferably 0.5 nm or more, more preferably 1.0 nm or more. A preferable range is such that an average outer diameter of carbon nanotubes is 1.0 to 3.0 nm. This average outer diameter is an arithmetic average value when samples are observed, and an outer diameter of carbon nanotubes is measured by the same method as the aforementioned method for observing carbon nanotubes via transmission electron microscopy at magnification of 400000, and assessing the layer number, regarding 100 carbon nanotubes arbitrarily extracted from the field where carbon nanotubes are present in 10% or more of a field area in a 75 nm square field.

An outer diameter of carbon nanotubes can be measured, for example, by making a sample like the aforementioned measurement of the layer number. Carbon nanotubes are observed by transmission electron microscopy at magnification of 400000, and an outer diameter is measured, and assessed, regarding 100 carbon nanotubes arbitrarily extracted from the field where carbon nanotubes are present in 10% or more of a field area in a 75 nm square field. When 100 cannot be measured in one field, carbon nanotubes are measured from a plurality of fields until the number of carbon nanotubes becomes 100. At that time, one carbon nanotube is such that when a part of a carbon nanotube is seen in the field, this is counted as one, and it is not necessarily required that both ends are seen. In addition, even when the number of carbon nanotubes is recognized to be two in the field, there may be one by connection outside the field and, in that case, the number is counted as two. By measuring an outer diameter regarding a total of 100 carbon nanotubes, an additive average outer diameter of carbon nanotubes contained in 100 can be confirmed. As a position at which an outer diameter of carbon nanotubes is measured, measurement is performed by selecting positions having linearity where carbon nanotubes are not curved.

An average length of carbon nanotubes is not particularly limited, but when the length is two small, since an electrically conductive path cannot be formed effectively, the average length is preferably 0.1 µm or more, further preferably 0.5 µm or more, more preferably 1 µm or more. Since there is a tendency that, when the length is too great, dispersibility is reduced, the average length is preferably 5 µm or less. For this reason, in order that high dispersibility and high electrical conductivity are possessed, it is preferable that the average length is 1 µm or more, and 5 µm or less.

A length of carbon nanotubes can be examined using field emission scanning electron microscopy or atomic force microscopy. When carbon nanotubes are in a form of a dispersion, after a few is added dropwise on a mica substrate, and air-dried, the length can be examined via field emission scanning electron microscopy. When carbon nanotubes are collected from an electrically conductive composite, carbon nanotubes are extracted using a solvent, and can be observed by the same method as that of a dispersion. Upon observation, a dispersant etc. are removed by using ion sputtering, or burning at 350° C. for 30 minutes under the atmospheric atmosphere, thereby, carbon nanotubes are exposed and, thereafter, can be observed.

Regarding a length of isolated and dispersed carbon nanotubes, a sample is made by the aforementioned method, observed via field emission scanning electron microscopy at magnification of 10000, and is photographed at a place where 10 or more carbon nanotubes are contained in a 8 µm square field, thereby, a length of each isolated and dispersed carbon nanotube is measured. When atomic force microscopy is used, carbon nanotubes are observed in a 15 µm square field, and a length of each carbon nanotube may be measured. Among them, in measurement via field emission scanning electron microscopy, upon observation of thin bundle-like carbon nanotubes, since a length of carbon nanotubes constituting a bundle is measured one by one with difficulty in some cases, measurement via atomic force microscopy (AFM) is desirable. A length of 100 carbon nanotubes arbitrarily extracted from the field is measured along a fiber. When 100 cannot be measured in one field, carbon nanotubes are measured from a plurality of fields until the number of carbon nanotubes becomes 100. By measuring a length regarding a total of 100 carbon nanotubes, a length and the number of carbon nanotubes included in 100 can be confirmed.

If 30 or less of 100 are carbon nanotubes having a length of 0.1 µm or less, a contact resistance can be reduced, and a light transmittance can be improved, and this is preferable, and it is more preferable that 30 or less of 100 are carbon nanotubes of 0.5 µm or less. It is further preferable that 30 or less of 100 are carbon nanotubes having a length of 1 µm or less. Further, when 30 or less of 100 are carbon nanotubes having a length of 5 µm or more, dispersibility can be improved, being preferable. When a length of carbon nanotubes is great, and a length of a whole is not seen in the field, a length of carbon nanotubes in the field is measured and, when it is within 5 µm, this is regarded as a length of a measurement value and, when it is greater than 5 µm, this is regarded as a length of more than 5 µm.

The composition containing carbon nanotubes is preferably such that a greatest peak of a DTA curve in differential thermal analysis at a temperature increase rate of 10° C./min is in the range of 500° C. to 850° C. Usually, since as a graphitization degree of carbon nanotubes is higher, or as an amount of carbon impurities is smaller, a combustion peak temperature appears on a higher temperature side, a higher combustion peak temperature is preferable in that the carbon nanotubes are carbon nanotubes having high electrical conductivity. A combustion peak temperature is more preferably 600° C. or higher, further preferably 700° C. or higher.

In a particularly preferable aspect of the present invention, the composition containing carbon nanotubes is preferably such that a high temperature combustion peak is at 700 to 850° C., and the relationship between low temperature weight loss (TG(L)) and high temperature weight loss (TG(H)) is TG(H)/(TG(L)+TG(H))≥0.75, by thermogravimetric analysis under atmosphere at a temperature increase rate of 10° C./minute.

Figure 5:
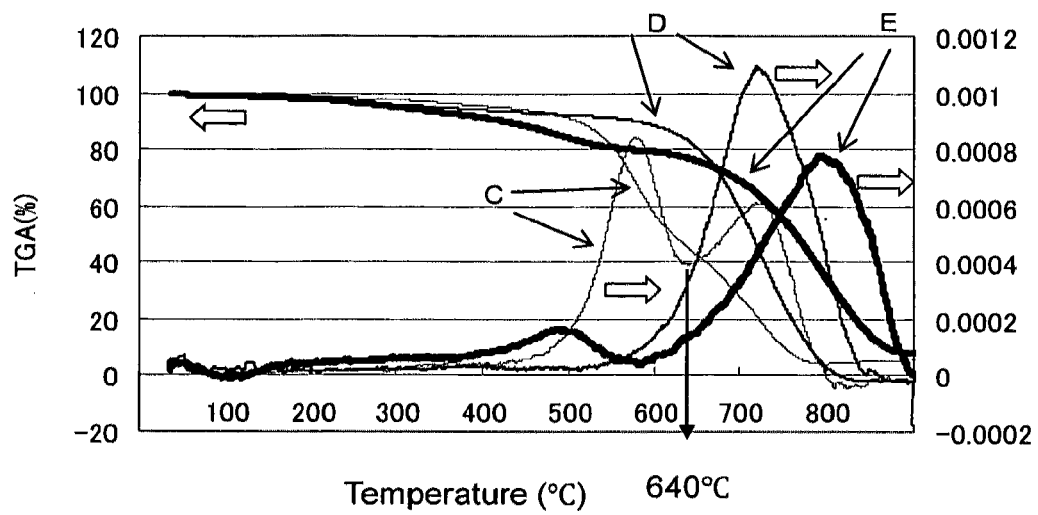
FIG. 5 shows the results of thermogravimetric analysis in Example 4 and Example 5.

Herein, in thermogravimetric analysis, about 1 mg of a sample is arranged in a thermogravimetric analysis apparatus (e.g. TGA-60 manufactured by Shimadzu Corporation), and a temperature is increased from room temperature to 900° C. at a temperature increasing rate of 10° C./min, and reduction in a weight of the sample is measured. And, by differentiating the resulting weight reduction curve with a time, a differential thermogravimetric curve (DTG) is obtained, and a peak temperature when an x-axis is let to be a temperature (° C.), and a y-axis is let to be DTG (mg/min) is defined as a combustion peak temperature. In the composition containing carbon nanotubes of the present invention, it is satisfactory that a peak temperature of this DTG curve, for example, a temperature at an apex of the DTG curve in FIG. 5 is in a range defined in the present invention.

Carbon nanotubes for measuring a combustion peak temperature, in the case of a powder, can be measured as they are. When carbon nanotubes are contained in a dispersion, the dispersion is filtered using a filter, this is washed using ion-exchanged water, an acid or an alkali to sufficiently remove a dispersant, and a sample is dried, and measured. When carbon nanotubes are present in an electrically conductive composite, they are extracted with a solvent, and can be measured according to the same manner as that of the case of a dispersion.

In the normally purified composition containing carbon nanotubes, two combustion peaks appear on a high temperature side and on a low temperature side in the DTG curve, in many cases. In the present invention, a high temperature combustion peak is at 700 to 850° C., preferably 700 to 800° C. Weight loss corresponding to a peak area of this high temperature peak is defined as TG(H). On the other hand, a low temperature combustion peak refers to a peak which is present from 350° C. to an inflection point at which a peak is changed to a high temperature combustion peak. Weight loss corresponding to a peak area of this low temperature peak is defined as TG(L). In addition, when an inflection point is not present, weight loss in the range of 350° C. to 600° C. is defined as TG(L).

Figure 3:
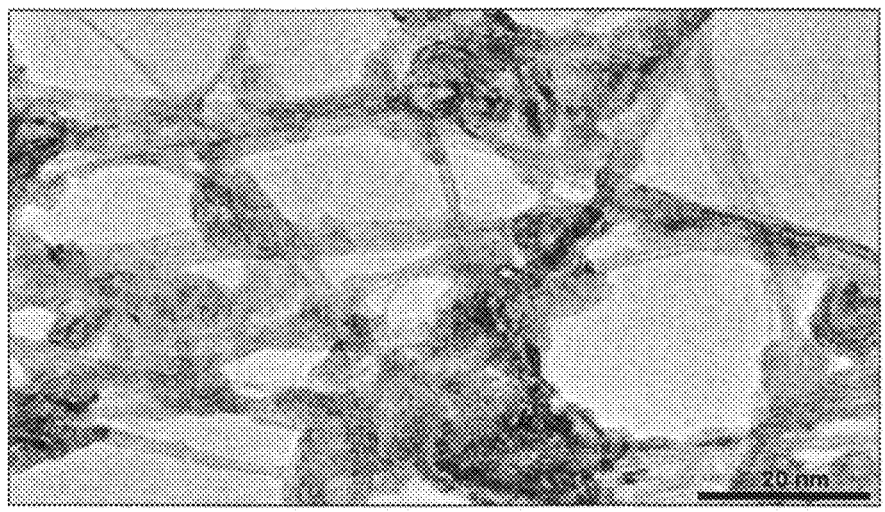
FIG. 3 shows a photograph of a sample recovered from a filtrate after nitric acid treatment in Reference Example 2, observed via transmission electron microscopy.

It is thought that a low temperature peak is derived from attachment of carbon impurities other than carbon nanotubes such as amorphous carbon to carbon nanotubes. Since in Reference Example 2 described later, a peak obtained by nitric acid-treating carbon nanotubes in which two combustion peaks are present on a high temperature side and on a low temperature side, suction-filtering this, and subjecting a sample recovered from the filtrate to thermogravimetric analysis is consistent with this low temperatures peak well, a component which combusts at a temperature corresponding to a low temperature peak is presumed to be equivalent to a component dissolved out by nitric acid treatment. In addition, when a sample recovered from the filtrate is observed via transmission electron microscopy, appearance in which carbon impurities other than carbon nanotubes such as amorphous carbon are attached to carbon nanotubes is observed (FIG. 3).

Generally, carbon impurities combust at 400° C. or lower, and since there is a tendency that when attached to carbon nanotubes, a combustion temperature is shifted to a high temperature side, it is thought that they combust in the aforementioned temperature range.

On the other hand, in carbon nanotubes with carbon impurities attached thereto, accordingly, a combustion peak temperature is shifted to a low temperature side as compared with the original combustion peak temperature of carbon nanotubes. This is because, since a combustion temperature of carbon impurities is low, combustion is initiated earlier, and an exothermic energy generated thereupon is moved to carbon nanotubes and, therefore, carbon nanotubes combust at a lower temperature than the original burning temperature.

As a graphitization degree of carbon nanotubes is higher, or as an amount of carbon impurities is smaller, a combustion peak temperature appears on a higher temperature side. As a combustion peak temperature is higher, the carbon nanotubes are carbon nanotubes having higher durability and a higher purity.

That is, as a ratio of carbon impurities is greater, TG(L) becomes greater and, as a ratio of carbon nanotubes is greater, TG(H) becomes greater. By dividing TG(H) by (TG(H)+TG(L)), a purity of the composition containing carbon nanotubes can be expressed. By making a value of TG(H)/(TG(L)+TG(H))≥0.75 or more, carbon nanotubes having high heat resistance and high electrical conductivity are obtained. When a low temperature combustion peak disappears, and only a high temperature combustion peak appears, a value of TG(H)/(TG(L)+TG(H)) becomes 1. In addition, although the cause is not certain, when the value is 0.75 or more, there is no great difference in properties, from the assessment results of a volume resistance value and transparent electrical conductivity described later.

However, when the value is less than 0.75, a volume resistance value and transparent electrical conductivity result in worse properties than those of 0.75 or more. In addition, in thermogravimetric analysis of single-walled carbon nanotubes or double-walled carbon nanotubes which are usually commercially available, there is one combustion peak in 500 to 600° C. from the DTG curve. This is because carbon impurities are attached to carbon nanotubes as described above. An apparent purity of carbon nanotubes appears high, but this does not indicate the state of carbon nanotubes having a high purity, an attention must be paid. Further, it is thought that heat resistance of carbon nanotubes varies depending on a diameter of carbon nanotubes and quality of a graphene sheet constituting a wall of carbon nanotubes, and in the prior technique, it was difficult to realize high resistance with double-walled carbon nanotubes having a small outer diameter as in the present invention.

In order to produce such the composition containing carbon nanotubes, it is preferable to perform an oxidation reaction of the composition containing carbon nanotubes which have a high temperature combustion peak of 700 to 850° C. before the oxidation reaction, by thermogravimetric analysis under atmosphere at a temperature increase rate of 10° C./minute, wherein the oxidation reaction is performed until the relationship between low temperature weight loss (TG(L)) and high temperature weight loss (TG(H)) becomes TG(H)/(TG(L)+TG(H))≥0.75. As a method of realizing TG(H)/(TG(L)+TG(H))≥0.75, any method may be used, and three examples are exemplified.

As a first method, after production of carbon nanotubes, the carbon nanotubes are heated and oxidized with a heating apparatus such as an electric furnace in the range of 400 to 500° C. for 1 to 5 hours. At this time, carbon nanotubes are preferably in the state where they are attached to a catalyst body. Then, as described above, after a catalyst body is removed, thermogravimetric analysis is performed, the resulting weight reduction curve is differentiated with a time to obtain a differential thermogravimetric curve (DTG), and a heating temperature is determined as follows, based on a graph obtained by plotting, letting an x-axis to be a temperature (° C.) and a y-axis to be DTG (mg/min), and carbon nanotubes are heated. That is, a sample is heated to an inflection point (600° C. when there is no inflection point) at which a peak is changed from a low temperature combustion peak to a high temperature combustion peak, of two combustion peaks which are on a high temperature side and on a low temperature side in the DTG curve under the oxygen atmosphere and, at the time point at which a temperature reaches the temperature, heating is stopped, and oxygen is replaced with a nitrogen gas. An oxygen concentration at this time is sufficient if it is in the range of 0.1 to 21%. It is preferable that a temperature increasing rate is 10° C.±5° C./min. In addition, a high temperature combustion peak referred at this stage is lower than 700 to 850° C. in some cases, but a relatively higher peak is adopted as a high temperature combustion peak. Thereafter, if necessary, heating is performed in the range of 90 to 150° C. for 5 to 75 hours in an aqueous concentrated nitric acid solution (60 to 70% as a nitric acid concentration).

As a second method, after production of carbon nanotubes, the carbon nanotubes are heated and oxidized in the range of 400 to 500° C. for 1 to 5 hours in a heating apparatus such as an electric furnace. At that time, it is preferable that carbon nanotubes are in the state where they are attached to a catalyst body. Then, as described above, after a catalyst body is removed, carbon nanotubes are arranged in a heating equipment such as an electric furnace which has been heated to the range of 500 to 600° C. in advance, and heating and oxidation are performed for 1 to 5 hours. Finally, heating is performed in the range of 90 to 150° C. for 5 to 75 hours in an aqueous concentrated nitric acid solution (60 to 70% as a nitric acid concentration).

As a third method, after production of carbon nanotubes, a catalyst body is removed with 3 to 6 N hydrochloric acid and, thereafter, the carbon nanotubes are heated in the range of 90 to 150° C. for 5 to 75 hours in an aqueous concentrated nitric acid solution (60 to 70% as a nitric acid concentration).

In the above description, in liquid phase oxidation with an aqueous concentrated nitric acid solution, an oxidizing agent such as sulfuric acid, hydrogen peroxide etc. other than concentrated nitric acid can be also used. It is possible to appropriately determine the condition depending on an oxidation power.

It is possible to oxidize and remove carbon impurities by the above methods or a method of combining any of them. In order to obtain a composition containing carbon nanotubes having an average outer diameter of 3.0 nm or less after an oxidation reaction, it is preferable that a composition containing carbon nanotubes before an oxidation reaction contains double-walled carbon nanotubes having an outer diameter in the range of 1.0 to 3.0 nm.

In addition, most preferable is such that after production of carbon nanotubes, and after removal of a catalyst body with 3 to 6N hydrochloric acid, a composition containing carbon nanotubes has already become $TG(H)/(TG(L)+TG(H)) \geq 0.75$. However, usually, since a low temperature combustion peak is high, and this does not meet the range, an oxidation reaction is performed to control a value of $TG(H)/(TG(H)+TG(L))$. The aforementioned oxidation reaction is performed, thermogravimetric analysis is performed, and a high temperatures peak and a low temperature peak are confirmed and, when the range defined in the present invention is not met, heating oxidation or liquid phase oxidation such as nitric acid is further performed to adjust so that the composition is within the scope of the present invention.

It is preferable that a volume resistance value of a composition containing carbon nanotubes is $1.0 \times 10^{-2}$ Ω/cm or less and $1.0 \times 10^{-4}$ Ω·cm or more. A volume resistance value of the composition containing carbon nanotubes can be calculated by making a carbon nanotube membrane as described below, measuring a surface resistance value of the membrane by a 4-terminal method, and multiplying the surface resistance value and a membrane thickness of the carbon nanotube membrane. The surface resistance value can be measured, for example, with Loresta EP MCP-T360 (manufactured by Mitsubishi Chemical Analytech Co., Ltd.) using a 4-terminal 4-probe method according to JISK7149. Upon measurement of a high resistance, the high resistance can be measured using Hiresta-UPMCP-HT450 (manufactured by Mitsubishi Chemical Analytech Co., Ltd., 10V, 10 seconds).

A composition containing carbon nanotubes (20 mg) is mixed with 16 mL of N-methylpyrrolidone (NMP), ultrasound is irradiated with an ultrasound homogenizer at an output of 20 W for 20 minutes, the mixture is mixed with 10 mL of ethanol, and a filtrating equipment having an inner diameter of 35 mmφ is used to obtain the filtration product. The filtration product is not collected at this time point, but this filtration product together with the filtration equipment and a filter used for filtration is dried at 60° C. for 2 hours, thereby, a measurement sample can be made. The made membrane of a composition containing carbon nanotubes can be measured by peeling it from a filtering paper with tweezers. When the membrane cannot be peeled, a thickness of a total of the filter and the membrane of a composition containing carbon nanotubes is measured and, thereafter, a thickness of the membrane may be calculated by subtracting a thickness of only the filter from a total. As the filter for filtration used in filtration, a membrane filter (OMNIPOREMEMBRANE FILTERS, FILTER TYPE: 1.0 μm JA, 47 mmφ) can be employed. In addition, a pore diameter of the filter may be 1.0 μm or less as far as the filtrate passes therethrough, but it is necessary that the filter is a material which is not dissolved in NMP and ethanol, and it is suitable that the filter made of a fluorine resin is preferably used.

Since a composition containing carbon nanotubes having a volume resistivity of from $1 \times 10^{-4}$ Ω·cm to $1 \times 10^{-2}$ Ω·cm is good particularly in electrical conductivity, for example, when utilized in an electrically conductive layer requiring transparency like a transparent electrode, electrical conductivity is sufficiently exerted even at a small use amount of carbon nanotubes, and the effect of improving transparency due to reduction in a use amount is also obtained.

It is preferable that the composition containing carbon nanotubes of the present invention has a height ratio of the G band and the D band (G/D ratio) by Raman spectroscopic analysis at a wavelength of 633 nm of 30 or more. More preferably, the ratio is 40 or more and 200 or less, further preferably, the ratio is 50 or more and 150 or less. The G/D ratio is a value when the composition containing carbon nanotubes is assessed by a Raman spectroscopic analysis method. A laser wavelength used in the Raman spectroscopic analysis method is 633 nm. In Raman spectrum obtained by the Raman spectroscopic analysis method, Raman shift seen at around 1590 cm$^{-1}$ is called G band derived from graphite, and Raman shift seen at around 1350 cm$^{-1}$ is called D band derived from a defect of amorphous carbon and graphite. A carbon nanotube in which a ratio of a height of this G band and a height of this D band, a G/D ratio is higher indicates that it has a higher graphitization degree, and higher quality. The Raman spectroscopic analysis method of a solid such as the composition containing carbon nanotubes varies depending on sampling, in some cases. Then, at least three other places are subjected to Raman spectroscopic analysis, and an additive average thereof is taken. The G/D ratio of 30 or more indicates the composition containing carbon nanotubes of fairly high quality.

The composition containing carbon nanotubes of the present invention can be used in utility of a transparent electrically conductive substrate. When used in utility of the transparent electrically conductive substrate, the composition containing carbon nanotubes together with an additive such as a surfactant and various polymer materials is dispersed in a dispersing medium into a dispersion. The resulting dispersion containing the composition containing carbon nanotubes is coated on a substrate, thereby, the transparent electrically conductive substrate can be produced.

The dispersion of the composition containing carbon nanotubes can contain a dispersant such as a surfactant, various polymer materials etc. as an additive, in order to improve the dispersing ability and the dispersion stabilizing ability. The surfactant is classified into an ionic surfactant and a nonionic surfactant, and any surfactant can be used in the composition containing carbon nanotubes of the present invention. Details will be described later.

A ratio of incorporating each component in the liquid is as follows. That is, the liquid containing the composition containing carbon nanotubes contains the composition containing carbon nanotubes at preferably 0.01% by weight or more, more preferably 0.1% by weight or more in the liquid. An upper limit of a content of the composition containing carbon nanotubes is usually preferably 20% by weight or less, more preferably 5% by weight or less, further preferably 2% by weight or less.

A content of the dispersant is not particularly limited, but each is preferably 0.1 to 50% by weight, more preferably 0.2 to 30% by weight. A ratio of mixing at least one kind of the dispersant and the carbon nanotube is not particularly limited, but a weight ratio of the additive/the carbon nanotube is preferably 0.1 to 20, more preferably 0.3 to 10. In addition, since the dispersion of carbon nanotubes of the present invention is excellent in dispersibility, the dispersion having a higher concentration than a desired carbon nanotube content is made, and is diluted with a solvent, and the dispersion having a desired concentration can be also used. As the solvent, any solvent may be used, and is selected depending on the use purpose. In utility needing little electrical conductivity, the dispersion is used by reducing a carbon nanotube concentration, or carbon nanotubes in the diluted state may be made from the beginning.

A dispersion or a liquid obtained by adding a binder thereto can be used as a transparent covering liquid for coating not only on a transparent substrate, but also on every member to be coated, for example, a colored substrate and a fiber. Thereupon, when coated on a member to be coated, for example, a floor material and a wall material of a clean room, it can be used as an antistatic floor wall material and, when coated on a fiber, it can be used as an antistatic clothing, mat and curtain.

An aqueous dispersion which is a particularly preferable aspect of the present invention is a dispersion body comprising carbon nanotubes having an average outer diameter of 3 nm or less and a dispersant, and an average particle diameter of carbon nanotubes as measured by a dynamic light scattering method is 200 nm or more and 1500 nm or less.

Generally, a particle diameter is used as an index of a dispersing degree of a dispersion body, and the case of a smaller particle diameter can be said to be a highly dispersed dispersion body. Also in the carbon nanotubes, the technique of measuring a particle diameter to assess dispersibility is known. In addition, carbon nanotubes which are relatively simply dispersed were also known. However, when the carbon nanotube dispersion is used in utility of transparent electrical conductivity, there was a problem that carbon nanotubes are mutually entangled with difficulty, it becomes difficult to form an electrically conductive network, and transparent electrical conductivity is not sufficiently high, probably due to reduction in a particle diameter by dispersion. In addition, there was a problem that a bundle is loosened, and contact points forming an electrically conductive path are increased by highly dispersing carbon nanotubes, but conduction is inhibited between contact points with a dispersant used in dispersion.

In the present invention, a dispersion having high transparent electrical conductivity is obtained without deteriorating the original properties of carbon nanotubes, by selecting carbon nanotubes having an average outer diameter of 3 nm or less, and making an average particle diameter 200 nm or more and 1500 nm or less, while this is sufficiently dispersed in an aqueous solvent using a dispersant.

It is preferable that an average length of carbon nanotubes in the dispersion is 1 μm or more and 5 μm or less in order to have high dispersibility and high electrical conductivity, as described above.

In order to obtain an electrically conductive composite excellent in transparent electrical conductivity, it is preferable to use high quality carbon nanotubes having a high crystallization degree. Carbon nanotubes having a high crystallization degree themselves are excellent in electrical conductivity. However, since such the high quality carbon nanotubes form a bundle or an aggregate firmer as compared with carbon nanotubes having a low crystallization degree, it is very difficult to dissociate one by one and stably highly disperse them. For this reason, in order to obtain an electrically conductive composite having higher electrical conductivity using the carbon nanotubes having a high crystallization degree, the technique of dispersing carbon nanotubes is very important.

In the aqueous dispersion of the present invention, a dispersant such as a surfactant etc. in addition to carbon nanotubes is used. The dispersant referred in the present invention refers to an agent having the function of improving dispersibility of carbon nanotubes in a dispersing medium.

The dispersant can be low-molecular or high-molecular if the dispersant has the carbon nanotube dispersing ability, as far as the dispersant of the present invention is obtained, but from a view point of dispersibility and dispersion stability, it is preferable that the dispersant is a polymer. A kind of the polymer is not limited as far as it can disperse carbon nanotubes, and it is preferable to select the kind from a synthetic polymer and a natural polymer having good dispersibility. The synthetic polymer can be selected, for example, from polyetherdiol, polyesterdiol, polycarbonatediol, polyvinyl alcohol, partially saponified polyvinyl alcohol, acetoacetyl group-modified polyvinyl alcohol, acetal group-modified polyvinyl alcohol, butyral group-modified polyvinyl alcohol, silanol group-modified polyvinyl alcohol, an ethylene-vinyl alcohol copolymer, an ethylene-vinyl alcohol-vinyl acetate copolymer resin, dimethylaminoethyl acrylate, dimethylaminoethyl methacrylate, an acryl-based resin, an epoxy resin, a modified epoxy-based resin, a phenoxy resin, a modified phenoxy-based resin, a phenoxyether resin, a phenoxyester resin, a fluorine-based resin, a melamine resin, an alkyd resin, a phenol resin, polyacrylamide, polyacrylic acid, polystyrenesulfonic acid, polyethylene glycol, polyvinylpyrrolidone and a derivative thereof. The natural polymer can be selected, for example, from starch, pullulan, dextran, dextrin, guar gum, xanthan gum, amylose, amylopectin, arginic acid, gum arabia, carrageenan, chondroitin sulfate, hyaluronic acid, curdlan, chitin, chitosan and cellulose which are polysaccharides, and a derivative thereof. The derivative means the previously known compounds such as an ester, an ether, and a salt. Among them, it is preferable from a viewpoint of improvement in dispersibility to use polysaccharides. These can be used alone, or by mixing two or more kinds. In addition, since carbon nanotube dispersibility and electrical conductivity are excellent, an ionic polymer is preferably used. Among them, an ionic polymer having an ionic functional group such as sulfonic acid and carboxylic acid is preferable since dispersibility and electrical conductivity are increased. From a viewpoint that, by using a dispersant having good dispersibility, a highly dispersed dispersion is obtained at a minimum ultrasound irradiation output and irradiation time, a particle diameter can be made to be 200 nm to 1500 nm, and a dispersion having high transparent electrical conductivity is obtained, it is preferable to use polystyrenesulfonic acid, chondroitin sulfate, hyaluronic acid, carboxymethylcellulose and a derivative thereof and, particularly, use of carboxymethylcellulose or a derivative thereof which is a polysaccharide having an ionic functional group is most preferable.

Examples of a kind when a low-molecular molecule (monomer or oligomer) is used as the dispersant include a cationic surfactant, an amphoteric surfactant and an anionic surfactant which are ionic surfactants, a nonionic surfactant, monosaccharides such as glucose, ribose, and deoxyribose, disaccharides such as sucrose, maltose, lactose, cellobiose, and trehalose, oligosaccharides such as cyclodextrin, and steroid derivatives such as bile acid, cholesterol, and cholic acid.

Examples of the nonionic surfactant include the following surfactants. Such the surfactants can be used alone, or by mixing two or more kinds.

Examples of the nonionic surfactant include sugar ester-based surfactants such as sorbitan fatty acid ester, and polyoxyethylene sorbitan fatty acid ester, fatty acid ester-based surfactants such as polyoxyethylene resin acid ester, and polyoxyethylene fatty acid diethyl, ether-based surfactants such as polyoxyethylene alkyl ether, polyoxyethylene alkyl phenyl ether, and polyoxyethylene polypropylene glycol, and aromatic nonionic surfactants such as polyoxyalkylene octyl phenyl ether, polyoxyalkylene nonyl phenyl ether, polyoxyalkyldibutyl phenyl ether, polyoxyalkylstyryl phenyl ether, polyoxyalkylbenzyl phenyl ether, polyoxyalkyl bisphenyl ether, polyoxyalkylcumyl phenyl ether etc. Among them, since the dispersing ability, the dispersion stabilizing ability, and increase in a concentration are excellent, the aromatic nonionic surfactant is preferable.

Examples of the cationic surfactant include an alkylamine salt, and a quaternary ammonium salt. As the amphoteric surfactant, there are an alkylbetaine-based surfactant, and an amine oxide-based surfactant. As the anionic surfactant, there are salts of alkylbenzenesulfonic acid such as dodecylbenzenesulfonic acid etc., aromatic sulfonic acid-based surfactants such as dodecylphenylethersulfonic acid salt etc., monosoap-based anionic surfactants, ether sulfate-based surfactants, phosphate-based surfactants, and carboxylic acid-based surfactants and, among them, since the dispersing ability, the dispersion stabilizing ability, and increase in a concentration are excellent, surfactants containing an aromatic ring, that is, aromatic ionic surfactants are preferable and, particularly, aromatic ionic surfactants such as an alkylbenzenesulfonic acid salt, a dodecylphenylethersulfonic acid salt etc. are preferable.

Among the low-molecular dispersants, anionic surfactants and steroid derivatives are preferably used from carbon nanotube dispersibility and electrical conductivity.

A molecular weight of the dispersant is preferably 100 or more. When the molecular weight is 100 or more, the dispersant can interact with carbon nanotubes, and dispersion of carbon nanotubes becomes better. The molecular weight depends on a length of carbon nanotubes, and as the length is greater, the dispersant interacts with carbon nanotubes, and dispersibility is improved. For example, in the case of a polymer, as a polymer chain becomes longer, the polymer entangles with carbon nanotubes, and carbon nanotubes can be very stably dispersed. However, since when the molecular weight is too great, conversely, dispersibility is reduced, the molecular weight is preferably 10000000 or less, further preferably 1000000 or less. Most preferable is 10000 to 100000.

The dispersing medium is not particularly limited, but may be an aqueous solvent or may be a nonaqueous solvent. As the nonaqueous solvent, hydrocarbons (toluene, xylene etc.), chlorine-containing hydrocarbons (methylene chloride, chloroform, chlorobenzene etc.), ethers (dioxane, tetrahydrofuran, methylcellosolve etc.), etheralcohols (ethoxyethanol, methoxyethoxyethanol etc.), esters (methyl acetate, ethyl acetate etc.), ketones (cyclohexanone, methyl ethyl ketone etc.), alcohols (ethanol, isopropanol, phenol etc.), lower carboxylic acids (acetic acid etc.), amines (triethylamine, trimethanolamine etc.), nitrogen-containing polar solvents (N,N-dimethylformamide, nitromethane, N-methylpyrrolidone etc.), and sulfur compounds (dimethyl sulfoxide etc.) can be used.

Among them, as the dispersing medium used in a particularly preferable aspect of the present invention, an aqueous solvent is preferable. By dispersing carbon nanotubes in an aqueous solvent, an electrostatic repulsion force can be utilized, and carbon nanotubes can be highly dispersed.

A ratio of incorporating each component in the dispersion which is a particularly preferable aspect of the present invention is as follows. A content of the dispersant in the dispersion is not particularly limited, but is preferably 30 to 1500 parts by weight, more preferably 30 to 1000 parts by weight, further preferably 50 to 1000 parts by weight, inter alia preferably 50 to 500 parts by weight, particularly preferably 80 to 300 parts by weight relative to 100 parts by weight of carbon nanotubes.

A carbon nanotube concentration in the dispersion is preferably 0.01 mg/mL or more and 200 mg/mL or less, further preferably 0.5 to 100 mg/mL. The carbon nanotube concentration is more preferably 20 mg/mL or less, further 10 mg/mL or less, further 5 mg/mL or less, in order to obtain an electrically conductive composite having a high light transmittance and high electrical conductivity. Further, a dispersion having a high concentration is made, and the dispersion can be of course used by diluting to a suitable concentration, or by using such the dispersion having a high concentration, a composite having higher electrical conductivity can be also obtained.

Usually, thin carbon nanotubes having an average outer diameter of 3 nm or less form a bundle firmly, and have low dispersibility. When one tries to render a carbon nanotube concentration 0.5 to 100 mg/mL, a strong dispersing energy is necessary, and carbon nanotubes are cut. An average particle diameter at that time becomes less than 200 nm. Such the thing easily occurs, particularly, in single-walled carbon nanotubes. When a particle diameter of carbon nanotubes is made to be too small like this, there is a problem that carbon nanotubes become difficult to entangle with each other, it becomes difficult to form an electrically conductive network, and property is remarkably reduced when formulated into a transparent electrically conductive membrane. Conversely, when carbon nanotubes are dispersed by weakening a dispersing energy, carbon nanotubes which are not dispersed, and are settled are increased, and a dispersion having a low concentration is easily formed. Therefore, by using carbon nanotubes having good dispersibility, and suitably applying a dispersing energy, a 0.5 to 100 mg/mL dispersion having an average particle diameter of 200 nm or more and 1500 nm or less can be prepared. In addition, carbon nanotubes having good dispersibility can be obtained by sufficiently removing impurities which inhibit dispersibility such as amorphous carbon, by an oxidizing reaction in conformity with specification of each carbon nanotube, as described later.

In addition, a preferable pH of a dispersion is in an acidic region (less than pH 7). Depending on a kind of the dispersant, more preferable is a pH 3 to 6. When a pH is too low, solubility of the dispersant is reduced, a repulsion force between carbon nanotubes is decreased, and carbon nanotubes aggregate. However, when a pH is higher than neutral, electrical conductivity is reduced. Therefore, when a pH is in an acidic region, dispersion stability of carbon nanotubes is high, and highly electrically conductive, and an electrically conductive composite having high transparent electrical conductivity can be formed.

As an index for examining dispersibility of a carbon nanotube dispersion, there is a method by a particle size distribution meter. In the present invention, a particle size distribution meter by a dynamic light scattering method suitable for measuring submicron or less is used. Upon measurement of a particle size distribution, a carbon nanotube dispersion may be appropriately regulated to a concentration which is easily measured. The particle size distribution meter calculates a particle diameter from a magnitude of Brownian motion of fine particles. Since a principle that in particles having a small particle diameter, Brownian motion is great and, on the other hand, in particles having a great particle diameter, Brownian motion is small is applied, when dispersibility is improved, and aggregation of carbon nanotubes becomes small, it can be determined that Brownian motion of carbon nanotubes has become great, and a particle diameter has become relatively small. In addition, by inputting a refractive index and a viscosity of a solvent into the present particle size distribution meter in advance, a particle diameter is calculated.

In the aqueous dispersion of carbon nanotubes of the present invention, an average particle diameter by cumulant analysis measured with a dynamic light scattering particle diameter distribution measuring apparatus (e.g., OTSUKA ELECTRONICS CO., LTD., ELS-Z2) is 200 nm to 1500 nm. An average diameter is greater as compared with a dispersion of the previously known carbon nanotubes having a small outer diameter, and an aqueous dispersion of carbon nanotubes which are more uniformly dispersed can be obtained. An average particle diameter is preferably 250 nm to 1200 nm, more preferably 300 nm to 1200 nm, further preferably 300 to 1000 nm. Particularly preferable is 300 nm to 800 nm. When an average particle diameter is in this range, carbon nanotubes have become in the state where they more easily take a network, while they are highly dispersed, and high transparent electrical conductivity can be obtained.

Since single-walled to quintuple-walled carbon nanotubes having a small diameter usually form a bundle, dispersibility is low. This is presumed that amorphous carbon produced as a byproduct plays a role as a paste, and makes a bundle firm. Then, in order to improve dispersibility of carbon nanotubes, amorphous carbon can be removed by performing an oxidation reaction.

In addition, at that time, by performing an oxidation reaction, single-walled carbon nanotubes are also removed at the same time with amorphous carbon, and a ratio of double-walled to quintuple-walled carbon nanotubes can be increased. The oxidation reaction can be performed, for example, by a method of vapor phase oxidation treatment and liquid phase oxidation treatment such as burning treatment etc.

In addition, in such the oxidized carbon nanotubes, a surface of carbon nanotubes has been modified with an acidic functional group such as carboxylic acid, and a liquid suspended in ion-exchanged water exhibits acidity. By using oxidized carbon nanotubes, dispersibility is improved, and a dispersion having high electrical conductivity can be obtained.

When burning treatment is performed, a temperature of burning treatment is not particularly limited, but the range of 300 to 1000° C. is preferable. Since an oxidation temperature is influenced by an atmospheric gas, when an oxygen concentration is high, it is preferable to perform burning treatment at a relatively low temperature and, when an oxygen concentration is low, it is preferable to perform burning treatment at a relatively high temperature. Examples of burning treatment of carbon nanotubes include a method of performing burning treatment in the range of a combustion peak temperature of carbon nanotubes±50° C. under the atmosphere. When an oxygen concentration is higher than that of the atmosphere, it is normal to select a temperature range which is lower than this and, when an oxygen concentration is lower than that of the atmosphere, it is normal to select a temperature range which is higher than this. When burning treatment is performed under the atmosphere, it is particularly preferable to perform the treatment in the range of a combustion peak temperature±15° C.

A combustion peak temperature of carbon nanotubes can be measured by heat analysis. In heat analysis, about 10 mg of a sample is arranged in a differential heat analysis apparatus (e.g. DTG-60 manufactured by Shimadzu Corporation), and a temperature is increased from room temperature to 900° C. at a temperature increasing rate of 10° C./minutes in the air. At that time, an exothermic peak temperature at burning of the sample can be obtained. By performing firing treatment in the range of the obtained combustion peak temperature±50° C., impurities in produced carbon nanotubes and single-walled carbon nanotubes having low durability can be removed. At that time, even when burning treatment is performed at a temperature which is too lower than a combustion peak, that is, at lower than a combustion peak temperature−50° C., since impurities and single-walled carbon nanotubes having a low purity are not burned, they are not removed, and a purity of single-walled to quintuple-walled carbon nanotubes is not improved. In addition, even when burning treatment is performed at a temperature which is too higher than a combustion peak temperature, that is, at higher than a combustion peak temperature+50° C., all of produced carbon nanotubes are now burned, and vanished. Therefore, it is preferable to perform burning at around a combustion peak temperature of carbon nanotubes. Specifically, it is preferable to perform burning treatment in the range of a combustion peak temperature±50° C. In carbon nanotubes, generally, since as the layer number is greater, a combustion temperature is higher, single-walled to quintuple-walled carbon nanotubes having a high purity can be obtained by performing burning in the range of a combustion peak temperature±50° C., and a purity of double-walled to quintuple-walled carbon nanotubes can be improved by performing burning in the range of a combustion peak temperature −15° C. to +50° C., being preferable. Further, within the range of a combustion peak temperature±15° C., among double-walled to quintuple-walled carbon nanotubes, a ratio of double-walled carbon nanotubes can be increased, and 50 or more of 100 can be double-walled carbon nanotubes.

Alternatively, a method of performing burning treatment while oxygen or a mixed gas containing oxygen is intermittently contacted can be also performed. When burning treatment is performed while oxygen or a mixed gas containing oxygen is intermittently contacted, if an oxygen concentration is high, it is possible to perform treatment at a relatively high temperature, for example, 500 to 1000° C. This is because, since oxygen or a mixed gas containing oxygen is intermittently flown, even when oxidation occurs, a reaction is stopped immediately at the time point at which oxygen is consumed. By doing this, it becomes possible to control an oxidation reaction.

The reaction condition can be adjusted by making a burning treatment time longer when a burning temperature is low, and making a burning time shorter when a burning temperature is high. Therefore, a burning treatment time is preferably 5 minutes to 24 hours, more preferably 10 minutes to 12 hours, further preferably 30 minutes to 5 hours. Burning is preferably performed under the atmosphere, but may be performed under oxygen/inert gas in which an oxygen concentration is regulated. An oxidation concentration at that time is not particularly limited. An oxygen concentration may be appropriately set in the range of oxygen 0.1% to 100%. In addition, as the inert gas, helium, nitrogen, argon etc. are used.

Examples of the liquid phase oxidation treatment of carbon nanotubes include treatment with an oxidizing liquid such as hydrogen peroxide, mixed acid, and nitric acid.

Treatment of carbon nanotubes with hydrogen peroxide means that the carbon nanotubes are mixed into, for example, commercially available 34.5% aqueous hydrogen peroxide to 0.1 mg/mL to 100 mg/mL, and this is reacted at a temperature of 0 to 100° C. for 0.5 to 48 hours.

In addition, treatment of carbon nanotubes with mixed acid means that the carbon nanotubes are mixed into, for example, a mixed solution of concentrated sulfuric acid/concentrated nitric acid (3/1) to 0.1 mg/mL to 100 mg/mL, and this is reacted at a temperature of 0 to 100° C. for 0.5 to 48 hours. As a mixing ratio of mixed acid, a ratio of concentrated sulfuric acid/nitric acid can be also 1/10 to 10/1, depending on an amount of single-walled carbon nanotubes in produced carbon nanotubes.

Treatment of carbon nanotubes with nitric acid means that the carbon nanotubes are mixed into, for example, commercially available nitric acid 40 to 80% by weight to 0.1 mg/mL to 100 mg/mL, and this is reacted at a temperature of 60 to 150° C. for 0.5 to 48 hours.

Alternatively, after the oxidation reaction, carbon nanotubes may be treated with an organic amine. By treatment with the organic amine, remaining mixed acid can be reduced and, further, it is thought that an acidic group such as a carboxyl group thought to be produced in impurities such as amorphous carbon is converted into a salt, and it is thought that separation from carbon nanotubes becomes good. That is, water-solubility of mixed-acid treated impurities is increased, and it becomes possible to easily separate carbon nanotubes and impurities by filtration. Among the organic amine, a lower amine such as methylamine, ethylamine, propylamine, dimethylamine, diethylamine, dipropylamine etc. is preferable, and ethylamine and propylamine are further preferable.

Among them, by performing an oxidation reaction with nitric acid, a purity of double-walled carbon nanotubes can be enhanced, being preferable.

These oxidation reactions may be performed immediately after synthesis of carbon nanotubes, and may be performed after another purification treatment. For example, when iron/magnesia is used as a catalyst, after burning treatment, an oxidation reaction with an oxidizing liquid may be performed after removal of a catalyst with an acid such as hydrochloric acid etc., or an oxidation reaction may be performed after purification treatment for removing a catalyst, with an acid such as hydrochloric acid, in advance. Among them, removal of a catalyst after synthesis of carbon nanotubes, and oxidation with an oxidizing liquid are particularly preferable since carbon nanotubes can be modified with an acidic functional group while a length of carbon nanotubes is retained, being particularly preferable. In any event, it is good to adjust a force and a time of suitable oxidation in conformity with properties of carbon nanotubes, and perform sufficiently an oxidation reaction until desired dispersibility is obtained.

The thus obtained carbon nanotubes have high dispersibility, and a bundle can be dissociated relatively simply. In the present invention, it is further preferable that after carbon nanotubes are purified, they are used in the state where they contain a solvent, without via a drying step. Once carbon nanotubes are dried, carbon nanotubes are entangled and strongly aggregated, and it becomes difficult to disperse carbon nanotubes as compared with the state where they contain a solvent without via a drying step. In addition, when aggregation is strong like this, at dissociation of entanglement, carbon nanotubes are hardly dissociated and are cut, and a particle diameter becomes too small. By dispersing carbon nanotubes in the state where they contain a solvent like this, it becomes further simple to disperse carbon nanotubes and, at the same time, dispersibility is improved.

Then, the thus obtained carbon nanotubes and a dispersant are mixed in an aqueous solvent using a mixing dispersing machine which is conventional for producing a paint, for example, a ball mill, a bead mill, a sand mill, a roll mill, a homogenizer, an ultrasound homogenizer, a high pressure homogenizer, an ultrasound apparatus, and an attritor, a dissolver, a paint shaker etc., thereby, an aqueous dispersion can be produced. Among, by dispersing carbon nanotubes using ultrasound, dispersibility of carbon nanotubes of the resulting dispersion is improved, being preferable. Carbon nanotubes to be dispersed may be in the dry state, or in the state where carbon nanotubes contain a solvent, but dispersibility is improved by dispersing carbon nanotubes in the state where they contain a solvent without drying after purification, being preferable.

As an ultrasound irradiation method, it is preferable to use an ultrasound homogenizer. It is necessary to adjust a particle diameter to 200 nm to 1500 nm by optimally adjusting an irradiation output of ultrasound, a treating amount and a dispersing time.

The irradiation output of ultrasound depends on a treating amount and a dispersing time and, therefore, is not limited, but is preferably 20 to 1000 W. When the irradiation output is too great, a defect is generated in carbon nanotubes, a particle diameter becomes too small, and transparent electrical conductivity of a dispersion is reduced. It is important to adjust an irradiation output, a dispersing time etc. so that a particle diameter becomes 200 nm to 1500 nm. For example, when a dispersion treating amount is 20 mL or less, 20 to 50 W is preferable and, when a dispersion treating amount is 100 to 500 mL, 100 W to 400 W is preferable. It is possible to control at an optimal particle diameter by treatment, such as when an output of ultrasound is great, a dispersing time is shortened and, when an output is too small, a dispersing time is lengthened etc.

In addition, upon ultrasound dispersing, by using a viscosity of a dispersion as an index, suitable dispersing condition can be also set. That is, it was found out that, by rendering a viscosity of a dispersion upon ultrasound dispersing in the range defined below, an average particle diameter of a carbon nanotube dispersion is 200 nm to 1500 nm, and a carbon nanotube dispersion excellent in dispersibility and electrical conductivity is obtained.

That is, when a viscosity of a mixed solution of a dispersing medium and a dispersant used in preparation of a carbon nanotube dispersion is let to be $\eta 0$, a viscosity of a carbon nanotube dispersion after x minutes from initiation of ultrasound dispersing to be $\eta x$, a maximum of a first viscosity of a carbon nanotube dispersion after dispersing initiation is let to be $\eta 1$, and a viscosity decrease rate A of the dispersion is defined as A (%)=(η1−ηx)/(η1−η0)×100, ultrasound dispersion is performed until A becomes 10% or more and 70% or less.

The reason why production is performed so that a viscosity of a dispersion becomes in the aforementioned range is as follows. First, upon preparation of a carbon nanotube dispersion, when ultrasound irradiation is initiated, a viscosity of a dispersion begins to be increased, by aggregation of carbon nanotubes and initiation of dissociation of a bundle. However, at the same time with it, a defect of cutting of carbon nanotubes with an ultrasound energy, and a defect of a surface damage are generated. At initial dispersing, dissociation of carbon nanotubes occurs preferentially, but as dispersing progresses, a ratio of cutting and damage of carbon nanotubes is increased. At that time, in a dispersion in which a viscosity exhibits a maximum η1, a degree of dissociation of carbon nanotubes has considerably progressed, but the dispersed state thereof is unstable and is not sufficient, and it was found out that electrical conductivity of an electrically conductive composite obtained by coating the dispersion is low. However, by further continuing dispersing until a viscosity decrease rate A becomes 10% or more, since carbon nanotubes are sufficiently dissociated, and generation of a defect is suppressed to a minimum, high electrical conductivity is exhibited. It was found out that, when dispersing is further continued, and a viscosity decrease rate A has exceeded 70%, cutting of carbon nanotubes themselves and generation of a defect progress, an average particle diameter becomes small, and electrical conductivity is deteriorated again. There is a problem that, when a particle diameter of carbon nanotubes is made to be too small, carbon nanotubes become to be entangled with difficulty, it becomes difficult to form an electrical conductive network, and property is remarkably reduced when formulated into a transparent electrically conductive membrane.

For this reason, an amount of ultrasound irradiation for producing a carbon nanotube dispersion may be such that a viscosity decrease rate A is 10% more and 70% or less, more preferably 15% or more and 50% or less.

By dispersing carbon nanotubes after purification in the state where a solvent is contained without drying, an irradiation output and an irradiation time can be minimized. Thereby, since a force more than necessity is not exerted on carbon nanotubes, the following can be suppressed: carbon nanotubes are damaged, shortened, and reduced in a particle diameter, a structure of a dispersant is changed, and dispersibility is changed, or a dispersant excessively interacts with carbon nanotubes, dispersing progresses, but carbon nanotubes are covered with a dispersant, and electrical conductivity is reduced. Thereby, a dispersion excellent in dispersibility and transparent electrical conductivity can be obtained while a particle diameter is maintained.

As a temperature upon dispersing, particularly, in the case of high outputting, it is preferable not to increase a liquid temperature by performing dispersing by a continuous flowing system while cooling, so as not to increase a liquid temperature during dispersing. A liquid temperature during ultrasound irradiation is preferably 0° C. to 50° C., more preferably 0° C. to 30° C., further preferably 0° C. to 20° C. By being within this range, carbon nanotubes and a dispersant are stably interacted, and carbon nanotubes can be dispersed well. It is preferable that a frequency is 20 to 100 kHz.

An order of adding carbon nanotubes and a dispersant is not particularly limited, but they may be added at the same time, or they may be added separately. Alternatively, any of them may be added first.

It is preferable that the dispersion is fractionated by centrifugation, filter filtration, or gel filtration. For example, since by centrifuging a dispersion, undispersed carbon nanotubes, an excessive amount of a dispersant, and a metal catalyst which may be mixed at synthesis of carbon nanotubes are precipitated, by recovering the centrifugation supernatant, carbon nanotubes dispersed in a composition can be collected. Undispersed carbon nanotubes and impurities can be removed as a precipitate, thereby, re-aggregation of carbon nanotubes can be prevented, and stability of a composition can be improved. Further, in a strong centrifugation force, separation can be performed depending on a thickness and a length of carbon nanotubes, and transparency and electrical conductivity of a dispersion can be improved.

A centrifugation force upon centrifugation may be a centrifugation force of 100 G or more, preferably 1000 G or more, more preferably 10,000 G or more. An upper limit is not particularly limited, but 2,000,000 G or less is preferable from performance of a general-use centrifuge.

In addition, a filter used in filter filtration can be appropriately selected from between 0.05 μm to 100 μm. Thereby, undispersed carbon nanotubes, and impurities etc. having a relatively large size among impurities etc. which may be mixed in at synthesis of carbon nanotubes can be removed.

In the case of such the fractionation, an incorporation ratio before size fractionation is determined in view of this fractionated amount. Determination of an incorporation ratio before size fractionation is performed by a method of drying a precipitate after centrifugation, and fractionation products remaining on a filter, thereafter, burning them at 100° C. for 1 hour, weighing them, and calculating a concentration. As a result of such the size fractionation, carbon nanotubes can be separated by a length, and the layer number and other nature of carbon nanotubes, and the presence or the absence of a bundle structure.

As the carbon nanotube dispersion of the present invention, it is preferable to prepare a dispersion having a concentration after the aforementioned fractionation of 0.5 to 100 mg/mL. As a method of measuring a concentration of a dispersion at this time, since a weight of a precipitate can be measured by the aforementioned method, or by filtering a remaining solution after fractionation of a supernatant of a dispersion using, for example, a filter having a pore diameter of 1 μm, thereafter, washing this well to obtain a filtration product, drying it with a drying machine, and measuring a weight, a concentration of a supernatant can be measured by calculating a difference from an amount used in dispersing.

If necessary, other additive in addition to the carbon nanotubes and a dispersant can be contained in this dispersion in such a range that the effect of the present invention is not interfered.

By coating the carbon nanotube dispersion on a substrate, an electrically conductive composite can be formed.

A shape, a size and a material of a substrate are not particularly limited, as far as a dispersion can be coated thereon, and the resulting electrically conductive layer can be fixed thereon. The substrate can be selected depending on objective utility, and may be, for example, a film, a sheet, a plate, a paper, a fiber, or a particle. A material can be selected, in the case of an organic material, from resins such as polycarbonate, polyester, polyamine, acryl, polyurethane, polymethyl methacrylate, cellulose, triacetylcellulose, and amorphous polyolefin and, in the case of an inorganic material, from metals such as stainless, aluminum, iron, gold and silver, and glass and carbon materials etc. When a resin film is used in the substrate, an electrically conductive film excellent in adherability, stretching following property and softness can be obtained, being preferable. When transparency is necessary, it is preferable to use a transparent film, for example, a PET film.

A thickness of the substrate is not particularly limited, but a variety of ranges from an intermediate thickness to a very thin thickness can be adopted. For example, the substrate can have a thickness between 0.5 nm to 1000 µm. A thickness of the substrate is preferably 0.05 to 500 µm, further preferably 1.0 to 200 µm.

The substrate may be subjected to surface treatment, if necessary. Surface treatment may be physical treatment such as glow discharge, corona discharge treatment and ozone treatment, or a resin layer may be arranged. A commercially available substrate such as "Lumirror®" (manufactured by Toray Industries, Inc.) which is a polyester film having an easily adhering layer may be used.

Alternatively, although a substrate having no transparency can be used, a transparent electrically conductive composite can be obtained by using a substrate having transparency, being preferable. Herein, the substrate having transparency indicates that a light transmittance at 550 nm is 50% or more.

A method of coating a dispersion is not particularly limited. The known coating method, for example, spray coating, dipping coating, roll coating, spin coating, doctor knife coating, kiss coating, slit coating, die coating, slit die coating, gravure coating, microgravure coating, blade coating, wire bar coating, extrusion coating, screen printing, gravure printing, inkjet printing, pat printing, and other kind of printing can be utilized. In addition, coating may be performed any number of times, and different two kinds of coating methods may be combined. The most preferable coating method is microgravure coating and wire bar coating.

A coating thickness (wet thickness) also depends on a concentration of a coating solution and, therefore, it is not necessary to particularly define the thickness as far as desired electrical conductivity is obtained. However, among it, 0.01 µm to 50 µm is preferable, and further preferable is 0.1 µm to 20 µm. A coating thickness (dry thickness) can be measured by observing a cross-section of an electrically conductive composite. For example, the thickness can be observed via transmission microscopy and, if necessary, a cross section may be stained. A preferable dry thickness is not defined as far as desired electrical conductivity is obtained, but is preferably 0.001 µm to 5 µm, further preferably 0.001 to 1 µm.

When a dispersion is coated on a substrate, a wetting agent may be added to the dispersion. Upon coating on a non-hydrophilic substrate, particularly adding a wetting agent such as a surfactant and an alcohol etc. to an electrically conductive composition, coating can be performed without repulsion of the composition by the substrate. Among them, an alcohol is preferable and, among an alcohol, methanol, ethanol, propanol, and isopropanol are preferable. Since a lower alcohol such as methanol, ethanol and isopropanol has high volatile property, it can be easily removed at substrate drying after coating. Depending on the case, the mixed solution of an alcohol and water may be used.

It is preferable to remove an unnecessary solvent by a method of air drying, heating and reduction in a pressure to dry a formed electrically conductive layer, after coating of the dispersion on a substrate like this. Thereby, carbon nanotubes form a three dimensional network structure, and are immobilized on the substrate. Inter alia, drying by heating is preferable. A drying temperature is enough if a solvent can be removed, and the temperature is a heat-resistant temperature of the substrate or lower and, in the case of the substrate made of a resin, a drying temperature is preferably 0° C. to 250° C., further preferably 15° C. to 150° C.

After drying, non-electrically conductive components in an electrically conductive layer can be also removed using a suitable solvent. In this case, there is a method of immersing an electrically conductive layer in a solvent after drying, or spraying a solvent to an electrically conductive layer. Alternatively, non-electrically conductive components can be also thermally degraded by heating. By this operation, dispersing of electric charges becomes easy, and electrical conductivity of an electrically conductive composite is improved.

A solvent for removing the components is not particularly limited, as far as it dissolves a component which reduces transparent electrical conductivity which is wanted to be removed, for example, an additive and an excessive amount of a dispersant, and does not remove carbon nanotubes. Specifically, examples include water, alcohols, and acetonitrile.

It is also preferable that, after a dispersion is coated to form an electrically conductive composite containing carbon nanotubes as described above, this film is overcoated with a binder material which can form an organic or inorganic transparent film. By overcoating, transparency, electrical conductivity, heat resistance and weather resistance can be further improved.

Alternatively, the electrically conductive composite can be also obtained by containing of a binder material which can form an organic or inorganic transparent film in a carbon nanotube dispersion, coating it on a suitable substrate and, thereafter, if necessary, drying or baking (curing) of a coated film by heating. Thereupon, heating condition is suitably set depending on a binder kind. When a binder is light or radiation-curable, a coated film is cured not by heating curing, but by irradiating a coated film with light or radiation immediately after coating. As radiation, ionizing radiation such as electron beam, ultraviolet ray, X-ray, gamma ray etc. can be used, and an irradiation amount is determined depending on a binder kind.

The binder material is not particularly limited as far as it is used in an electrically conductive paint, but various organic and inorganic binders, that is, a transparent organic polymer or a precursor thereof (hereinafter, referred to as "organic polymer-based binder", in some cases) or an inorganic polymer or a precursor thereof (hereinafter, referred to as "inorganic polymer-based binder", in some cases) can be used.

The organic polymer-based binder may be any of thermoplastic binder, a thermosetting binder, or a radiation-curing binder which is curable with ultraviolet ray, or electron beam. As an example of a suitable organic binder, there are organic polymers such as polyolefin-based (polyethylene, polypropylene etc.) binders, polyamine-based (nylon 6, nylon 11, nylon 66, nylon 6·10 etc.) binders, polyester-based (polyethylene terephthalate, polybutylene terephthalate etc.) binders, a silicone-based polymer, a vinyl-based resin (polyvinyl chloride, polyvinylidene chloride, polyacrylonitrile, polyacrylate, a polystyrene derivative, polyvinyl acetate, polyvinyl alcohol etc.), polyketone, polyimide, polycarbonate, polysulfone, polyacetal, a fluorine resin, a phenol resin, a urea resin, a melanine resin, an epoxy resin, polyurethane, a cellulose-based polymer, proteins (gelatin, casein, etc.), chitin, a polypeptide, polysaccharides, and a polynucleotide, as well as a precursor (monomer, oligomer) of these polymers. These can form an organic polymer-based transparent film (or matrix (when incorporated in a liquid)), simply by evaporating a solvent, or thermal curing or curing by light or radiation irradiation.

Preferable as an organic polymer-based binder is a compound having an unsaturated bond, which is radical polymerization-curable by radiation or light, and this is a monomer, an oligomer or a polymer having a vinyl group or a vinylidene group. As this kind of monomer, there are a styrene derivative (styrene, methylstyrene etc.), acrylic acid or methacrylic acid or a derivative thereof (alkyl acrylate or methacrylate, allyl acrylate or methacrylate etc.), vinyl acetate, acrylonitrile, itaconic acid etc. As an oligomer or a polymer, a compound having a double bond on a main chain, or a straight compound having an acryloyl or methacryloyl group on both ends is preferable. This kind of radical polymerization-curable binder is of a high hardness, and is excellent in scratch resistance, and can form an electrically conductive film (or matrix (when incorporated in a liquid)) having a high transparency degree.

Examples of the inorganic polymer-based binder are silica, sols of metal oxides such as tin oxide, aluminum oxide, zirconium oxide etc., or hydrolyzable or thermally degradable organic phosphorus compounds and organic boron compounds which become a precursor of an inorganic polymer, as well as organic metal compounds such as an organic silane compound, an organic titanium compound, an organic zirconium compound, an organic lead compound, and an organic alkaline earth compound. Specific examples of hydrolyzable or thermally degradable organic metal compounds include alkoxides or partial hydrolysates thereof, lower carboxylic acid salts such as acetic acid salt, and metal complexes such as acetylacetone.

When one kind or two or more kinds of inorganic polymer-based binders are burned, they are polymerized, and a vitreous inorganic polymer-based transparent film (or matrix (when incorporated into a liquid)) consisting of an oxide or a composite oxide can be formed. The inorganic polymer-based matrix is generally vitreous, is of a high hardness, is excellent in scratch resistance, and is high in transparency.

Among the aforementioned binders, inorganic polymer-based binders have high heat resistance and transparency, and are preferably used. Among them, an organic silane compound is preferable and, for example, tetraalkoxysilane such as tetramethoxysilane, tetraethoxysilane, tetra-n-propoxysilane, tetra-i-propoxysilane, and tetra-n-butoxysilane, and a hydrolysate thereof can be preferable used.

A use amount of the binder may be a sufficient amount for overcoating and, in the case of incorporation into a liquid, may be a sufficient amount for obtaining a viscosity suitable for coating. When the amount is too small, coating is not well done and, when the amount is too large, electrical conductivity is inhibited, being not good.

A light transmittance at a wavelength of 550 nm when a transparent film is used as a substrate is such that a value of a light transmittance of a composite/a light transmittance of a substrate is preferably 80% or more, more preferably 85% or more, further preferably 90% or more, most preferably 95% or more.

In the present invention, a light transmittance is a value obtained by mounting an electrically conductive composite into a spectrophotometer (Hitachi, Ltd. U-2100), and measuring a light transmittance at a wavelength of 550 nm.

A surface resistance value of an electrically conductive composite is preferably $2\times10^3\Omega/\square$ or less, more preferably $1\times10^3\Omega/\square$ or less. The surface resistance value is preferably $1\times10^2\Omega/\square$ or more.

The surface resistance value is a value obtained by using a 4-probe method according to JISK7194 (instituted in 1994), and employing Loresta EP MCP-T360 (manufactured by Mitsubishi Chemical Analytech Co., Ltd.).

A preferable aspect is an electrically conductive composite meeting the following 1 and 2.
(1) Surface resistance value $2\times10^3\Omega/\square$ or less;
(2) A light transmittance at a wavelength of 550 nm meets the following condition;
Light transmittance of composite/light transmittance of substrate $\geq 0.90$.

A carbon nanotube coating amount of the electrically conductive composite can be adjusted in order to attain a variety of utilities requiring electrical conductivity. For example, there is a tendency that by increasing a film thickness, a surface resistance is lowered and, by reducing a film thickness, a surface resistance is increased. When a coating amount is $1\ mg/m^2$ to $40\ mg/m^2$, a value of a light transmittance of the electrically conductive composite/a light transmittance of a substrate can be 50% or more. Further, when a coating amount is $30\ mg/m^2$ or less, a value of a light transmittance/a light transmittance of the substrate can be 60% or more. Further, when a coating amount is $20\ mg/m^2$ or less, a value can be 70% or more and, when a coating amount is $10\ mg/m^2$ or less, the value can be 80% or more, being preferable. The light transmittance of the substrate, when there is a resin layer in the substrate, refers to a light transmittance including the resin layer.

In addition, the surface resistance value of the electrical conductive composite can be also easily adjusted by a coating amount and, when a coating amount is $1\ mg/m^2$ to $40\ mg/m^2$, the surface resistance value of the electrically conductive composite can be $10^0$ to $10^4\Omega/\square$, being preferable.

By using the carbon nanotube dispersion of the present invention, an electrically conductive composite having high transparency can be obtained. However, since the light transmittance and the surface resistance value are contradictory values such that when a coating amount is decreased in order to enhance the light transmittance, the surface resistance is increased and, when a coating amount is increased in order to reduce the surface resistance value, the light transmittance is decreased, a desired surface resistance value and a light transmittance are selected to adjust a coating amount. In addition, the surface resistance value can be also adjusted by increasing or decreasing an amount of a dispersant. A surface resistance value is reduced by decreasing an amount of the dispersant. In the thus obtained electrically conductive composite, a light transmittance at 550 nm/a light transmittance at 550 nm of a substrate can be 90% or more, and the surface resistance value can be $500\Omega/\square$ or less. In a further preferable aspect, a light transmittance at 550 nm/a light transmittance at 550 nm of a substrate can be 94% or more, and the surface resistance value can be $300\Omega/\square$ or less. As a result, the electrically conductive composite having a light transmittance at 550 nm of 80% or more and the surface resistance value of $500\Omega/\square$ or less is obtained. In a more preferable aspect, the electrically conductive composite having a light transmittance at 550 nm of 85% or more and the surface resistance value of $300\Omega/\square$ or less is obtained.

The electrically conductive composite of the present invention has high heat resistance and high electrical conductivity, and can be used as antistatic shoes, members for clean room such as antistatic plates, electromagnetic shielding, near infrared cutting, transparent electrodes, touch panels, displays by radio wave absorption, and members for automobiles. Among them, the composite exerts particularly excellent performance for touch panel utility.

Next, a catalyst body for producing carbon nanotubes will be explained. Herein, the catalyst body is an integral substance in which a transition metal compound acting as a catalyst for producing carbon nanotubes is supported by a support.

It is preferable that the catalyst body comprises a Group 8 to Group 10 transition metal in the range of 0.1 to 1 wt %. When an amount of a transition metal is larger, a yield of the composition containing carbon nanotubes is increased, but when the amount is too large, a particle diameter of a transition metal becomes greater, and produced carbon nanotubes become thick. When an amount of a transition metal is too small, a particle diameter of a transition metal on the catalyst body for producing carbon nanotubes becomes smaller, and thin carbon nanotubes are obtained, but there is a tendency that a yield is reduced. An optimal content of a transition metal is different depending on a pore volume and an outer surface area of the catalyst body, and a method of preparing the catalyst body, but is preferably 0.1 to 1 wt %, further preferably 0.2 to 0.6 wt % relative to the catalyst body.

As the transition metal, Fe, Co, Ni, Pd, Pt, Rh etc. are preferable, and the transition metal is further preferably selected from Fe, Co and Ni. Only one kind or two or more kinds of transition metals may be contained. When two or more kinds of transition metals are used, a ratio thereof is not limited. When two kinds of metals are supported, a combination of metals selected from Fe, Co, Ni, Pd, Pt and Rh is preferable. The case where Fe, and one or kinds of Co, Ni, V, Mo and Pd are combined is most preferable. Herein, the transition metal is not limited to the zerovalent state. It can be presumed that the transition metal becomes in the zerovalent metal state during a reaction, but a compound containing a transition metal may be used. In addition, it is preferable that the transition metal is a fine particle. It is preferable that the fine particle has a particle diameter of 0.5 to 10 nm. When the transition metal is a fine particle, thin carbon nanotubes are easily produced.

It is preferable that the catalyst body for producing carbon nanotubes contains, as a support, at least one kind selected from magnesia, alumina, silica, zeolite, calcia and titania, and magnesium is preferably used without particular limitation. Herein, magnesia is not particularly limited, but magnesia having a BET specific surface area with nitrogen of 10 to 50 $m^2/g$, and having a fine particulate shape is preferable.

The catalyst body which is a preferable aspect of the present invention is a catalyst body for producing carbon nanotubes, which contains a fine particle containing a Group 8 to Group 10 transition metal and magnesium oxide flakes, in which the fine particle containing a transition metal has an average particle diameter of 1 nm to 30 nm, and a content of a transition metal is 0.1 to 1 wt % relative to the catalyst body.

Carbon nanotubes can be effectively produced by growing them in the catalyst body in a vertical direction without spacial constraint relative to a substrate catalyst body. By highly dispersing catalyst fine particles for producing carbon nanotubes on a support on a substrate having a fine flat plate structure, carbon nanotubes of good quality can be effectively grown.

The catalyst body of the present invention is such that fine particles containing a Group 8 to Group 10 transition metal (hereinafter, referred to as "transition metal fine particle", in some cases) are dispersed in flake-magnesium oxide (hereinafter expressed as MgO) at an average particle diameter in the range of 1 nm to 30 nm.

In addition, a content of a transition metal in the catalyst body is preferably in the range of 0.1 to 1 wt %, further preferably in the range of 0.2 to 0.6 wt %. When an amount of the transition metal is increased, an optimal particle diameter for synthesizing carbon nanotubes having a relatively small diameter is not obtained and, in addition, there is a tendency that carbon impurities such as amorphous carbon are easily produced much, depending on a process.

In the present invention, a transition metal particle diameter in the catalyst body is an average particle diameter calculated from a hydrogen adsorption amount with a transition metal fine particle of the catalyst body, using a metal dispersion rate measuring apparatus (e.g. a metal dispersion rate measuring apparatus (BEL-METAL-1) manufactured by BEL Japan, Inc.). Hydrogen adsorption is measurement of metal dispersion rate which is performed by a pulse method. Measuring condition is as follows. About 0.6 g of the catalyst body for producing carbon nanotubes is introduced into a quartz tube for measurement, and is connected to a measurement system. Then, this is heated to 900° C. for 30 minutes under the Ar atmosphere and, thereafter, is allowed to cool to 400° C. After stabilized in the state of 400° C. for 1 hour, a 5% $H_2/Ar$ gas is pulsed 25 times at an amount of 0.15 $cm^3$ ($H_2$: $3.3 \times 10^{-7}$ mol). Analysis according to a metal dispersion rate measuring manual by Committee on Reference Catalyst of the Catalyst Society of Japan is performed, and a hydrogen adsorption amount relative to 1 g of a transition metal and an average particle diameter of a transition metal are calculated from a hydrogen adsorption amount of the catalyst body.

MgO flakes are an aggregate formed by aggregation of fine particles which is a primary structure, that is, a secondary structural aspect. That is, MgO flakes in the present invention exhibits a flake-like shape, and has a crystallite diameter of a primary structure of MgO. In addition, transition metal fine particles are present in a form which is incorporated into this aggregate and/or on a surface.

This crystallite diameter of a primer structure of MgO flakes can be measured by an X-ray diffraction apparatus (e.g. RINT2100UltimaPL manufactured by Rigaku Corp.).

Figure 7:
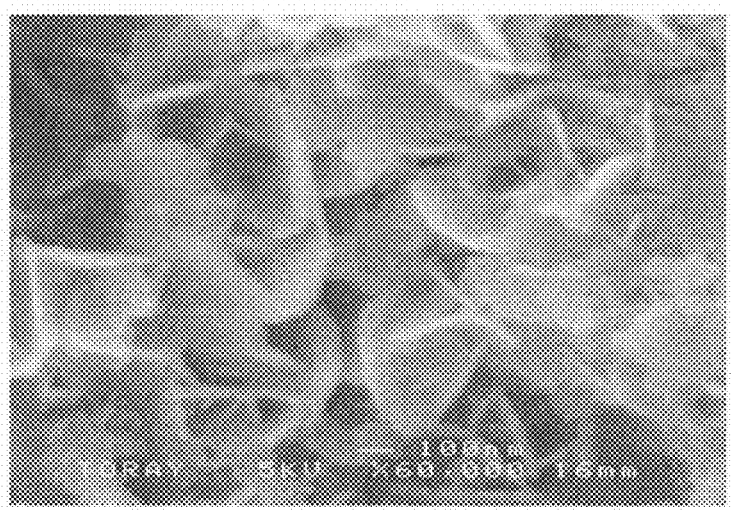
FIG. 7 shows a photograph of a catalyst body produced in Example 10, observed with a scanning electron microscope.
Figure 8:
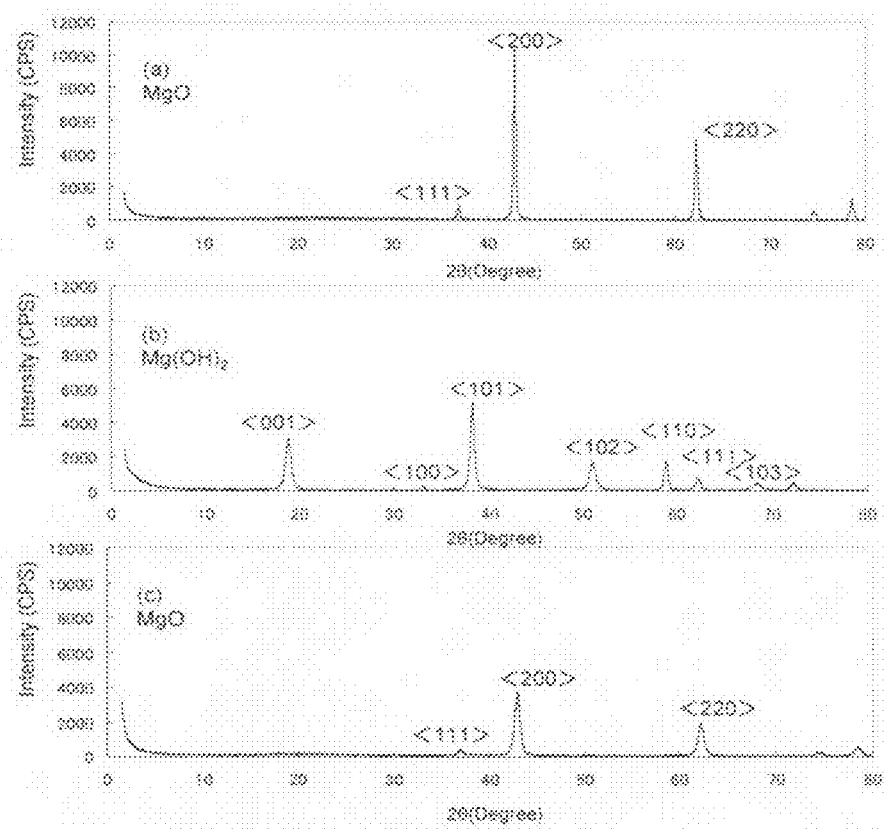
FIG. 8 shows the results of X-ray diffraction when hydrothermal treatment was performed under one of representative hydrothermal treatment conditions (MgO was hydrothermally treated at 150° C. for 6 hours) in the present invention. (a) Before hydrothermal treatment, (b) After hydrothermal treatment, (c) After burning treatment.
Figure 9:
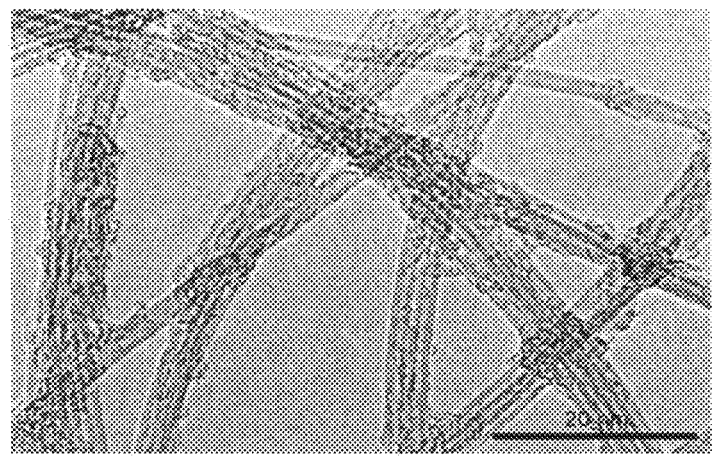
FIG. 9 shows a photograph of a composition containing carbon nanotubes obtained by producing carbon nanotubes using a catalyst body produced in Example 13, followed by purification, observed via transmission electron microscopy.

FIG. 7 is an observation image by a scanning electron microscope (SEM) (JSM-6301NF, manufactured by JEOL Ltd.) of the catalyst body produced by one of representative production examples in the present invention (burning treatment at 600° C. for 3 hours under the atmosphere after hydrothermal treatment at 200° C. for 2 hours). In addition, FIG. 8 is X-ray diffraction result before and after hydrothermal treatment and after burning when hydrothermal treatment is performed by one of representative hydrothermal treatment conditions in the present invention (MgO is hydrothermally treated at 150° C. for 6 hours). For X-ray diffraction measurement, a powdery sample was mounted in a powder X-ray diffraction apparatus, operation was performed from 1.5° to 80°, and analysis was performed. An X-ray source is CuKα ray. A step width is 0.010°, and a measuring time is 1.0 second. Before the hydrothermal reaction, peaks derived from MgO were measured (FIG. 8(a)). After the hydrothermal reaction, peaks became peaks derived from $Mg(OH)_2$ (FIG. 8(b)). After burning, peaks returned to peaks derived from MgO (FIG. 8(c)). A half-value width on a <200> plane of MgO after burning was 0.77 deg, and a crystallite diameter was obtained using the equation of Scherrer. A crystallite diameter was 11 nm.

It is preferable that a fine particle which is a primary structure of MgO flakes is small, in that single-walled and double-walled carbon nanotubes are easily produced. It is preferable that a half-value width of a 200 plane observed from X-ray diffraction result is 0.6 to 0.95 deg, that is, 5 to 20 nm in terms of a crystallite diameter.

The catalyst body of the present invention has preferably an average length in a long side direction of 0.05 to 10 μm, and an average thickness of 1 to 50 nm, more preferably an average length in a long side direction of 0.1 to 1.0 μm, and an average thickness of 10 to 50 nm, for obtaining a suitable bulk density, and from respect that the catalyst body can be effectively present as a fine substrate at production of carbon nanotubes. The average length of the catalyst body is obtained by measuring a magnitude of 100 catalyst bodies from SEM image, and taking an arithmetic average. At this time, observation is performed at magnification of SEM of 60,000. In addition, as a thickness, a length in a thickness direction of the catalyst body observed with SEM is measured and, as a length in a long side direction, a length in a plane direction of the catalyst body observed with SEM is measured as a straight line distance.

When carbon nanotubes are produced from the flake-like catalyst body for producing carbon nanotubes of the present invention, single-walled to quadruple-walled or quintuple or more-walled carbon nanotubes are produced, and carbon nanotubes having a high double-wall content are obtained. When produced by a preferable aspect, in the double-walled carbon nanotubes, an average outer diameter is in the range of 1 to 2.5 nm and, further, carbon nanotubes in which an outer diameter of 1.0 to 2.0 nm is contained at 50% or more are obtained.

It is difficult to measure a length of one carbon nanotube of single-walled and/or double walled carbon nanotubes, but the length is generally thought to be 1 to 5 µm.

When the composition containing carbon nanotubes is produced by employing the flake-like catalyst body for producing carbon nanotubes of the present invention, a transition metal fine particle used in production of carbon nanotubes in the state immediately after production (As-made) is 50 to 95% relative to a whole transition metal fine particle, being very highly active. This is because a transition metal particle diameter can be controlled to a size suitable for producing single-walled and/or double-walled carbon nanotubes, by making a content of a transition metal fine particle in the range of 0.1 to 1.0 wt % and, further, by formulating into a flake-like secondary structure, carbon nanotubes can be highly dispersed without aggregating the fine particles, and there is no inhibition of growth of carbon nanotubes.

A process for producing the catalyst body for producing carbon nanotubes is not particularly limited. For example, a support such as magnesium, alumina, silica, zeolite, calcia, and titania is impregnated into a nonaqueous solution (e.g. methanol solution) or an aqueous solution in which a metal salt of a transition metal has been dissolved, the support is sufficiently dispersed and mixed, and dried. In addition, thereafter, a metal body may be heated at a high temperature (100 to 600° C.) in the atmosphere, or in an inert gas such as nitrogen, argon and helium, or in vacuum (impregnation method). Alternatively, a support such as magnesia is impregnated into an aqueous solution in which a metal salt of a transition metal has been dissolved, the mixture is sufficiently dispersed and mixed, and is reacted under heating and pressurization, thereafter, this may be heated at a high temperature in the atmosphere or in an inert gas such as nitrogen (hydrothermal method). For obtaining a flake-like catalyst body, a hydrothermal method is preferable.

As a process for producing the catalyst body for producing carbon nanotubes by a hydrothermal method, a Group 8 to Group 10 transition metal compound and a Mg compound are heated to 100 to 250° C. under a pressure in water to obtain a catalyst precursor by a hydrothermal reaction. Then, the catalyst precursor is heated to 400 to 1200° C., thereby, MgO flakes containing a transition metal is obtained. By performing a hydrothermal reaction, the transition metal compound and the Mg compound are hydrolyzed, respectively, and become a composite hydroxide via dehydration polycondensation. Thereby, a catalyst precursor in the state where a transition metal is highly dispersed in Mg hydroxide is obtained.

As the transition metal compound at that time, at least one of a nitric acid salt, a nitrous acid salt, a carbonic acid salt, an acetic acid salt, a citric acid salt, an ammonium citrate salt, acetyl acetonate, an oxide and a hydroxide is preferable. An ammonium citrate salt, a nitric acid salt, an acetic acid salt, or a citric acid salt is more preferable. Among them, iron (III) citrate ammonium, or iron nitrate is preferably used.

As the Mg compound, a Mg compound selected from a nitric acid salt, a nitrous acid salt, a sulfuric acid salt, an ammonium sulfate salt, a carbonic acid salt, an acetic acid salt, a citric acid salt, an oxide and a hydroxide is preferable, and an oxide is more preferable.

In addition, water and the Mg compound are mixed at a molar ratio of preferably 4:1 to 100:1, more preferably 9:1 to 50:1, further preferably 9:1 to 30:1.

In addition, the transition metal compound and the Mg compound are mixed, and concentrated to dryness in advance to obtain a product, and the product may be mixed and stirred in water to perform a hydrothermal reaction, and in order to simplify a step, it is preferable that the transition metal compound and the Mg compound may be subjected to a hydrothermal reaction by directly adding them to water.

The hydrothermal reaction is performed under heating and pressurizing. It is preferable that a mixture in the suspended state is heated in the range of 100° C. to 250° C. in a pressure resistant container such as an autoclave, to generate a self-generating pressure. A heating temperature is more preferably in the range of 100 to 200° C. In addition, a pressure may be applied by adding an inert gas. A heating time at the hydrothermal reaction is closely associated with a heating temperature, and the reaction is usually performed for around 30 minutes to 10 hours, and as a temperature is higher, a heating time is shorter. For example, when a hydrothermal reaction is performed at 250° C., a heating time is preferably 30 minutes to 2 hours, and, when a hydrothermal reaction is performed at 100° C., 2 to 10 hours is preferable. A pressure is preferably around 4 to 150 kgf/cm$^2$.

A mixture containing a catalyst precursor after the hydrothermal reaction has become a slurry-like suspension. In the present invention, by filtration or centrifugation, the mixture can be easily solid-liquid separated to obtain a catalyst precursor. More preferable is filtration, and filtration may be either suction filtration or natural filtration. The conventional process for producing a carbon nanotube catalyst body generally produces a catalyst body by concentration to dryness or evaporation dryness of a mixture containing water, when a transition metal compound is supported on MgO. This is because when solid liquid separation is performed by filtration, a transition metal compound which has not adsorbed onto MgO is also filtered, and a predetermined amount of the transition metal compound cannot be supported on MgO. On the other hand, when the process of the present invention is used, by performing the hydrothermal reaction upon production of a catalyst precursor, the transition metal compound and the MgO compound are hydrolyzed, respectively, to obtain a composite hydroxide via dehydration polycondensation. Thereby, a transition metal becomes in the state where it is highly dispersed in Mg hydroxide, and an unreacted transition metal compound almost disappears in water. Therefore, solid-liquid separation by filtration or centrifugation becomes possible. In filtration or centrifugation, an energy consumed amount is small, being preferable.

After hydrothermal treatment, the catalyst precursor which has been subjected to solid-liquid separation is a composite hydroxide of a transition metal and Mg, and this becomes a composite oxide of a transition metal and Mg by heating. Heating can be performed in the atmosphere, or in an inert gas such as nitrogen, argon and helium, and heating is performed preferably in the range of 400 to 1000° C., further preferably in the range of 400 to 700° C. A heating time is preferably in the range of 1 to 5 hours. Since a catalyst precursor before heating contains mainly Mg hydroxide, the precursor takes a flake-like primary structure. When a heating temperature is too high, sintering occurs upon dehydration, the precursor cannot maintain a flake-like secondary structure, and takes a structure of a sphere, a cube or a rectangular, a transition metal is incorporated into the interior of MgO and, upon synthesis of carbon nanotubes, there is a possibility that synthesis becomes ineffective.

It is preferable that a transition metal compound contains a sulfur component, upon the hydrothermal reaction of the present invention. It is preferable that a content of the sulfur component is in the range of 0.1 to 20 wt % relative to a transition metal since a yield of the composition containing carbon nanotubes is further improved. A method of making the transition metal compound contain the sulfur component is not particularly limited, but it is preferable to use a transition metal compound containing a sulfur component jointly as the transition metal compound. It is preferable to use a sulfuric acid salt, or an ammonium sulfate salt as the transition metal compound containing a sulfur component. Among them, iron (III) sulfate ammonium is preferably used.

The sulfur component remains even after a burning step. When the sulfur component is excessively contained, since it becomes a catalyst poison, and there is a tendency that it inhibits growth of carbon nanotubes, it is preferable to add the sulfur component in the aforementioned range. Further preferable is the range of 0.1 to 10 wt %.

Carbon nanotubes can be produced by contacting a catalyst body for producing carbon nanotubes and a carbon-containing compound under heating. A contacting temperature is preferably 500 to 1200° C., more preferably 600 to 1000° C. When a temperature is low, it becomes difficult to obtain carbon nanotubes at a good yield and, when a temperature is high, a material of a reactor used is restricted.

It is preferable that the following conditions 1 to 3 are met in that the composition containing carbon nanotubes of high quality, which stands an oxidation reaction well, is effectively obtained.
(1) A contact time (W/F) obtained by dividing a weight of a catalyst body for producing carbon nanotubes by a flow rate of the carbon-containing compound is in the range of 100 to 400 min·g/L.
(2) A linear velocity of a gas containing the carbon-containing compound is in the range of 2 to 8 cm/sec.
(3) A particle diameter of an aggregate of the catalyst body for producing carbon nanotubes is in the range of 0.2 to 2 mm, and a bulk density is in the range of 0.1 to 1 g/mL.

The production conditions will be explained in detail. In the present invention, a reaction system is not particularly limited, but it is preferable to perform a reaction using a vertical fluid bed-type reactor. The vertical fluid bed-type reactor is a reactor which is arranged so that the carbon-containing compound as a raw material is flown in a vertical direction (hereinafter, referred to as "longitudinal direction" in some cases). The carbon-containing compound is flown in a direction from one end to another end of the reactor, and passes through a catalyst body layer. As the reactor, for example, a reactor having a tubular shape can be preferably used. In addition, in the above description, a vertical direction also includes a direction having a slightly declined angle relative to a vertical direction (e.g. 90°±15°, preferably 90°±10° relative to a horizontal plane). In addition, preferable is a vertical direction. In addition, a supply part and a discharge part of the carbon-containing compound are not necessarily required to be an end of the reactor, but it is satisfactory that the carbon-containing compound is flown in the direction, and passes through a catalyst body layer during the flowing stage.

The catalyst body is in the state where it is present on an entire plane in a horizontal cross-sectional direction of the reactor, and in the state where a fluid bed is formed at a reaction. By doing this, the catalyst body and the carbon-containing compound can be effectively contacted. In the case of a transverse reactor, in context of application of a gravity force, in order to realize the state where the catalyst body is present on an entire cross-sectional plane of the reactor in a perpendicular direction relative to flowing of the carbon-containing compound in order to effectively contact the catalyst body and the carbon-containing compound, it is necessary that the catalyst body is held from right and left. However, in the case of a reaction of generating the composition containing carbon nanotubes, since as a reaction proceeds, the composition containing carbon nanotubes is generated on the catalyst body, and a volume of the catalyst body is increased, a method of holding the catalyst body from left and right is not preferable. In addition, it is difficult to form a fluid bed in a transverse type. By using a vertical reactor, arranging a stand through which a gas can permeate in the reactor, and placing the catalyst body thereon, the catalyst body can be present uniformly in a cross-sectional direction of the reactor without holding the catalyst body from both sides, and a fluid bed can be also formed when the carbon-containing compound is flown in a vertical direction. The state where the catalyst body is present on an entire plane in a horizontal cross-sectional direction of the vertical fluid bed reactor is referred to as state where the catalyst body is spread entirely in a horizontal cross-sectional direction, and the stand at a bottom of the catalyst body is not seen.

In the fluid bed-type reaction, by continuously supplying the catalyst body, and continuously taking out an aggregate containing catalyst body and the composition containing carbon nanotubes after the reaction, continuous synthesis is possible, and the composition containing carbon nanotubes can be effectively obtained, being preferable. In addition, it is thought that the carbon-containing compound as a raw material and the catalyst body are uniformly contacted effectively, a reaction of synthesizing carbon nanotubes is uniformly performed, covering of a catalyst with impurities such as amorphous carbon is suppressed, and catalyst activity lasts long.

It is preferable that the reactor is heat resistant, and it is preferable that the reactor consists of a heat-resistant material made of quartz, alumina etc.

It is preferable that a time for contact (W/F) between the catalyst body for producing carbon nanotubes and the carbon-containing compound is in the range of 100 to 400 min·g/l. Herein, the time for contact is a value obtained by dividing the catalyst body (g) which was supplied during a reaction by a flow rate (L/min) of the carbon-containing compound. In order to effectively grow carbon nanotubes, it is preferable that the carbon-containing compound as a raw material gas and the catalyst body are contacted in an as short as possible time. When a time for contact is too long, a side reaction occurs, and there is a tendency that the carbon impurities such as amorphous carbon are increased. When carbon impurities are increased too much, since a catalyst metal is covered, growth of carbon nanotubes is stopped, in some times. For this reason, 400 min·g/L or less is preferable. In addition, when the time for contact is too short, an efficiency of producing carbon nanotubes is deteriorated, and a yield is greatly decreased. For this reason, 100 g·min/mL or more is preferable.

It is preferable that the linear velocity of the carbon-containing compound is 2 cm/sec or more, preferably 8 cm/sec or less. In a reaction of synthesizing carbon nanotubes, it was normal that the carbon-containing compound is flown at a low linear velocity in order to enhance a yield by increasing an efficiency of degrading the carbon-containing compound, but when the carbon-containing compound is flown at a low linear velocity under heating, a byproduct such as amorphous carbon etc. is generated at a large amount by vapor phase degradation of the carbon-containing compound itself and a side reaction on a catalyst. In order to obtain the composition containing carbon nanotubes of high quality, it is preferable that the carbon-containing compound is flown at a linear velocity of 2 cm/sec or more and 8 cm/sec or less. Further preferable is 4 cm/sec or more and 8 cm/sec or less. When a linear velocity is too great, the catalyst body rises greatly, and becomes outside a reaction temperature region (uniform heating zone), and the composition containing carbon nanotubes of high quality is not obtained.

A particle diameter and a bulk density of an aggregate of the catalyst body for producing carbon nanotubes can be important factors for obtaining carbon nanotubes of high quality. Specifically, it is preferable that a particle diameter of an aggregate of the catalyst body is in the range of 0.2 to 2 mm. In the present invention, since the carbon-containing compound is flown at a relatively high linear velocity, when a particle diameter of an aggregate of the catalyst body is less than 0.2 mm, the catalyst rises greatly in a vertical reactor, and the catalyst body becomes outside a uniform heating zone of the reactor in some cases, and it becomes difficult to obtain carbon nanotubes of high quality as in the present invention. In addition, when a particle diameter of an aggregate of the catalyst body is greater than 2 mm, since the catalyst body is moved with difficulty in a fluid bed, a so-called short path problem arises that the carbon-containing compound is flown through only a place where it most easily passes through a catalyst body layer. Therefore, a magnitude of a particle diameter is preferably in the range of 0.2 to 2 mm, further preferably in the range of 0.25 to 1.5 mm, most preferably in the range of 0.5 to 0.85 mm.

Controlling of a particle diameter of an aggregate of the catalyst body is not particularly limited, but for example, there are a method of performing sieving and a method of performing granulation from an extruder. The method of sieving is a method of performing sieving of 16 to 65 mesh to recover a granular catalyst body which stays between 16 mesh to 65 mesh, while an aggregated mass of the catalyst body is ground. As a method of grinding, any method may be used. In addition, mesh represents the number of openings present in 1 inch (25.4 mm). Sixteen mesh is 2 mm as expressed by a size of Tyler system, and 65 mesh is 0.212 mm.

In a method of granulation from an extruder, the catalyst body and water are kneaded, and extruded through various screens having opened pores having an inner diameter of 0.2 to 2.0 mm. The resulting linear aggregate of the catalyst body is ground while drying and, thereafter, sieving is performed to recover a granular catalyst body which stays between 16 to 65 mesh.

By performing sieving like this, only the catalyst body in which a particle diameter of an aggregate is in the range of 0.2 to 2 mm is obtained. In order to attain the aforementioned preferable particle diameter, opening of a sieve may be appropriately selected.

By a bulk density of the catalyst body in the range of 0.1 to 1 g/mL, an efficiency of contact between the catalyst body and the carbon-containing compound becomes good, and it becomes possible to synthesize carbon nanotubes of further higher quality effectively at a large amount. When a bulk density of the catalyst body is less than 0.1 g/mL, there is a problem that it is difficult to handle the catalyst body. In addition, when the bulk density is too small, upon contact with the carbon-containing compound, the catalyst rises greatly in a vertical reactor, and the catalyst body becomes outside a uniform heating zone of the reactor in some cases, and it becomes difficult to obtain carbon nanotubes of high quality. When a bulk density of the catalyst exceeds 1 g/mL, it becomes difficult to contact the catalyst body and the carbon-containing compound uniformly and effectively, and it also becomes difficult to obtain carbon nanotubes of high quality. When the bulk density of the catalyst body is too great, since the catalyst body is closely packed upon mounting of the catalyst body in a vertical reactor, the catalyst body cannot be uniformly contacted with the carbon-containing compound, and it becomes difficult to generate carbon nanotubes of high quality. When the bulk density of the catalyst body is in the range, since an efficiency of contact between the carbon-containing compound and a catalyst metal is increased, it becomes possible to produce uniform carbon nanotubes of high quality efficiently and at a large amount. In addition, when the bulk density of the catalyst body is too great, since the catalyst body is moved with difficulty with a fluid bed, a so-called short path problem arises that the carbon-containing compound passes through only a place where it most easily passes through a catalyst body layer. When the bulk density of the catalyst body is in the range, a fixed short path is generated with difficulty, by movement of the catalyst body. Therefore, the bulk density of the catalyst body is 0.1 g/mL or more and 1 g/mL or less. The bulk density of the catalyst body is more preferably 0.2 g/mL or more and 0.7 g/mL or less, further preferably 0.2 g/mL or more and 0.5 g/mL or less.

The bulk density is a powder mass per unit bulk volume. A method of measuring the bulk density will be shown below. The bulk density of a powder is influenced by a temperature and a humidity at measurement in some cases. The bulk density referred herein is a value measured at a temperature of 20±10° C. and a humidity of 60±10%. Using a 50 mL messcylinder as a measuring container, a powder is added so as to occupy the predetermined volume while a bottom of the messcylinder is slightly tapped. It is preferable that 10 mL or more of a powder is added upon measurement of the bulk density. Thereafter, after falling of a bottom of the messcylinder from a height of 1 cm of a floor plane is repeated 20 times, it is visually confirmed that a change rate of a volume value occupied by a powder is within ±0.2 mL, and a packing operation is completed. If there is a change of ±0.2 mL or more in a volume value visually, a powder is added while a bottom of the messcylinder is slightly tapped, falling of a bottom of the messcylinder from a height of 1 cm of a floor plane is repeated 20 times, it is visually confirmed that there is no change of ±0.2 mL or more in a volume value occupied by a powder, and operation is completed. Obtaining of a weight of a constant amount of a powder packed by the aforementioned method is repeated three times, and a value obtained by dividing its average weight by a volume occupied by a powder (=weight (g)/volume (mL)) is defined as bulk density of a powder. The catalyst body for producing carbon nanotubes to be subjected to measurement is 20 g±5 g. In addition, when an amount of the catalyst body for producing carbon nanotubes is less than the aforementioned amount, measurement is performed at an assessable amount.

By controlling both of a particle diameter and a bulk density of an aggregate catalyst body, the catalyst body and the carbon-containing compound as a raw material gas are uniformly contacted in a uniform heating zone in the vertical reactor, and carbon nanotubes of high quality can be obtained.

For controlling both of a particle diameter and a bulk density like this, for example, upon preparation of the catalyst body by supporting a catalyst metal on a support, they may be appropriately adjusted by a content of a metal to be supported and a size and specific gravity of the support while a particle diameter is controlled as described above.

In the present invention, the carbon-containing compound is not particularly limited, but preferably is hydrocarbon. The hydrocarbon may be aromatic or non-aromatic. As the aromatic hydrocarbon, benzene, toluene, xylene, cumene, ethylbenzene, diethylbenzene, trimethylbenzene, naphthalene, phenanthrene, anthracene or a mixture thereof can be used. In addition, as non-aromatic hydrocarbon, for example, methane, ethane, propane, butane, ethylene, acetylene, benzene, toluene, hexane, ethanol, methanol, propanol, or a mixture thereof can be used. Among them, non-aromatic hydrocarbon is preferable and, particularly, methane by which single-walled or double-walled carbon nanotubes are easily made is the most preferable carbon-containing compound.

The carbon-containing compound may be used as a mixture with an inert gas such as nitrogen, argon, hydrogen, helium etc., or may be used alone. It is preferable that a reaction place where a carbon gas is supplied to the catalyst body is under an inert gas, or under the vacuum atmosphere (under reduced pressure) since carbon nanotubes are obtained at a good yield.

The resulting composition containing carbon nanotubes may be utilized in the state where it is as synthesized after completing of the reaction, but it is preferable to perform purification. As a method of purification, a method of removing a support material and a catalyst metal, a method of performing oxidation reaction treatment, or a method of combination of them is good.

As the method of removing a support material and a catalyst metal, they can be removed with an acid. For example, when magnesia is used as the catalyst, and iron is used as the catalyst metal, magnesia and iron can be removed with an inorganic acid such as hydrochloric acid. By such the treatment, a remaining amount of the catalyst metal can be decreased to 3 wt % or less. The method of performing oxidation reaction treatment is as described above.

EXAMPLES

The present invention will be specifically explained below by way of Examples. The following Examples are merely shown for exemplification, and do not limit the present invention.

In Examples, synthesis of carbon nanotubes and assessment of various physical properties were performed by the following methods. In addition, in Examples, measurement of a light transmittance, a surface resistance value, a G/D ratio of carbon nanotubes, and the layer number of carbon nanotubes, and a heat resistance test were implemented by the aforementioned methods.

Catalyst Preparation Example 1

In 500 mL of methanol (manufactured by KANTO CHEMICAL CO., INC) was dissolved 2.46 g of ferric ammonium citrate (manufactured by Wako Pure Chemical Industries, Ltd.). To this solution was added 100.0 g of magnesium oxide (MJ-30 manufactured by Iwatani Chemical Industry Co., Ltd.), and the mixture was vigorously stirred with a stirrer for 60 minutes. The resulting suspension was concentrated to solid at 40° C. under reduced pressure. The resulting powder was heated to dry at 120° C. to remove methanol, thereby, a catalyst body in which a metal salt was supported in a magnesium oxide powder was obtained. A particle diameter in the range of 20 to 32 mesh (0.5 to 0.85 mm) was recovered while the resulting solid matter was finely-divided with a mortar on a sieve. A content of iron contained in the resulting catalyst body was 0.38 wt %. In addition, a bulk density was 0.61 g/mL.

Catalyst Preparation Example 2

In 6.2 kg of ion-exchanged water was dissolved 24.6 g of iron (III) citrate ammonium (manufactured by Wako Pure Chemical Industries, Ltd.). To this solution was added 1000 g of magnesium oxide (MJ-30 manufactured by Iwatani Chemical Industry Co., Ltd.), the mixture was vigorously stirred with a stirrer for 60 minutes, and the suspension was introduced into a 10 L autoclave container. At that time, as a washing liquid, 0.5 kg of ion-exchanged water was used. This was heated to 160° C. in the closed state, and was retained for 6 hours. Thereafter, the autoclave container was allowed to cool, a slurry-like cloudy substance was taken out from the container, excessive water was filtered by suction filtration, and a small amount of water contained in the filtration product was heated to dry in a drying machine at 120° C. A particle diameter in the range of 20 to 32 mesh (0.5 to 0.85 mm) was recovered while the resulting solid matter was finely-divided with a mortar on a sieve. The granular catalyst body was introduced in an electric furnace, and heated at 600° C. for 3 hours under the atmosphere. A bulk density was 0.32 g/mL. In addition, when the filtrate was analyzed with an energy dispersive X-ray analysis apparatus (EDX), iron was not detected. From this, it was confirmed that an all amount of added iron (III) citrate ammonium was supported by magnesium oxide. Further, from results of EDX analysis of the catalyst body, a content of iron contained in the catalyst body was 0.39 wt %.

Catalyst Preparation Example 3

In 6.2 kg of ion-exchanged water was dissolved 24.6 g of iron (III) citrate ammonium (manufactured by Wako Pure Chemical Industries, Ltd.). To this solution was added 1000 g of magnesium oxide (MJ-30 manufactured by Iwatani Chemical Industry Co., Ltd.), the mixture was vigorously stirred with a stirrer for 60 minutes, and the suspension was introduced into a 10 L autoclave container. At this time, as a washing liquid, 0.5 kg of ion-exchanged water was used. This was heated to 160° C. in the closed state, and retained for 6 hours. Thereafter, the autoclave container was allowed to cool, a slurry-like cloudy substance was taken out from the container, excessive water was filtered by suction filtration, and a small amount of water in the filtration product was heated to dry in a drying machine at 120° C. Ion-exchanged water was added to the resulting solid matter at a ratio of solid matter/ion-exchanged water of 1/1, the materials were mixed with a kneader for 10 minutes, and this was extruded with an extruder through a pore having an inner diameter of 0.8 mm. After extrusion, the material was ground while drying, and granulated with a 20 to 32 mesh (0.5 to 0.85 mm) sieve. The granular catalyst body was introduced into an electric furnace, and heated at 600° C. for 3 hours under the atmosphere. A bulk density was 0.47 g/mL. In addition, when the filtrate was analyzed with an energy dispersive X-ray analysis apparatus (EDX), iron was not detected. From this, it was confirmed that an all amount of added iron (III) citrate ammonium was supported by magnesium oxide. Further, from results of EDX analysis of the catalyst body, a content of iron contained in the catalyst body was 0.38 wt %.

Catalyst Preparation Example 4

In 500 mL of methanol (manufactured by KANTO CHEMICAL CO., INC) was dissolved 2.46 g of ferric ammonium citrate (manufactured by Wako Pure Chemical Industries, Ltd.). To this solution was added 100.0 g of magnesium oxide (MJ-30 manufactured by Iwatani Chemical Industry Co., Ltd.), and the mixture was vigorously stirred with a stirrer for 60 minutes. The resulting suspension was concentrated to solid at 40° C. under reduced pressure. The resulting powder was heated to dry at 120° C. to remove methanol, thereby, a catalyst body in which a metal salt was supported by a magnesium oxide powder was obtained. The resulting solid matter was finely-divided with a mortar on a sieve, until a particle diameter became 32 mesh (0.5 mm) or less, while the solid matter was finely-divided with a mortar. The resulting granules contained around 55 wt % of granules which passed 60 mesh (0.25 mm). A content of iron contained in the resulting catalyst body was 0.37 wt %. In addition, a bulk density was 0.78 g/mL.

Example 1

Preparation Example 1 of Composition Containing Carbon Nanotubes

Figure 4:
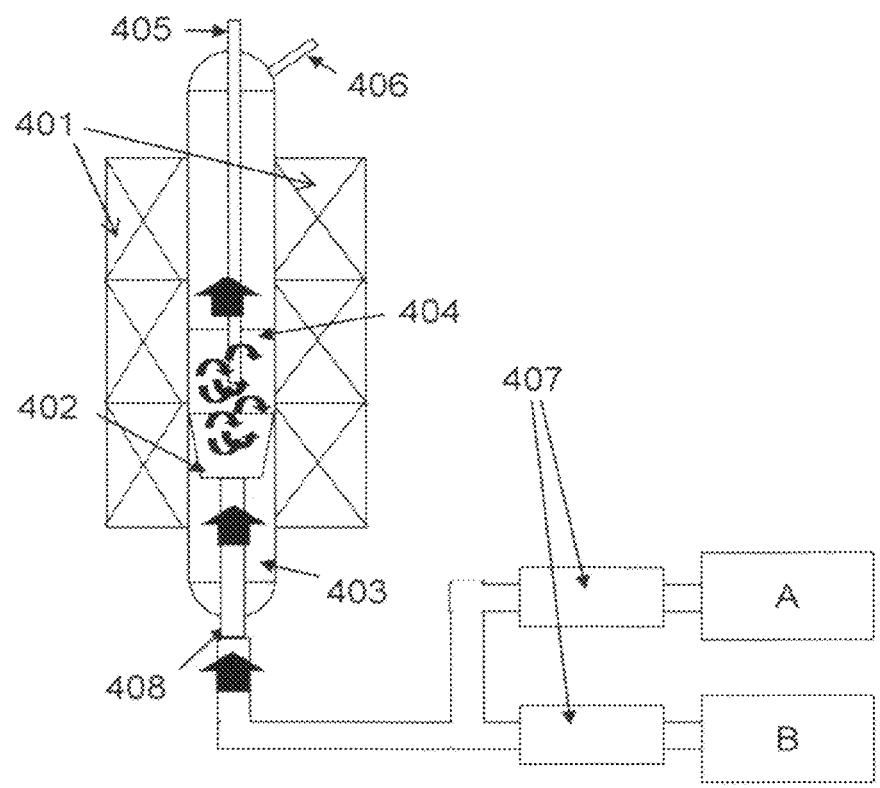
FIG. 4 shows an outline view of an apparatus of a chemical vapor deposition method for producing a composition containing carbon nanotubes.

Synthesis of carbon nanotubes was performed using an apparatus shown in FIG. 4. A reactor 403 is a cylindrical quartz tube having an inner diameter of 75 mm and a length of 1100 mm. The quartz tube is provided with a quartz sintering plate 402 at a central part, and is provided with a mixed gas introducing tube 408 which is an inert gas and raw material gas supplying line at a lower part of the quartz tube, and a gas discharging tube 406 at an upper part. Further, the quartz tube is provided with three electric furnaces 401 as a heating equipment surrounding a circumference of the reactor, so that the reactor can be retained at an arbitrary temperature. In addition, the quartz tube is provided with a thermometer 405 for detecting a temperature in the reactor.

A catalyst body layer 404 was formed by introducing 132 g of the solid catalyst body prepared in Catalyst Preparation Example 1 on the quartz sintering plate at a central part of the reactor which had been arranged in a perpendicular direction. A nitrogen gas was supplied at 16.5 L/min from a reactor bottom to a reactor upper part direction using a mass flow controller 407, while the catalyst body layer was heated, until an inner temperature of the reactor became about 860° C. Thereafter, a methane gas was further introduced for 60 minutes at 0.78 L/min using a mass flow controller 407, while a nitrogen gas was supplied, and the gas was flown so as to pass through the catalyst body layer to perform a reaction. A contact time (W/F) obtained by dividing a weight of the solid catalyst body thereupon by a flow rate of methane was 169 min·g/L, and a linear velocity of the gas containing methane was 6.55 cm/sec. Introduction of the methane gas was stopped, and the quartz reactor was cooled to room temperature while a nitrogen gas was flown at 16.5 L/min.

Heating was stopped, the reactor was allowed to stand to room temperature and, after a temperature became room temperature, a composition containing carbon nanotubes containing the catalyst body and carbon nanotubes was taken out from the reactor.

Example 2

Preparation Example 2 of Composition Containing Carbon Nanotubes

The composition was produced by using the same apparatus and manner as those of Preparation Example 1 of a composition containing carbon nanotubes, and using Catalyst Preparation Example 2 as a catalyst body.

Example 3

Preparation Example 3 of Composition Containing Carbon Nanotubes

The composition was produced by using the same apparatus and operation as those of Example 1, and using Catalyst Preparation Example 3 as a catalyst body.

Reference Example 1

Preparation Example 4 of Composition Containing Carbon Nanotubes

The composition was produced by using the same apparatus and operation as those of Example 1, and using Catalyst Preparation Example 4 as a catalyst body.

[Assessment of Carbon Nanotubes by Raman Spectroscopic Analysis]

A powder sample was mounted in a resonance Raman spectrophotometer (INF-300 manufactured by Horiba Jobin Yvon S.A.S.), and measurement was performed using a laser wavelength of 633 nm. Upon measurement, analysis was performed at three separate places, a height of the G band and a height of the D band were measured, and a G/D ratio was obtained as a ratio of respective heights, and was expressed as an additive average.

[Assessment of Electrical Conductivity]

Electrical conductivity of the composition containing carbon nanotubes was measured by preparing a dispersion of a composition containing carbon nanotubes having a concentration of 0.09 wt %, coating the dispersion on a PET film ((Lumirror® U46) manufactured by Toray Industries, Inc., light transmittance 91%, 15 cm×10 cm) using a bar coater, and measuring a surface resistance value using Loresta EP MCP-T360 (manufactured by Mitsubishi Chemical Analytech Co., Ltd), and Hiresta UP MCP-HT450 (manufactured by Mitsubishi Chemical Analytech Co., Ltd, 10 V, 10 seconds).

[High Resolution Transmission Electron Microscope Image]

In about 2 mL of ethanol was placed about 0.5 mg of the composition containing carbon nanotubes, and dispersing treatment was performed for about 15 minutes using an ultrasound bath. The dispersed sample was added dropwise to a grid, and this was dried. The grid with the sample coated thereon like this was mounted in a transmission electron microscope (JEM-2100 manufactured by JEOL Ltd.), and measurement was performed. Measurement was performed at magnification of 50000 to 500000, respectively, and observation of an outer diameter distribution and a distribution of the layer number of carbon nanotubes was performed at magnification of 400000. An acceleration voltage was 120 kV.

Example 4

Heating Oxidation Treatment

The composition containing the catalyst body and carbon nanotubes, obtained in Preparation Example 4 of a composition containing carbon nanotubes, was transferred to an evaporation dish, and this was allowed to stand in an electric furnace which had been heated to a set temperature of 446° C. in advance, and was subjected to heating oxidation treatment for 3 hours.

The composition (115 g) after heating oxidation treatment was stirred in 2000 mL of 4.8 N hydrochloric acid for 1 hour to dissolve iron which is a catalyst metal and MgO which is a support thereof. After the resulting black suspension was filtered, the filtration product was placed again in 400 mL of 4.8 N hydrochloric acid, subjected to de-MgO treatment, and filtered. This operation was repeated three times (de-MgO treatment). The finally obtained filtration product containing carbon nanotubes was heated to dry at 120° C. overnight to obtain a composition containing carbon nanotubes.

In a thermogravimetric analysis apparatus (TGA-60 manufactured by Shimadzu Corporation) was mounted about 1 mg of a sample, and a temperature was increased from room temperature to 900° C. at a temperature increasing rate of 10° C./min in the air. Change in a weight thereupon was measured, and a weight loss curve was differentiated with a time to obtain a differential thermogravimetric curve (DTG) (X-axis is temperature (° C.), Y-axis is DTG (mg/min)). A high temperature combustion peak was 725° C., and high temperature weight loss was 37.7%. A low temperature combustion peak was 580° C., and low temperature weight loss was 51%. An inflection point was 640° C. (FIG. 5). TG(H)/(TG(L)+TG(H))=0.43.

Figure 6:
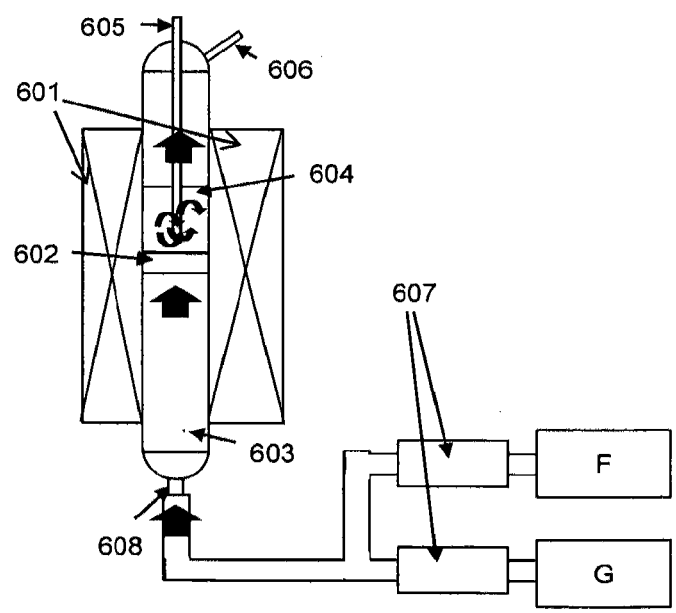
FIG. 6 shows an outline view of a vertical heating oxidation reaction apparatus.

From the results of thermogravimetric analysis, heating oxidation treatment of the composition containing carbon nanotubes was performed in a vertical heating oxidation reaction apparatus shown in FIG. 6. A reactor 603 is a cylindrical quartz tube having an inner diameter of 32 mm and a length of 1200 mm. The reactor is provided with a quartz sintering plate 602 at a central part, and is provided with a gas supply line 608 at a quartz tube lower part, and a gas discharge line 606 at an upper part. Further, the reactor is provided with a heater 601 surrounding a circumference of a reactor, so that the reactor can be retained at an arbitrary temperature. In addition, the reactor is provided with a thermometer 605 for detecting a temperature in the reactor.

On the quartz sintering plate 602 was set 0.310 g of the composition containing carbon nanotubes. Then, supply of an air at 500 mL/min from a gas supply line 608 was initiated using a mass flow controller 607, and the air was flown so as to pass through a layer of a composition containing carbon nanotubes 604. The interior of the reactor was heated to an inflection point temperature of 640° C. at a temperature increasing rate of 10° C./min. At the time at which a temperature reached the inflection point temperature of 640° C., supply of the air gas was stopped, a nitrogen gas was supplied from the gas supply line 608 at a flow rate of 2000 mL/min using a mass flow controller 607, and the quartz tube was allowed to cool to room temperature.

Thermogravimetric analysis was performed again and, as a result, TG(H)/TG(L)+TG(H)) was 1.00. From the DTG curve, a high temperature combustion peak was 729° C. A yield relative to an unpurified composition containing carbon nanotubes from which a catalyst body had been removed by 4.8 N hydrochloric acid treatment, and which had not been subjected to heating oxidation was 5.27%.

Figure 2:
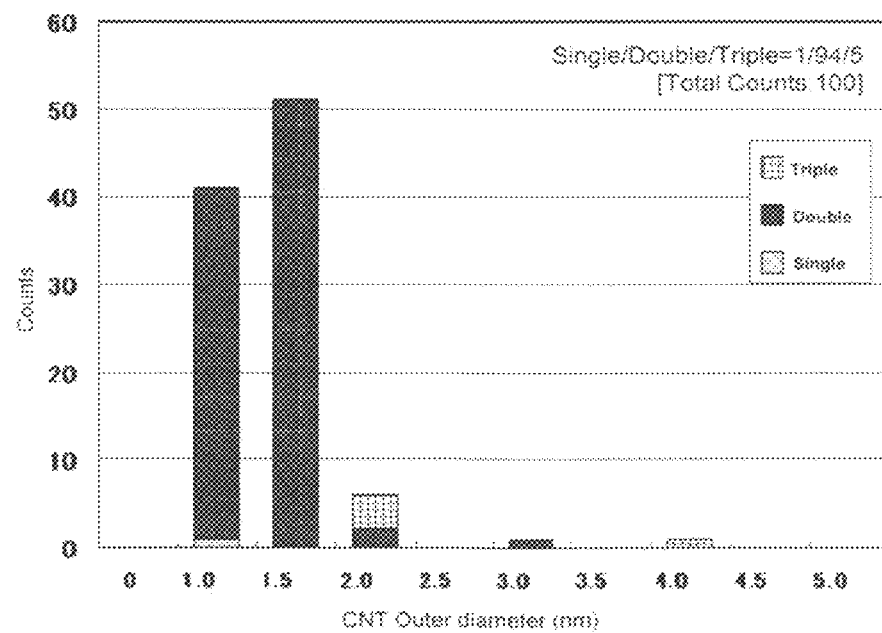
FIG. 2 shows an outer diameter distribution of a composition containing carbon nanotubes of Example 4.

When the thus obtained composition containing carbon nanotubes was observed via high resolution transmission electron microscopy, as shown in FIG. 1, carbon nanotubes were constructed of a clean graphite layer, and carbon nanotubes having the layer number of 2 were observed. In addition, double-walled carbon nanotubes occupied 94 of a total number (100) of observed carbon nanotubes, and an average outer diameter was 1.7 nm (FIG. 2). In addition, as a result of Raman spectroscopic analysis of the composition containing carbon nanotubes at a wavelength of 633 nm at that time, a G/D ratio was 122. The composition containing carbon nanotubes obtained by the heating oxidation treatment was stirred in 100 mL of ion-exchanged water for 2 hours, and filtered under reduced pressure, and the composition containing carbon nanotubes was stored in the wet state containing water.

Example 5

Heating Oxidation Treatment+Liquid Phase Oxidation Treatment

Concentrated nitric acid (first class Assay 60 to 61% manufactured by Wako Pure Chemical Industries, Ltd.) at a weight which is about 300-fold a dry weight of the composition containing carbon nanotubes in the wet state obtained in Example 4 was added. Thereafter, the mixture was heated to reflux while stirred in an oil bath at about 140° C. for 25 hours. After heating and reflux, a nitric acid solution containing the composition containing carbon nanotubes was diluted 3-fold with ion-exchanged water, and suction-filtered. The suspension of the filtration product was washed with ion-exchanged water until neutral, and the composition containing carbon nanotubes was stored in the wet state.

At this time, a weight of the whole composition containing carbon nanotubes in the wet state containing water was 980 mg (concentration of composition containing carbon nanotubes: 8.43 wt %). As a result of thermogravimetric analysis of the composition containing carbon nanotubes, TG(H)/(TG(L)+TG(H)) was 0.85. From the DTG curve, a high temperature combustion peak was 793° C., and a low temperature combustion peak was 489° C. It is presumed that, by liquid phase heating oxidation treatment with nitric acid, carbon nanotubes were damaged, and low temperature weight loss became great. In addition, as a result of Raman spectroscopic analysis of the composition containing carbon nanotubes at a wavelength of 633 nm, a G/D ratio was 122.

When this composition containing carbon nanotubes was observed via high resolution transmission electron microscopy, double-walled carbon nanotubes occupied 94 of a total number (100) of observed carbon nanotubes, and an average outer diameter was 1.7 nm. A yield relative to an unpurified composition containing carbon nanotubes from which a catalyst body had been removed by 4.8 N hydrochloric acid treatment, and which had not been subjected to heating oxidation or liquid phase oxidation was 2.06%.

The resulting composition containing carbon nanotubes in the wet state at 15 mg in terms of a dry weight, and 4.5 g of an aqueous solution of 1 wt % carboxymethylcellulose sodium (90 kDa manufactured by Sigma corporation, 50 to 200 cps) were weighed, and ion-exchanged water was added to 10 g. A pH was adjusted to 4.0 using nitric acid, and the mixture was subjected to dispersing treatment for 7.5 minutes at an output of an ultrasound homogenizer of 20 W under ice-cooling, to prepare a carbon nanotube liquid. During dispersing, a liquid temperature was adjusted to 10° C. or lower. The resulting liquid was centrifuged with a high speed centrifuge at 10000 G for 15 minutes to obtain 9 mL of the supernatant. Thereafter, water and ethanol were added to perform adjustment so that a concentration of the composition containing carbon nanotubes as a final concentration became 0.08 wt %, to obtain a dispersion. At that time, ethanol was adjusted so as to be contained at 5 vol %.

The dispersion was coated on a polyethylene terephthalate (PET) film ((Lumirror® U46 manufactured by Toray Industries, Inc.), light transmittance 90.3%, 15 cm×10 cm) using a bar coater, this was air-dried, rinsed with distilled water, and dried in a drier at 120° C. for 2 minutes to immobilize the composition containing carbon nanotubes. A surface resistance value of the resulting coated film was $4.13 \times 10^2 \Omega/\square$, and a light transmittance was 94.9% (transparent electrically conductive film 85.7%/PET film 90.3%=0.949) and high electrically conductivity and high, transparency were exhibited.

In addition, the composition containing carbon nanotubes in the wet state was taken out so that a dry weight became 20 mg, a bulk membrane of carbon nanotubes was prepared by the aforementioned method, and a volume resistance value was measured. As a result, the value was $4.0 \times 10^{-4}$ $\Omega \cdot cm$.

Example 6

Liquid Phase Oxidation Treatment

The composition (55 g) containing a catalyst body and carbon nanotubes, obtained in Preparation Example 2 of a composition containing carbon nanotubes, was stirred in 2000 mL of 4.8 N hydrochloric acid for 1 hour to dissolve iron which is a catalyst metal and MgO which is a support thereof. After the resulting black suspension was filtered, the filtration product was placed again in 400 mL of 4.8 N hydrochloric acid, subjected to de-MgO treatment, and filtered. This operation was repeated three times (de-MgO treatment), Thereafter, the suspension of the filtration product was washed with ion-exchanged water until neutral, and the composition containing carbon nanotubes was retained in the wet state containing water. At that time, a weight of the whole composition containing carbon nanotubes in the wet state containing water was 60.0 g (concentration of composition containing carbon nanotubes: 2.26 wt %).

As a result of thermogravimetric analysis of the composition containing carbon nanotubes, TG(H)/(TG(L)+TG(H)) was 0.22. From the DTG curve, a high temperature combustion peak was 626° C., and a low temperature combustion peak was 531° C. In addition, as a result of Raman spectroscopic analysis of the composition containing carbon nanotubes at a wavelength of 633 nm, a G/D ratio was 22.

Concentrated nitric acid (first class Assay 60 to 61% manufactured by Wako Pure Chemical Industries, Inc.) at a weight which is about 300-fold a dry weight of the resulting composition containing carbon nanotubes in the wet state was added. Thereafter, the mixture was heated to reflux while it was stirred in an oil bath at about 140° C. for 25 hours. After heating and reflux, a nitric acid solution containing the composition containing carbon nanotubes was diluted 3-fold with ion-exchanged water, and suction-filtered. After the suspension of the filtration product was washed with ion-exchanged water until neutral, the composition containing carbon nanotubes was stored in the wet state containing water.

After a part of a sample was dried, as a result of thermogravimetric analysis, TG(H)/(TG(L)+TG(H)) was 0.79. From the DTG curve, a high temperature combustion peak was 725° C., and a low temperature combustion peak was 452° C. In addition, as a result of Raman spectroscopic analysis of the composition containing carbon nanotubes at a wavelength of 633 nm, a G/D ratio was 79.

When this composition containing carbon nanotubes was observed via high resolution transmission electron microscopy, double-walled carbon nanotubes occupied 90 of a total number (100) of observed carbon nanotubes, and an average outer diameter was 1.7 nm. At that time, a weight of the whole composition containing carbon nanotubes in the wet state containing water was 3.351 g (concentration of composition containing carbon nanotubes: 5.29 wt %). A yield relative to an unpurified composition containing carbon nanotubes from which a catalyst body had been removed with 4.8 N hydrochloric acid, and which had not been subjected to heating oxidation or liquid phase oxidation was 13.1%.

The resulting composition containing carbon nanotubes in the wet state at 15 mg in terms of a dry weight, and 4.5 g of an aqueous solution of 1 wt % carboxymethylcellulose sodium (90 kDa manufactured by Sigma corporation, 50 to 200 cps) were weighed, and ion-exchanged water was added to 10 g. A pH was adjusted to 4.0 using nitric acid, and dispersing treatment was performed for 7.5 minutes at an output of an ultrasound homogenizer of 20 W under ice-cooling, to prepare a carbon nanotube liquid. During dispersing, a liquid temperature was adjusted to 10° C. or lower. The resulting liquid was centrifuged with a high speed centrifuge at 10000 G for 15 minutes to obtain 9 mL of the supernatant. Thereafter, water and ethanol were added to perform adjustment so that a concentration of the composition containing carbon nanotubes as a final concentration became 0.08 wt %, thereby, a dispersion was obtained. At that time, ethanol was adjusted so as to be contained at 5 vol %.

The dispersion was coated on a polyethylene terephthalate (PET) film ((Lumirror® U46) manufactured by Toray Industries, Inc., light transmittance 90.3%, 15 cm×10 cm), using a bar coater, and this was air-dried, rinsed with distilled water, and dried in a dryer at 120° C. for 2 hours to immobilize the composition containing carbon nanotubes. A surface resistance value of the resulting coated film was $3.01 \times 10^2 \Omega/\square$, and a light transmittance was 94.9% (transparent electrically conductive film 85.7%/PET film 90.3%=0.949), and high electrical conductivity and high transparency were exhibited.

In addition, the composition containing carbon nanotubes in the wet state was taken out so that a dry weight became 20 mg, a bulk membrane of carbon nanotubes was prepared by the aforementioned method and, thereafter, a volume resistance value was measured. As a result, the value was $3.9 \times 10^{-4}$ $\Omega \cdot cm$.

Example 7

Liquid Phase Oxidation Treatment

The composition (130 g) containing a catalyst body and carbon nanotubes, obtained in Preparation Example 3 of a composition containing carbon nanotubes, was stirred in 2000 mL of 4.8 N hydrochloric acid for 1 hour to dissolve iron which is a catalyst metal and MgO which is a support thereof. After the resulting black suspension was filtered, the filtration product was placed again in 400 mL of 4.8 N hydrochloric acid, subjected to de-MgO treatment, and filtered. This operation was repeated three times (de-MgO treatment). Thereafter, after the suspension of the filtration product was washed with ion-exchanged water until neutral, the composition containing carbon nanotubes was stored in the wet state containing water. At that time, a weight of the whole composition containing carbon nanotubes in the wet state containing water was 102.7 g (concentration of composition containing carbon nanotubes: 3.12 wt %).

As a result of thermogravimetric analysis of the whole composition containing carbon nanotubes, TG(H)/(TG(L)+TG(H)) was 0.19. From the DTG curve, a high temperature combustion peak was 591° C., and a low temperature combustion peak was 517° C. In addition, as a result of Raman spectroscopic analysis of the composition containing carbon nanotubes at a wavelength of 633 nm, a G/D ratio was 13.

Concentrated nitric acid (first class Assay 60 to 61% manufactured by Wako Pure Chemical Industries, Ltd.) at a weight which is about 300-fold a dry weight of the resulting composition containing carbon nanotubes in the wet state was added. Thereafter, the mixture was heated to reflux while it was stirred in an oil bath at about 140° C. for 25 hours. After heating and reflux, a nitric acid solution containing the composition containing carbon nanotubes was diluted 3-fold with ion-exchanged water, and suction-filtered. The suspension of the filtration product was washed with ion-exchanged water until neutral, and the composition containing carbon nanotubes was stored in the wet state containing water.

After a part of a sample was dried, as a result of thermogravimetric analysis, TG(H)/(TG(L)+TG(H)) was 0.79. From the DTG curve, a high temperature combustion peak was 751° C., and a low temperature combustion peak was 448° C. At that time, a weight of the whole composition containing carbon nanotubes in the wet state containing water was 3.351 g (concentration of composition containing carbon nanotubes: 5.29 wt %). In addition, as a result of Raman spectroscopic analysis of the composition containing carbon nanotubes at a wavelength of 633 nm, a G/D ratio was 43.

When this composition containing carbon nanotubes was observed via high resolution transmission electron microscopy, double-walled carbon nanotubes occupied 92 of a total number (100) of observed carbon nanotubes, and an average outer diameter was 1.7 nm. A yield relative to an unpurified composition containing carbon nanotubes from which a catalyst body had been removed by 4.8 N hydrochloric acid treatment, and which had not been subjected to heating oxidation or liquid phase oxidation was 10.4%.

The resulting composition containing carbon nanotubes in the wet state at 15 mg in terms of a dry weight, and 4.5 g of an aqueous solution of 1 wt % carboxymethylcellulose sodium (90 kDa manufactured by Sigma corporation, 50 to 200 cps) were weighted, and ion-exchanged water was added to 10 g. A pH was adjusted to 4.0 using nitric acid, and dispersing treatment was performed for 7.5 minutes at an output of an ultrasound homogenizer of 20 W under ice-cooling, to prepare a carbon nanotube liquid. During dispersing, a liquid temperature was adjusted to 10° C. or lower. The resulting liquid was centrifuged with a high speed centrifuge at 10000 G for 15 minutes to obtain 9 mL of the supernatant. Thereafter, water and ethanol were added to perform adjustment so that a concentration of the composition containing carbon nanotubes as a final concentration became 0.08 wt %, thereby, a dispersion was obtained. At that time, ethanol was adjusted so as to be contained at 5 vol %.

The dispersion was coated on a polyethylene terephthalate (PET) film ((Lumirror® U46) manufactured by Toray Industries, Inc., light transmittance 90.3%, 15 cm×10 cm) using a bar coater, and this was air-dried, rinsed with distilled water, and dried in a drier at 120° C. for 2 minutes, to immobilize the composition containing carbon nanotubes. A surface resistance value of the resulting coated film was $3.01 \times 10^2 \Omega/\square$, and a light transmittance was 95.2% (transparent electrically conductive film 86.0%/PET film 90.3%=0.952), and high electrical conductivity and high transparency were exhibited.

In addition, the composition containing carbon nanotubes in the wet state was taken out so that a dry weight became 20 mg, a bulk membrane of carbon nanotubes was prepared by the aforementioned method, and a volume resistance value was measured. As a result, the value was $3.9 \times 10^{-4}$ $\Omega \cdot cm$.

Example 8

Heating Oxidation Treatment+Liquid Phase Oxidation Treatment

The composition containing a catalyst body and carbon nanotubes, obtained in Preparation Example 4 of a composition containing carbon nanotubes, was transferred to an evaporation dish, and allowed to stand in an electric furnace which had been heated to a set temperature of 446° C. in advance, and was subjected to heating oxidation treatment for 3 hours.

The composition containing carbon nanotubes obtained as described above was stirred in 4.8 N hydrochloric acid for 1 hour to dissolve iron which is a catalyst metal and MgO which is a support thereof. The resulting black suspension was filtered, and the filtration product was placed again into 4.8 N hydrochloric acid, subjected to de-MgO treatment, and filtered. This operation was repeated three times (de-MgO treatment). The finally obtained filtration product containing carbon nanotubes was heated to dry at 120° C. overnight to obtain the composition containing carbon nanotubes.

The resulting composition containing carbon nanotubes at 5.33 g in terms of a dry weight was transferred, and allowed to stand in an electric furnace which had been heated to a set temperature of 550° C. in advance, and subjected to heating oxidation treatment for 3 hours. By this treatment, 1.42 g of the composition containing carbon nanotubes was obtained.

Concentrated nitric acid (first class Assay 60 to 61% manufactured by Wako Pure Chemical Industries, Ltd.) at a weight which is about 300-fold a dry weight of the resulting composition containing carbon nanotubes was added. Thereafter, the mixture was heated to reflux while it was stirred in an oil bath at about 140° C. for 25 hours. After heating and reflux, a nitric acid solution containing the composition containing carbon nanotubes was diluted 3-fold with ion-exchanged water, and suction-filtered. After the suspension of the filtration product was washed with ion-exchanged water until neutral, the composition containing carbon nanotubes was stored in the wet state containing water.

At that time, a weight of the whole composition containing carbon nanotubes in the wet state containing water was 9.188 g (concentration of composition containing carbon nanotubes: 6.53 wt %). As a result of thermogravimetric analysis, TG(H)/(TG(L)+TG(H)) was 0.85. From the DTG curve, a high temperature combustion peak was 753° C., and a low temperature combustion peak was 487° C. In addition, as a result of Raman spectroscopic analysis of the composition containing carbon nanotubes at a wavelength of 633 nm, a G/D ratio was 60.

When this composition containing carbon nanotubes was observed via high resolution transmission electron microscopy, double-walled carbon nanotubes occupied 87 of a total number (100) of observed carbon nanotubes, and an average outer diameter was 1.8 nm. A yield relative to an unpurified composition containing carbon nanotubes from which a catalyst body had been removed with 4.8 N hydrochloric acid, and which had not been subjected to heating oxidation or liquid phase oxidation was 1.44%.

The resulting composition containing carbon nanotubes in the wet state at 15 mg in terms of a dry weight, and 4.5 g of an aqueous solution of 1 wt % carboxymethylcellulose sodium (90 kDa manufactured by Sigma corporation, 50 to 200 cps) were weighted, and ion-exchanged water was added to 10 g. A pH was adjusted to 4.0 using nitric acid, and this was subjected to dispersing treatment for 7.5 minutes at an output of an ultrasound homogenizer of 20 W under ice-cooling, to prepare a carbon nanotube liquid. During dispersing, a liquid temperature was adjusted to 10° C. or lower. The resulting liquid was centrifuged with a high speed centrifuge at 10000 G for 15 minutes to obtain 9 mL of the supernatant. Thereafter, water and ethanol were added to perform adjustment so that a concentration of the composition containing carbon nanotubes as a final concentration became 0.08 wt %, thereby, a dispersion was obtained. At that time, ethanol was adjusted so as to be contained at 5 vol %.

The dispersion was coated on a polyethylene terephthalate (PET) film ((Lumirror® U46) manufactured by Toray Industries, Inc., light transmittance 90.3%, 15 cm×10 cm) using a bar coater, and this was air-dried, rinsed with distilled water, and dried in a dryer at 120° C. for 2 minutes to immobilize the composition containing carbon nanotubes. A surface resistance value of the resulting coated film was $3.65 \times 10^2 \Omega/\square$, and a light transmittance was 94.1% (transparent electrically conductive film 85.0%/PET film 90.3%=0.941), and high electrical conductivity and high transparency were exhibited.

Example 9

The composition (118 g) containing a catalyst body and carbon nanotubes, obtained in Preparation Example 1 of a composition containing carbon nanotubes, was transferred to an evaporation dish, allowed to stand in an electric furnace which had been heated to a set temperature of 446° C. in advance, and subjected to heating oxidation treatment for 3 hours.

The composition containing carbon nanotubes obtained as described above was stirred in 4.8 N hydrochloric acid for 1 hour to dissolve iron which is a catalyst metal and MgO which is a support thereof. After the resulting black suspension was filtered, the filtration product was placed again into 4.8 N hydrochloric acid, and this was subjected to de-MgO treatment, and filtered. This operation was repeated three times (de-MgO treatment). The finally obtained filtration product was heated to dry at 120° C. overnight, to obtain 0.374 g of the composition containing carbon nanotubes.

Concentrated nitric acid (first class Assay 60 to 61% manufactured by Wako Pure Chemical Industries, Ltd.) at a weight which is about 300-fold a dry weight of the resulting composition containing carbon nanotubes was added. Thereafter, the mixture was heated to reflux while it was stirred in an oil bath at about 140° C. for 5 hours. After heating and reflux, a nitric acid solution containing the composition containing carbon nanotubes was diluted 3-fold with ion-exchanged water, and suction-filtered. After the suspension of the filtration product was washed with ion-exchanged water until neutral, the composition containing carbon nanotubes was stored in the wet state containing water. At that time, a weight of whole composition containing carbon nanotubes in the wet state containing water was 4.651 g (concentration of composition containing carbon nanotubes: 7.47 wt %).

As a result of thermogravimetric analysis of the composition containing carbon nanotubes, TG(H)/(TG(L)+TG(H)) was 0.87. From the DTG curve, a high temperature combustion peak was 739° C., and a low temperature combustion peak was 497° C. In addition, as a result of Raman spectroscopic analysis of the composition containing carbon nanotubes at a wavelength of 633 nm, a G/D ratio was 35.

When this composition containing carbon nanotube was observed via high resolution transmission electron microscopy, double-walled carbon nanotubes occupied 88 of a total number (100) of observed carbon nanotubes, and an average outer diameter was 1.8 nm. A yield relative to an unpurified composition containing carbon nanotubes from which a catalyst body had been removed with 4.8 N hydrochloric acid, and which had not been subjected to heating oxidation or liquid phase oxidation was 16.2%.

In addition, the composition containing carbon nanotubes in the wet state was taken out so that a dry weight became 20 mg, a bulk membrane of carbon nanotubes was prepared by the aforementioned method, and a volume resistance value was measured. As a result, the value was $4.4 \times 10^{-4}$ Ω·cm.

Reference Example 2

The composition containing a catalyst body and carbon nanotubes, obtained in Preparation Example 4 of a composition containing carbon nanotubes, was transferred to an evaporation dish, allowed to stand in an electric furnace which had been heated to a set temperature of 446° C. in advance, and subjected to heating oxidation treatment for 3 hours.

The composition (124 g) containing carbon nanotubes obtained as described above was stirred in 2000 mL of 4.8 N hydrochloric acid for 1 hour to dissolve iron which is a catalyst metal and MgO which is a support thereof. After the resulting black suspension was filtered, and the filtration product was placed again into 400 mL of 4.8 N hydrochloric acid, subjected to de-MgO treatment, and filtered. This operation was repeated three times (de-MgO treatment). The finally obtained filtration product was heated to dry at 120° C. overnight, to obtain the composition containing carbon nanotubes.

A part of the composition containing carbon nanotubes as a sample at about 1 mg was mounted in a thermogravimetric analysis apparatus (TGA-60 manufactured by Shimadzu Corporation) and a temperature was increased from room temperature to 900° C. at a temperature increasing rate of 10° C./min in the air. Change in a weight at that time was measured, and a weight loss curve was differentiated with a time to obtain a differential thermogravimetric curve (DTG) (x-axis is a temperature (° C.), y-axis is DTG (mg/min)). As a result of thermogravimetric analysis, TG(H)/(TG(L)+TG (H)) was 0.25. From the DTG curve, a high temperature combustion peak was 725° C. and a low temperature combustion peak was 580° C.

Concentrated nitric acid (first class Assay 60 to 61% manufactured by Wako Pure Chemical Industries, Ltd.) at a weight which is about 300-fold a weight of the resulting composition containing carbon nanotubes was added. Thereafter, the mixtures was heated to reflux while it was stirred in an oil bath at about 140° C. for 5 hours. After heating and reflux, a nitric acid solution containing the composition containing carbon nanotubes was diluted 3-fold with ion-exchanged water, and suction-filtered. After the suspension of the filtration product was washed with ion-exchanged water until neutral, the composition containing carbon nanotubes was stored in the wet state containing water.

At that time, a weight of the whole composition containing carbon nanotubes in the wet state containing water was 2.658 g (concentration of composition containing carbon nanotubes: 7.01 wt %). After a part of the resulting composition containing carbon nanotubes in the wet state was dried in a dryer at 120° C. overnight, about 1 mg of a sample was mounted in a thermogravimetric analysis apparatus (TGA-60 manufactured by Shimadzu Corporation), and a temperature was increased from room temperature to 900° C. at a temperature increasing rate of 10° C./min in the air. Change in a weight at that time was measured, and a weight loss curve was differentiated with a time to obtain a differential thermogravimetric curve (DTG) (x-axis is a temperature (° C.), y-axis is DTG (mg/min)). As a result of thermogravimetric analysis, TG(H)/(TG(L)+TG(H)) was 0.54. From the DTG curve, a high temperature combustion peak was 732° C., and a low temperature combustion peak was 637° C. In addition, as a result of Raman spectroscopic analysis of the composition containing carbon nanotubes at a wavelength of 633 nm, a G/D ratio was 75.

When this composition containing carbon nanotubes was observed via high resolution transmission electron microscopy, double-walled carbon nanotubes occupied 88 of a total number (100) of observed carbon nanotubes, and an average outer diameter was 1.8 nm. A yield relative to an unpurified composition containing carbon nanotubes from which a catalyst body had been removed with 4.8 N hydrochloric acid, and which had not been subjected to heating oxidation or liquid phase oxidation was 10.4%.

The resulting composition containing carbon nanotubes in the wet state at 15 mg in terms of a dry weight, and 4.5 g of an aqueous solution of 1 wt % carboxymethylcellulose sodium (90 kDa manufactured by Sigma corporation, 50 to 200 cps) were weighed, and ion-exchanged water was added to 10 g. A pH was adjusted to 4.0 using nitric acid, and this was subjected to dispersing treatment for 7.5 minutes under ice-cooling at an output of 20 W using an ultrasound homogenizer, to prepare a carbon nanotube liquid. During dispersing, a liquid temperature was adjusted to 10° C. or lower. The resulting liquid was centrifuged with a high speed centrifuge at 10000 G for 15 minutes to obtain 9 mL of the supernatant. Thereafter, water and ethanol were added to perform adjustment so that a concentration of the composition containing carbon nanotubes became 0.08 wt %, thereby, a dispersion was obtained. At that time, ethanol was adjusted so as to be contained at 5 vol %.

The dispersion was coated on a polyethylene terephthalate (PET) film ((Lumirror® U46) manufactured by Toray Industries, Inc., light transmittance 90.3%, 15 cm×10 cm) using a bar coater, and this was air-dried, rinsed with distilled water, and dried in a dryer at 120° C. for 2 minutes to immobilize the composition containing carbon nanotubes. A surface resistance value of the resulting coated film was $8.02\times10^2 \Omega/\square$, and a light transmittance was 95.2% (transparent electrically conductive film 86.0%/PET film 90.3%=0.952).

In addition, the composition containing carbon nanotubes in the wet state was taken out so that a dry weight became 20 mg, a bulk membrane of carbon nanotubes was prepared by the aforementioned method, and a volume resistance value was measured. As a result, the value was $7.5\times10^{-4}$ $\Omega\cdot$cm.

In the composition containing carbon nanotubes, TG(H)/(TG(L)+TG(H)) is small as 0.54, and a volume resistance value is large as compared with other Examples. This is because an amount of a component of TG(L) containing much insulating amorphous carbon is large. Accompanying this, a surface resistance value is increased at approximately the same transmittance.

Example 10

Synthesis of Catalyst Body

In 120 mL of ion-exchanged water was dissolved 0.74 g of iron (III) citrate ammonium (manufactured by Wako Pure Chemical Industries, Ltd.). To this solution was added 30 g of magnesium oxide (MJ-30 manufactured by Iwatani Chemical Industry, Co., Ltd.), the mixture was vigorously stirring-treated with a stirrer for 60 minutes, and 200 mL of the suspension was introduced into an autoclave container. The container was heated to 200° C. in the closed state, and was retained for 2 hours. Thereafter, the autoclave container was allowed to cool, a slurry-like cloudy substance was taken out from the container, and excessive water was filtered by suction filtration. A small amount of water contained in the filtration product was heated to dry in a dryer at 120° C. The resulting solid matter was introduced into an electric furnace, and heated at 600° C. for 3 hours under the atmosphere. The dehydrated solid matter was finely-divided to a particle diameter of 20 to 32 mesh. The above operation was repeated, and particles were subjected to the following experiment. A bulk density was 0.32 g/mL. In addition, when the filtrate was analyzed by an energy dispersive X-ray analysis apparatus (EDX), iron was not detected. From this, it was confirmed that an all amount of added iron (III) citrate ammonium was supported by magnesium oxide. Further, from results of EDX analysis of a catalyst body, a content of iron contained in magnesium oxide flakes was 0.39 wt %.

(XRD Measurement)

After a powder sample was mounted in a powder X-ray diffraction apparatus (RINT2100 manufactured by Rigaku Corporation), operation was performed at 1.5° to 80°, and analysis was performed. A X-ray source is CuKα ray. A step width is 0.010°, and a measuring time is 1.0 second. Results of analysis after a hydrothermal reaction were as follows. The product after the hydrothermal reaction of MgO used as a raw material showed peaks derived from $Mg(OH)_2$. After burning at 600° C. for 3 hours under the atmosphere, peaks returned to peaks derived from MgO. A half-value width at a <200> plane of MgO after burning was 0.79 deg, and a crystallite diameter was 11 nm.

(SEM Observation)

After the hydrothermal reaction, a shape of a catalyst body after burning was further observed using a scanning electron microscope (JSM-6301NF) manufactured by JEOL Ltd. It was confirmed that the shape was a flake-like structure in which fine particles of around 10 to 50 nm are aggregated. An average length in a long side direction of a flake-like structure which was calculated by the aforementioned method was 537 nm, and an average thickness was 25 nm.

(Measurement of Hydrogen Adsorption)

Using a hydrogen adsorption apparatus (BEL-METAL-1) manufactured by BEL Japan Inc., a hydrogen adsorption amount of Fe was measured. A hydrogen adsorption amount per 1 g of Fe was 31 $cm^3$/g (Fe), and an average particle diameter was 7.4 nm.

(Synthesis of Carbon Nanotubes)

Synthesis of carbon nanotubes was performed using an apparatus shown in FIG. 4. A reactor 403 is a cylindrical quartz tube having an inner diameter of 75 mm and a length of 1100 mm. The reactor is provided with a quartz sintering plate 402 at a central part, and is provided with a mixed gas introducing tube 408 which is an inert gas and raw material gas supply line at a quartz tube lower part, and a gas discharge tube 406 at an upper part. Further, the reactor is provided with three electric furnaces 401 as a heater surrounding a circumference of the reactor, so that the reactor can be retained at an arbitrary temperature. In addition, the reactor is provided with a thermometer 405 protected with a quartz tube for detecting a temperature in the reactor.

The solid catalyst body (132 g) prepared as described above was taken, and introduced on the quartz sintering plate at a central part of the reactor arranged in a perpendicular direction, thereby, a catalyst layer 404 was formed. A nitrogen gas was supplied for 30 minutes at 16.5 L/min from a reactor bottom to a direction of a reactor upper part using a mass flow controller 407, and was flown so as to pass through the catalyst layer. Thereafter, a methane gas was further introduced for 60 minutes at 0.78 L/min using a mass flow controller 407 while a nitrogen gas was supplied, so that the gas was flown so as to pass through the catalyst layer to perform a reaction. Introduction of a methane gas was stopped, and the quartz reactor was cooled to room temperature while a nitrogen gas was flown at 16.5 L/min. A composition containing a catalyst and carbon nanotubes was taken out, transferred to an evaporation dish, allowed to stand in an electric furnace which had been heated to a set temperature of 446° C. in advance, and was subjected to heating oxidation treatment for 3 hours. The composition (115 g) containing carbon nanotubes obtained as described above was stirred in 2000 mL of 4.8 N hydrochloric acid for 1 hour to dissolve iron which is a catalyst metal and MgO which is a support thereof. After the resulting black suspension was filtered, the filtration product was placed again into 400 mL of 4.8 N hydrochloric acid, subjected to de-MgO treatment, and filtered. This operation was repeated three times (de-MgO treatment). The finally obtained filtration product containing carbon nanotubes was heated to dry at 120° C. overnight, to obtain a composition containing carbon nanotubes.

A recovery rate of carbon nanotubes after purification was 30% relative to an amount of sedimented carbon immediately after production in which heating oxidation treatment was not performed, and only de-MgO treatment was performed.

(Heat Analysis of Composition Containing Carbon Nanotubes)

About 1 mg of a sample was mounted in a differential thermogravimetric apparatus (TGA-60 manufactured by Shimadzu Corporation), and a temperature was increased from room temperature to 900° C. at a temperature increasing rate of 10° C./min in the air. Change in a weight at that time was measured. As a result, change in a weight was 100%.

(Assessment of Nature of Carbon Nanotubes by Raman Spectroscopic Analysis)

A powder sample was mounted in a resonance Raman spectrophotometer (INF-300 manufactured by Horiba Jobin Yvon S.A.S.), and measurement was performed using a laser wavelength of 532 nm. A G/D ratio (excitation wavelength: 532 nm) of the composition containing carbon nanotubes obtained after heating oxidation treatment and removal of MgO with hydrochloric acid as described above was 34.

(TEM Observation)

Figure 12:
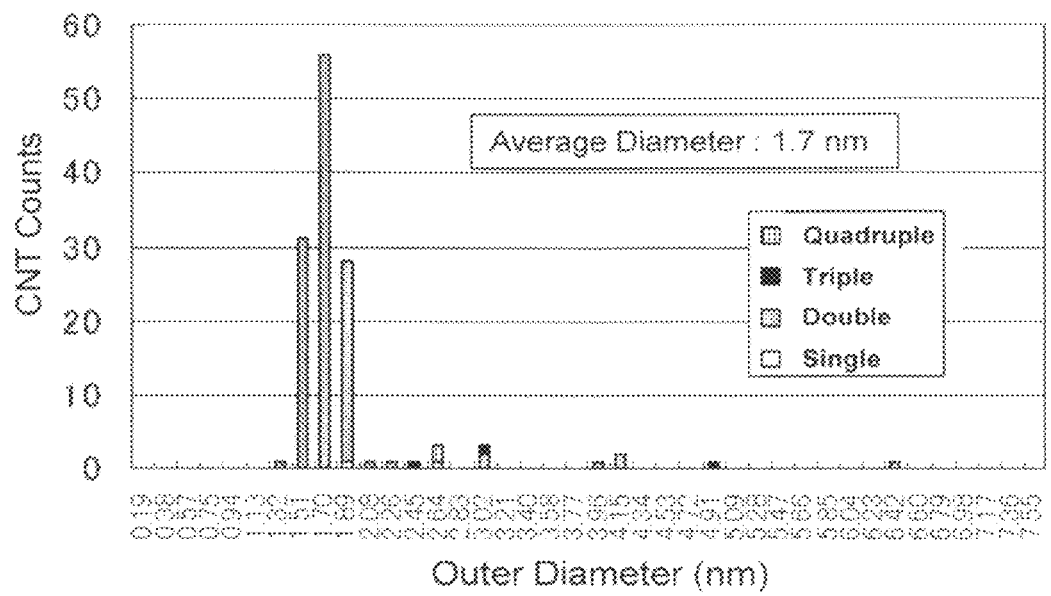
FIG. 12 shows a view of the layer number and a distribution of an outer diameter as a result of measurement of 130 carbon nanotubes contained in a composition containing carbon nanotubes obtained in Example 10.

A shape of carbon nanotubes after purification was observed at magnification of 250,000 using a scanning electron microscope (JEM-2100) manufactured by JEOL Ltd., and the layer number and an outer diameter of 130 were analyzed. Results are shown in FIG. 12. Double-walled carbon nanotubes were contained at 90%, and an average diameter was 1.7 nm. As a diameter, an arithmetic average of a value measured at a part having good linearity was adopted.

(Volume Resistance)

To 200 mL of concentrated nitric acid (first class Assay 60 to 61% manufactured by Wako Pure Chemical Industries, Ltd.) was added 570 mg of an aggregate of double-walled carbon nanotubes from which the catalyst had been removed, and the mixture was heated while stirring in an oil bath at 130° C. for 5 hours. After completion of heating and stirring, a nitric acid solution containing carbon nanotubes was filtered, washed with distilled water, and dried at 120° C. overnight, thereby, 420 mg of a composition containing carbon nanotubes was obtained.

The composition (20 mg) containing carbon nanotubes obtained as described above was mixed with 16 mL of N-methylpyrrolidone, and ultrasound was irradiated at 20 W for 20 minutes using an ultrasound homogenizer. Thereafter, the mixture was mixed with 10 mL of ethanol, and this was suction-filtered with a membrane filter using a filtering equipment having an inner diameter 35 mmφ. The filtration product together with the filtering equipment and the membrane filter was dried in a dryer at 60° C. for 2 hours. When the membrane filter equipped with a carbon nanotube membrane was detached from the filtering equipment, a thickness of the membrane together with the membrane filter was measured, and a membrane thickness of the membrane filter was subtracted, a thickness of the carbon nanotube membrane was 33.3 μm. As the membrane filter, OMNIPORE MEMBRANE FILTERS, FILTER TYPE: 1.0 μm JA, 47 mmφ was employed. When a surface resistance value of the resulting carbon nanotube membrane was measured using Loresta EP MCP-T360 (manufactured by Mitsubishi Chemical Analytech Co., Ltd.) according to a 4-terminal 4-probe method according to JISK 7149, the value was 0.177Ω/□. Therefore, a volume resistivity is $5.9 \times 10^{-4}$ Ω·cm.

(Heat Analysis)

About 1 mg of a sample of the composition containing carbon nanotubes which had been subjected to liquid phase heating oxidation treatment with concentrated nitric acid was mounted in a differential heat analysis apparatus (DTG-60 manufactured by Shimadzu Corporation), and a temperature was increased from room temperature to 900° C. at a temperature increasing rate of 10° C./min in the air. From the DTG curve expressing a decreased weight per unit time at that time, a combustion peak temperature due to exotherm was read. The combustion peak was 734° C.

Example 11

Synthesis of Catalyst Body

In 120 mL of ion-exchanged water was dissolved 0.74 g of iron (III) citrate ammonium (manufactured by Wako Pure Chemical Industries, Ltd). To this solution was added 30 g of magnesium oxide (MJ-30 manufactured by Iwatani Chemical Industry, Co., Ltd.), the mixture was vigorously stirring-treated with a stirrer for 60 minutes, and the suspension was introduced into a 200 mL autoclave container. The container was heated to 150° C. in the closed state, and was retained for 6 hours. Thereafter, the autoclave container was allowed to cool, a slurry-like cloudy substance was taken out from the container, excessive water was filtered by suction filtration, and a small amount of water contained in the filtration product was heated to dry in a dryer at 120° C. The resulting solid matter was introduced into an electric furnace, and heated at 600° C. for 3 hours in the atmosphere. The dehydrated solid matter was finely-divided to a particle diameter of 20 to 32 mesh. The above operation was repeated, and particles were subjected to the following experiment. A bulk density was 0.31 g/mL. In addition, when the filtrate was analyzed by EDX, iron was not detected. From this, it was confirmed that an all amount of added iron (III) citrate ammonium was supported by magnesium oxide.

(XRD Measurement)

Measurement was performed using the same apparatus as that of Example 10. Results are shown in FIG. 8. After the hydrothermal reaction, peaks of MgO became peaks derived from $Mg(OH)_2$. After burning at 600° C. for 3 hours under the atmosphere, peaks returned to peaks derived from MgO. A half-value width at a <200> plane of MgO after burning was 0.77 deg, and a crystallite diameter was 11 nm.

(SEM Observation)

Using the same measuring apparatus as that of Example 10, a flake-like structure in which fine particles of around 10 to 50 nm are aggregated was confirmed. An average length in a long side direction of the flake-like structure was 465 nm, and an average thickness was 21 nm.

(Measurement of Hydrogen Adsorption)

Using the same measuring apparatus as that of Example 10, a hydrogen adsorption amount of Fe was measured. A hydrogen adsorption amount per 1 g of Fe was 27 cm$^3$/g (Fe), and an average particle diameter was 8.5 nm.

(Synthesis of Carbon Nanotubes)

The same operation as that of Example 10 was performed. A recovery rate of carbon nanotubes after purification was 25% relative to a sedimented amount of carbon immediately after production in which heating oxidation treatment was not performed, and only de-MgO treatment was performed.

(Assessment of Nature of Carbon Nanotubes by Raman Spectroscopic Analysis)

Figure 10:
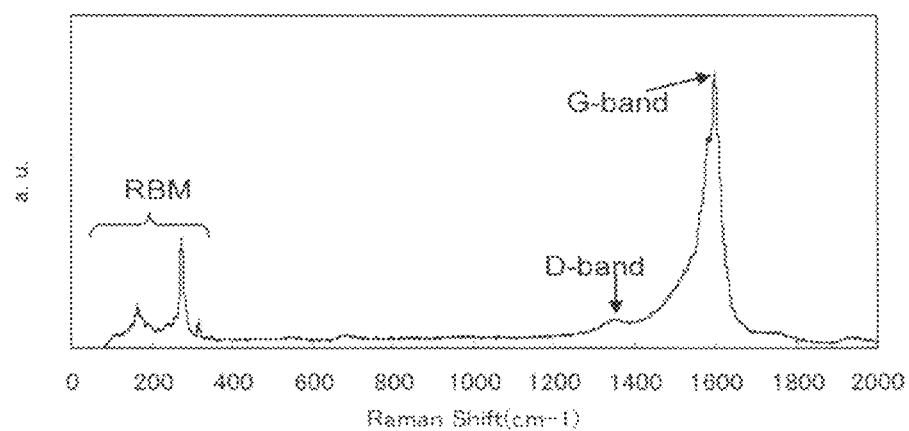
FIG. 10 shows a view of a Raman spectroscopic spectrum of a composition containing carbon nanotubes before purification, in Examples 11. An excitation wavelength is 532 nm.
Figure 11:
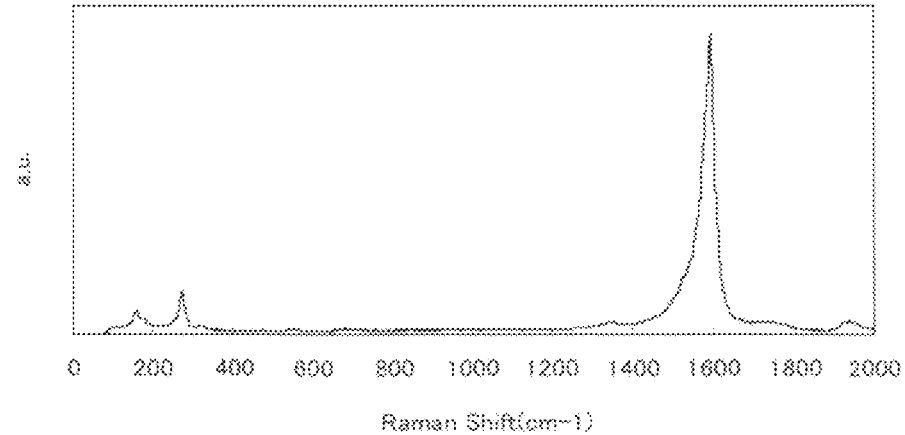
FIG. 11 shows a view of a Raman spectroscopic spectrum of a composition containing carbon nanotubes after purification, in Example 11. An excitation wavelength is 532 nm.

The same measurement as that of Example 10 was performed. Results of measurement of the composition containing carbon nanotubes before purification are shown in FIG. 10, and results of measurement of the composition containing carbon nanotubes after purification are shown in FIG. 11. A G/D ratio (excitation wavelength: 532 nm) of the composition containing carbon nanotubes after heating oxidation treatment and removal of MgO with hydrochloric acid as described above was 67.

(Volume Resistance)

After the same nitric acid treatment as that of Example 10 was performed, a carbon nanotube membrane was prepared according to the same operation as that of Example 10 using the resulting composition containing carbon nanotubes, and a thickness of the carbon nanotube membrane was 44.5 μm. A surface resistance value of the resulting carbon nanotube membrane was 0.117Ω/□. Therefore, a volume resistivity was $5.2 \times 10^{-4}$ Ω·cm.

(Heat Analysis)

After the same nitric acid treatment as that of Example 10, the resulting composition containing carbon nanotubes was mounted in the same apparatus as that of Example 1, and a temperature was increased from room temperature to 900° C. at a temperature increasing rate of 10° C./min in the air. From the DTG curve expressing a reduced weight per unit time at that time, a combustion peak temperature due to exotherm was read. A combustion peak was 768° C.

Example 12

Synthesis of Catalyst Body

In 120 mL of ion-exchanged water was dissolved 0.74 g of iron (III) citrate ammonium (manufactured by Wako Pure Chemical Industries, Ltd.). To this solution was added 30 g of magnesium oxide (MJ-30 manufactured by Iwatani Chemical Industry, Co., Ltd.), the mixture was vigorously stirring-treated with a stirrer for 60 minutes, and the suspension was introduced into a 200 mL autoclave container. The container was heated to 150° C. in the closed state, and retained for 4 hours. Thereafter, the autoclave container was allowed to cool, a slurry-like cloudy substance was taken out from the container, excessive water was filtered by suction filtration, and a small amount of water contained in the filtration product was heated to dry in a dryer at 120° C. The resulting solid matter was introduced into an electric furnace, and heated at 450° C. for 3 hours under the atmosphere. The dehydrated solid matter was finely-divided to a particle diameter of 20 to 32 mesh. The above operation was repeated, and this was subjected to the following experiment. A bulk density was 0.32 g/mL. In addition, when the filtrate was analyzed by EDX, iron was not detected. From this, it was confirmed that an all amount of added iron (III) citrate ammonium was supported by magnesium oxide.

(XRD Measurement)

Using the same apparatus as that of Example 10, measurement was performed. After the hydrothermal reaction, peaks of MgO became peaks derived from Mg(OH)$_2$. After burning at 600° C. for 3 hours under the atmosphere, peaks returned to peaks derived from MgO. A half-value width at a <200> plane of MgO after burning was 0.89 deg, and a crystallite diameter was 10 nm.

(Measurement of Hydrogen Adsorption)

A hydrogen adsorption amount of Fe was measured using the same measurement apparatus as that of Example 10. A hydrogen adsorption amount per 1 g of Fe was 28 cm$^3$/g (Fe), and an average particle diameter was 8.4 nm.

(Synthesis of Carbon Nanotubes)

The same operation as that of Example 10 was performed. A recovery rate of carbon nanotubes after purification was 20% relative to a sedimented amount of carbon immediately after production in which heating oxidation treatment was not performed, and only de-MgO treatment was performed.

(Assessment of Nature of Carbon Nanotubes by Raman Spectroscopic Analysis)

The same measurement as that of Example 10 was performed. A G/D ratio (excitation wavelength: 532 nm) of the composition containing carbon nanotubes after heating oxidation treatment and removal of MgO with hydrochloric acid as described above was 48.

(Volume Resistance)

After the same nitric acid treatment as that of Example 10 was performed, a carbon nanotube membrane was prepared according to the same operation as that of Example 1 using the resulting composition containing carbon nanotubes, and a thickness of the carbon nanotube membrane was 40.5 μm. A surface resistance value of the resulting carbon nanotube membrane was 0.129Ω/□. Therefore, a volume resistivity is $5.2 \times 10^{-4}$ Ω·cm.

(Heat Analysis)

After the same nitric acid treatment as that of Example 10 was performed, the resulting composition containing carbon nanotubes was mounted in the same apparatus as that of Example 1, and a temperature was increased from room temperature to 900° C. at a temperature increasing rate of 10° C./min in the air. From the DTG curve expressing a reduced weight per unit time at that time, a combustion peak temperature due to exotherm was read. The combustion peak was 706° C.

Example 13

Synthesis of Catalyst Body

In 120 mL of ion-exchanged water were dissolved 0.71 g of iron (III) citrate ammonium (manufactured by Wako Pure Chemical Industries, Ltd.) and 0.037 g (a sulfur amount relative to an iron amount in 5 wt %) of iron (III) sulfate ammonium.nonahydrate (manufactured by Wako Pure Chemical Industries, Ltd.). To this solution was added 30 g of magnesium oxide (MJ-30 manufactured by Iwatani Chemical Industry Co., Ltd.), the mixture was vigorously stirring-treated with a stirrer for 60 minutes, and the suspension was introduced into a 200 mL autoclave container. The container was heated to 200° C. in the closed state, and retained for 2 hours. Thereafter, the autoclave container was allowed to cool, a slurry-like cloudy substance was taken out from the container, excessive water was filtered by suction filtration, and a small amount of water contained in the filtration product was heated to dry in a dryer at 120° C. The resulting solid matter was introduced into an electric furnace, and heated at 600° C. for 3 hours under the atmosphere. The dehydrated solid matter was finely-divided to a particle diameter of 20 to 32 mesh. The above operation was repeated, and this was subjected to the following experiment. A bulk density was 0.31 g/mL. In addition, when the filtrate was analyzed by EDX, iron was not detected. From this, it was confirmed that all amounts of added iron (III) citrate ammonium and iron (III) sulfate ammonium were supported by magnesium oxide. Further, from results of EDX analysis of a catalyst body, a content of iron contained in magnesium oxide flakes was 0.39 wt %.

(XRD Measurement)

Using the same apparatus as that of Example 10, measurement was performed. After the hydrothermal reaction, peaks of MgO became peaks derived from $Mg(OH)_2$. After burning at 600° C. for 3 hours under the atmosphere, peaks returned to peaks derived from MgO. A half-value width at a <200> plane of MgO after burning was 0.72, and a crystallite diameter was 12 nm.

(Measurement of Hydrogen Adsorption)

Using the same measurement apparatus as that of Example 10, a hydrogen adsorption amount of Fe was measured. A hydrogen adsorption amount per 1 g of Fe was 28 $cm^3$/g (Fe), and an average particle diameter was 8.3 nm.

(Synthesis of Carbon Nanotubes)

The same operation as that of Example 10 was performed. A recovery rate of carbon nanotubes after purification was 38% relative to a sedimented amount of carbon immediately after production in which heating oxidation treatment was not performed, and only de-MgO treatment was performed.

(Assessment of Nature of Carbon Nanotubes by Raman Spectroscopic Analysis)

The same measurement as that of Example 10 was performed. After heating oxidation treatment and removal of MgO with hydrochloric acid as described above, a G/D ratio (excitation wavelength: 532 nm) of the composition containing carbon nanotubes was 40.

(Heat Analysis)

After the same nitric acid treatment as that of Example 10 was performed, the resulting composition containing carbon nanotubes was mounted in the same apparatus as that of Example 10, and a temperature was increased from room temperature to 900° C. at a temperature increasing rate of 10° C./min in the air. From the DTG curve expressing a decreased weight per unit time at that time, a combustion peak temperature due to exotherm was read. A combustion peak was 682° C.

Example 14

Transition Metal Supported Amount: 0.2 wt %

(Synthesis of Catalyst Body)

In 120 mL of ion-exchanged water was dissolved 0.395 g of iron (III) citrate ammonium (manufactured by Wako Pure Chemical Industries, Ltd.). To this solution was added 30 g of magnesium oxide (MJ-30 manufactured by Iwatani Chemical Industry, Co., Ltd.), the mixture was vigorously stirring-treated with a stirred for 60 minutes, and the suspension was introduced into a 200 mL autoclave container. The autoclave container was heated to 200° C. in the closed state and retained for 2 hours. Thereafter, the autoclave container was allowed to cool, a slurry-like cloudy substance was taken out from the container, excessive water was filtered by suction filtration, and a small amount of water contained in the filtration product was heated to dry in a dryer at 120° C. The resulting solid matter was introduced into an electric furnace, and heated at 600° C. for 3 hours under the atmosphere. The dehydrated solid matter was finely-divided to a particle diameter of 20 to 32 mesh. The above operation was repeated, and this was subjected to the following experiment. A bulk density was 0.41 g/mL. In addition, when the filtrate was analyzed by EDX, iron was not detected. From this, it was confirmed that all amounts of added iron (III) citrate ammonium and iron (III) sulfate ammonium were supported by magnesium oxide.

(Measurement of Hydrogen Adsorption)

Using the same measurement apparatus as that of Example 10, a hydrogen adsorption amount of Fe was measured. A hydrogen adsorption amount per 1 g of Fe was 34 $cm^3$/g (Fe), and an average particle diameter was 6.8 nm.

(Synthesis of Carbon Nanotubes)

The same operation as that of Example 10 was performed. A recovery rate of carbon nanotubes after purification was 17% relative to a sedimented amount of carbon immediately after production in which heating oxidation treatment was not performed, and only de-MgO treatment was performed.

(Assessment of Nature of Carbon Nanotubes by Raman Spectroscopic Analysis)

The same measurement as that of Example 10 was performed. After heating oxidation treatment and removal of MgO with hydrochloric acid as described above, a G/D ratio (excitation wavelength: 532 nm) of the composition containing carbon nanotubes was 44.

(Heat Analysis)

After the same nitric acid treatment as that of Example 10 was performed, the resulting composition containing carbon nanotubes was mounted in the same apparatus as that of Example 10, and a temperature was increased from room temperature to 900° C. at a temperature increasing rate of 10° C./min. From the DTG curve expressing a decreased weight per unit time at that time, a combustion peak temperature due to exotherm was read. A combustion peak was 673° C.

Example 15

Transition Metal Supported Amount: 0.75 wt %

(Synthesis of Catalyst Body)

In 120 mL of ion-exchanged water was dissolved 1.48 g of iron (III) citrate ammonium (manufactured by Wako Pure Chemical Industries, Ltd.). To this solution was added 30 g of magnesium oxide (MJ-30 manufactured by Iwatani Chemical Industry, Co., Ltd.), the mixture was vigorously stirring-treated with a stirrer for 60 minutes, and the suspension was introduced into a 200 mL autoclave container. The autoclave container was heated to 200° C. in the closed state, and retained for 2 hours. Thereafter, the autoclave container was allowed to cool, a slurry-like cloudy substance was taken out from the container, excessive water was filtered by suction filtration, and a small amount of water contained in the filtration product was heated to dry in a dryer at 120° C. The resulting solid matter was introduced into an electric furnace, and heated at 600° C. for 3 hours under the atmosphere. The dehydrated solid matter was finely-divided to a particle diameter of 20 to 32 mesh. The above operation was repeated, and this was subjected to the following experiment. A bulk density was 0.21 g/mL. In addition, when the filtrate was analyzed by EDX, iron was not detected. From this, it was confirmed that all amounts of added iron (III) citrate ammonium and iron (III) sulfate ammonium were supported by magnesium oxide.
(Measurement of Hydrogen Adsorption)

Using the same measurement apparatus as that of Example 10, a hydrogen adsorption amount of Fe was measured. A hydrogen adsorption amount per 1 g of Fe was 15 cm$^3$/g (Fe), and an average particle diameter was 16 nm.
(Synthesis of Carbon Nanotubes)

The same operation as that of Example 10 was performed. A recovery rate of carbon nanotubes after purification was 33% relative to a sedimented amount of carbon immediately after production in which heating oxidation treatment was not performed, and only de-MgO treatment was performed.
(Assessment of Nature of Carbon Nanotubes by Raman Spectroscopic Analysis)

The same measurement as that of Example 10 was performed. After heating oxidation treatment and removal of MgO with hydrochloric acid as described above, a G/D ratio (excitation wavelength: 532 nm) of the composition containing carbon nanotubes was 35.
(Heat Analysis)

After the same nitric acid treatment as that of Example 10 was performed, the resulting composition containing carbon nanotubes was mounted in the same apparatus as that of Example 10, and a temperature was increased from room temperature to 900° C. at a temperature increasing rate of 10° C./min in the air. From the DTG curve expressing a decreased amount per unit time at that time, a combustion peak temperature due to exotherm was read. A combustion peak was 707° C.

Reference Example 3

Synthesis of Catalyst Body

In 500 mL of methanol (manufactured by KANTO CHEMICAL CO., INC) was dissolved 2.46 g of ferric ammonium citrate (manufactured by Wako Pure Chemical Industries, Ltd.). To this solution was added 100.0 g of magnesium oxide (MJ-30 manufactured by Iwatani Chemical Industry, Co., Ltd.), the mixture was vigorously stirring-treated with a stirrer for 60 minutes, and the suspension was concentrated to solid at 40° C. under reduced pressure. The resulting powder was heated to dry at 120° C. to remove methanol, thereby, a solid catalyst in which a metal salt is supported by a magnesium oxide powder was obtained. The solid catalyst was finely-divided with a mortar to a particle diameter of 32 mesh or less. A content of iron contained in the resulting solid catalyst was 0.38 wt %. The above operation was repeated, and this was subjected to the following experiment.
(XRD Measurement)

Using the same apparatus as that of Example 10, measurement was performed. After the hydrothermal reaction, peaks of MgO became peaks derived from Mg(OH)$_2$. After burning at 600° C. for 3 hours under the atmosphere, peaks returned to peaks derived from MgO. A half-value width at a <200> plane of MgO after burning was 0.3 deg, and a crystallite diameter was 31 nm.
(Measurement of Hydrogen Adsorption)

Using the same measurement apparatus as that of Example 10, a hydrogen adsorption amount of Fe was measured. A hydrogen adsorption amount per 1 g of Fe was 2.4 cm$^3$/g (Fe), and an average particle diameter was 130 nm.
(Synthesis of Carbon Nanotubes)

The same operation as that of Example 10 was performed. A recovery rate of carbon nanotubes after purification was 16% relative to a sedimented amount of carbon immediately after production in which heating oxidation treatment was not performed, and only de-MgO treatment was performed.
(Assessment of Nature of Carbon Nanotubes by Raman Spectroscopic Analysis)

The same measurement as that of Example 10 was performed. After heating oxidation treatment and removal of MgO with hydrochloric acid as described above, a G/D ratio (excitation wavelength: 532 nm) of the composition containing carbon nanotubes was 42.
(Volume Resistance)

After the same nitric acid treatment as that of Example 10 was performed, a carbon nanotube membrane was prepared according to the same operation as that of Example 1 using the resulting composition containing carbon nanotubes, and a thickness of the carbon nanotube membrane was 55.7 μm. A surface resistance value of the resulting carbon nanotube membrane was 0.134Ω/□. Therefore, a volume resistivity is 7.5×10$^{-4}$ Ω·cm.
(Heat Analysis)

After the same nitric acid treatment as that of Example 10 was performed, the resulting composition containing carbon nanotubes was mounted in the same apparatus as that of Example 10, and a temperature was increased from room temperature to 900° C. at a temperature increasing rate of 10° C./min in the air. From the DTG curve expressing a reduced weight per unit time at that time, a combustion peak temperature due to exotherm was read. A combustion peak was 668° C.

Reference Example 4

As described above, carbon nanotubes were obtained.
(Catalyst Preparation)

In 500 mL of methanol (manufactured by KANTO CHEMICAL CO., INC) was dissolved 2.46 g of ferric ammonium citrate (green) (manufactured by Wako Pure Chemical Industries, Ltd.). To this solution was added 100 g of magnesium oxide (light magnesia MJ-30 manufactured by Iwatani Chemical Industry, Co., Ltd.), the mixture was stirred at room temperature for 60 minutes, and drying under reduced pressure was performed while stirring at 40° C. to 60° C., to remove methanol, thereby, a catalyst in which a metal salt is supported by a magnesium oxide powder was obtained.
(Production of Carbon Nanotubes)

Figure 13:
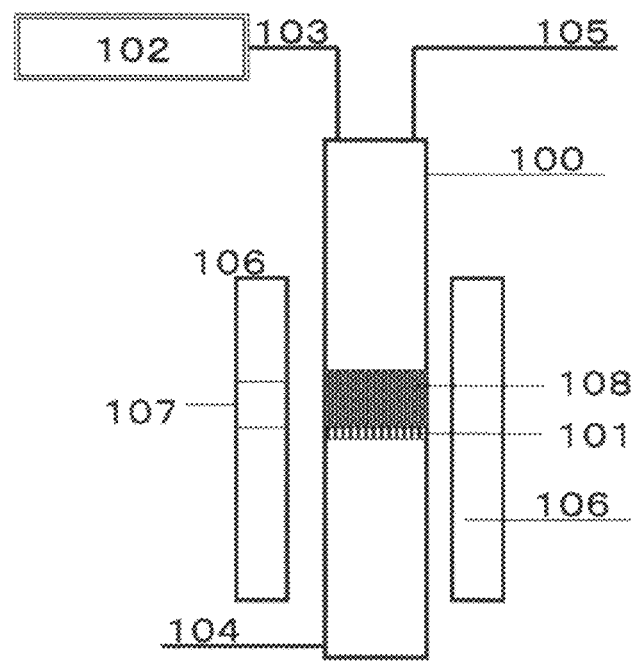
FIG. 13 shows an outline view of a fluid bed apparatus used in Reference Example 4.

Carbon nanotubes were synthesized with a fluid bed vertical reaction apparatus shown in FIG. 13. A reactor 100 is a cylindrical quartz tube having an inner diameter of 32 mm and a length of 1200 mm. The reactor is provided with a quartz sintering plate 101 at a central part, and is provided with an inert gas and raw material gas supply line 104 at a quartz tube lower part, and a gas discharge line 105 and a catalyst placing line 103 at an upper part. Further, the reactor is provided with a heater 106 surrounding a circumference of the reactor, so that the reactor can be retained at an arbitrary temperature. In the heater 106, an inspection opening 107 is provided so that the flowing state in the apparatus can be confirmed.

The catalyst (12 g) prepared in Reference Example 4 was placed from a closed-type catalyst supplying machine 102 through a catalyst placing line 103, and a catalyst 108 is set on the quartz sintering plate 101. Then, supply of an argon gas from a raw material gas supply line 104 at 1000 mL/min was initiated. After the interior of the reactor was brought into the argon gas atmosphere, a temperature was increased to 850° C. (temperature increase time 30 minutes).

After a temperature reached 850° C., a temperature was retained, a flow rate of argon in the raw material gas supply line 104 was increased to 2000 mL/min, and fluidization of a solid catalyst on the quartz sintering plate was initiated. After fluidization was confirmed through the inspection opening 107, supply of methane to the reactor at 95 mL/min (methane concentration 4.5 vol %) was further initiated. After the mixed gas was supplied for 90 minutes, the gas was switched to flow of only an argon gas to complete synthesis.

Heating was stopped, the reaction was allowed to stand to room temperature and, after a temperature became room temperature, a composition containing carbon nanotubes containing a catalyst and carbon nanotubes was taken out from the reactor.

A combustion peak temperature of the composition containing carbon nanotubes with this catalyst by differential heat analysis was 456° C.

Into a magnetic dish 150φ was taken 23.4 g of the composition containing carbon nanotubes with a catalyst shown above, heated in a muffle furnace (FP41 manufactured by Yamato Scientific Co., Ltd.) which had been heated to 446° C. in advance, at 446° C. for 2 hours under the atmosphere, and taken out from the muffle furnace. Then, in order to remove the catalyst, the composition containing carbon nanotubes was added to 6 N hydrochloric acid, and the mixture was stirred at room temperature for 1 hour. The recovered product obtained by filtration was further added to 6 N hydrochloric acid, and the mixture was stirred at room temperature for 1 hour. This was filtered, washed with water a few times, and the filtration product was dried in an oven at 120° C. overnight, thereby, 57.1 mg of a composition containing carbon nanotubes, from which magnesia and a metal had been removed, could be obtained and, by repeating the aforementioned operation, 500 mg of a composition containing carbon nanotubes, from which magnesia and metal had been removed, was prepared.

On the other hand, in order to investigate an amount of carbon which had been lost in the muffle furnace, 5.2 g of the composition containing carbon nanotubes with a catalyst which had not been heated in the muffle furnace was added to 6 N hydrochloric acid, and the mixture was stirred at room temperature for 1 hour. The recovered product obtained by filtration was further added to 6 N hydrochloric acid, and the mixture was stirred at room temperature for 1 hour. This was filtered, and washed with water a few times, and the filtration product was dried in an oven at 120° C. overnight to obtain 107.2 mg of a composition containing carbon nanotubes.

When converted based on this, an amount of lost carbon in the muffle furnace was 88%. In addition, when the thus obtained composition containing carbon nanotubes was observed via high resolution transmission electron microscopy, carbon nanotubes were constructed of a clean graphite layer, and carbon nanotubes having the layer number of 2 were observed. In addition, double-walled carbon nanotubes occupied 88 of a total number (100) of observed carbon nanotubes. The remaining was 10 of triple-walled carbon nanotubes, and 2 of quadruple-walled carbon nanotubes. An average outer diameter was 1.6 nm. In addition, as a result of Raman spectroscopic analysis of the composition containing carbon nanotubes at that time at a wavelength of 633 nm, a G/D ratio was 75. A combustion peak temperature was 676° C.

(Oxidation Treatment of Carbon Nanotubes)

Then, 80 mg of the composition containing double-walled carbon nanotubes from which the catalyst had been removed by heating in the muffle furnace was added to 27 mL of concentrated nitric acid (first class Assay 60 to 61% manufactured by Wako Pure Chemical Industries, Ltd.), and the mixture was heated while it was stirred in an oil bath at 130° C. for 5 hours. After completion of heating and stirring, a nitric acid solution containing carbon nanotubes was filtered, and washed with distilled water, and the composition containing carbon nanotubes in the wet state containing water was stored. At that time, a weight of the whole composition containing carbon nanotubes in the wet state containing water was 1266.4 mg and, when 377.1 mg of a part was taken out, and dried at 120° C. overnight, 17.0 mg of carbon nanotubes in the dry state were obtained. Therefore, a carbon nanotube concentration of the whole composition containing carbon nanotubes in the wet state containing water after nitration treatment was 4.5% by weight, and a yield of nitric acid treatment was 71%. An aggregate of carbon nanotubes produced as described above was measured using XPS. As a result of surface composition (atomic %) analysis, C was 94.4%, N was 0.2%, and O was 5.1%. Therefore, a ratio of an oxygen atom relative to a carbon atom in carbon nanotubes was 5.4% (atomic %). XPS was measured under the conditions of excitation X-ray: Monochromatic Al $K_{1,2}$ ray, X-ray diameter: 1000 μm, photoelectron escape angle: 90° (inclination of a detector relative to a sample surface). The presence of a C—O group and a C═O group was determined from Binding Energy (eV) of O1s. In addition, when the thus obtained composition containing carbon nanotubes was observed via high resolution transmission electron microscopy, carbon nanotubes were constructed of a clean graphite layer, and carbon nanotubes having the layer number of 2 were observed. In addition, of a total number (100) of observed carbon nanotubes, single-walled carbon nanotubes occupied 1, and double-walled carbon nanotubes occupied 85. The remaining was 14 of triple-walled carbon nanotubes. An average outer diameter was 1.9 nm. In addition, as a result of Raman spectroscopic analysis of the composition containing carbon nanotubes at that time at a wavelength of 633 nm, a G/D ratio was 40. A combustion peak temperature was 720° C.

Reference Example 5

Production of Carbon Nanotubes

Using the catalyst prepared in Reference Example 4, carbon nanotubes were synthesized. A solid catalyst (132 g) was taken, and introduced on the quartz sintering plate at a central plate of the reactor arranged in a perpendicular direction, thereby, a catalyst layer was formed. A nitrogen gas was supplied from a reactor bottom to a reactor upper part direction at 16.5 L/min while a catalyst body layer was heated until a temperature inside the reactor became about 860° C., and was flown so as to pass through the catalyst body layer. Thereafter, while a nitrogen gas was supplied, further, a methane gas was introduced for 60 minutes at 0.78 L/min, and was flown so as to pass through the catalyst body layer, to perform a reaction. Introduction of the methane gas was stopped, and a quartz reaction tube was cooled to room temperature while a nitrogen gas was flown at 16.5 L/min, to obtain a composition containing carbon nanotubes with a catalyst.

The composition containing carbon nanotubes with a catalyst shown above was heat-treated in the muffle furnace as in Reference Example 4 and, then, treated with hydrochloric acid in order to remove a catalyst.

Then, the above-obtained carbon nanotubes were set in a vertical reaction apparatus of FIG. 13, and heated at 550° C. for 3 hours while the air was flown. Thereafter, oxidation treatment with concentrated nitric acid was performed as in Reference Example 4, and the composition containing carbon nanotubes was stored in the wet state containing water. When this composition containing carbon nanotubes was observed via high resolution transmission electron microscopy, an average outer diameter was 1.8 nm. In addition, a ratio of double-walled carbon nanotubes was 87%, a Raman G/D ratio measured at a wavelength of 633 nm was 60, and a combustion peak temperature was 753° C.

Reference Example 6

Catalyst Preparation

In 6.2 kg of ion-exchanged water was dissolved 24.6 g of iron (III) citrate ammonium (manufactured by Wako Pure Chemical Industries, Ltd.). To this solution was added 1000 g of magnesium oxide (MJ-30 manufactured by Iwatani Chemical Industry, Co., Ltd.), the mixture was vigorously stirring-treated with a stirrer for 60 minutes, and the suspension was introduced into a 10 L autoclave container. At that time, as a washing liquid, 0.5 kg of ion-exchanged water was used. In the closed state, the container was heated to 160° C., and retained for 6 hours. Thereafter, the autoclave container was allowed to cool, a slurry-like cloudy substance was taken out from the container, excessive water was filtered by suction filtration, and a small amount of water contained in the filtration product was heated to dry in a dryer at 120° C. While the resulting solid matter was granulated with a mortar on a sieve, a particle diameter in the range of 20 to 32 mesh was recovered. The aforementioned granular catalyst body was introduced into an electric furnace, and heated at 600° C. for 3 hours under the atmosphere. A bulk density was 0.32 g/mL. In addition, when the filtrate was analyzed with an energy dispersive X-ray analysis apparatus (EDX), iron was not detected. From this, it was confirmed that an all amount of added iron (III) citrate ammonium was supported by magnesium oxide. Further, from results of EDX analysis of a catalyst body, a content of iron contained in the catalyst body was 0.39 wt %.
(Production of Carbon Nanotubes)

Using the aforementioned catalyst, a composition containing carbon nanotubes with a catalyst was obtained as in Reference Example 5. Using 115 g of this composition containing carbon nanotubes with a catalyst, this was stirred in 2000 mL of 4.8 N hydrochloric acid for 1 hour, thereby, iron which is a catalyst metal and MgO which is a support thereof were dissolved. After the resulting black suspension was filtered, the filtration product was placed again into 400 mL of 4.8 N hydrochloric acid, subjected to de-MgO treatment, and filtered. This operation was repeated three times to obtain a composition containing carbon nanotubes from which the catalyst had been removed.
(Oxidation Treatment of Carbon Nanotubes)

The composition containing carbon nanotubes was added to concentrated nitric acid (first class Assay 60 to 61% manufactured by Wako Pure Chemical Industries, Ltd.) at an about 300-fold weight. Thereafter, the mixture was heated to reflux while it was stirred in an oil bath at about 140° C. for 25 hours. After heating and reflux, a nitric acid solution containing the composition containing carbon nanotubes was diluted 3-fold with ion-exchanged water, and suction-filtered. The suspension of the filtration product was washed with ion-exchanged water until neutral, and the composition containing carbon nanotubes was stored in the wet state containing water. An average outer diameter of this composition containing carbon nanotubes was 1.7 nm. In addition, a ratio of double-walled carbon nanotubes was 90%, a Raman G/D ratio measured at a wavelength of 633 nm was 79, and a combustion peak temperature was 725° C.

Example 16

Preparation of Carbon Nanotube Dispersion

Oxidation-treated carbon nanotubes in the wet state containing water obtained in Reference Example 4 at 15 mg in terms of the dried state, and 1.5 g of an aqueous solution of 1 wt % carboxymethylcellulose sodium (90 kDa manufactured by Sigma corporation, 50 to 200 cps) were weighed in a 20 mL container, and ion-exchanged water was added to 10 g. Using nitric acid, a pH was adjusted to 4.0, and this was dispersing-treated at an output of an ultrasound homogenizer of 20 W for 20 minutes under-cooling to prepare a carbon nanotube liquid. During dispersing, a liquid temperature was adjusted to 10° C. or lower. The resulting liquid was centrifuged with a high speed centrifuge at 10000 G for 15 minutes to obtain 9 mL of the supernatant. The remaining liquid at that time was filtered using a filter having a pore diameter of 1 μm and, thereafter, the filtration product obtained by sufficient washing was dried in a dryer at 120° C. When a weight was measured, it was found to be 2.8 mg. Therefore, it was seen that 12.2 mg (1.36 mg/mL) of carbon nanotubes were dispersed in the supernatant. The dispersion was diluted 50-fold with water, and an average particle diameter was measured using a particle size distribution measuring apparatus (Otsuka Electronics Co., Ltd. ELS-Z2). Thereupon, a refractive index and a viscosity of water were inputted in advance, and measurement was performed three times at a set temperature of 25° C. Analysis by a cumulant method was performed, and an average particle diameter of resulting three times measurements was 560 nm.

When the dispersion (5 g) was dried at room temperature in a container made of polypropylene having a 50 mmφ circular bottom, and a membrane was formed, a surface resistance value of the membrane was 1.6Ω/□ (3 cm$^2$), and a thickness of the membrane was measured three times to obtain an average of 10 μm and, therefore, a volume resistivity was $1.6 \times 10^{-3}$ Ω·cm.

Then, the dispersion was diluted 100-fold, 10 μl was added dropwise on a mica substrate, and spin coating was performed at 3000 rpm for 1 minute. By observing this with an atomic force microscope (SPM-9600 manufactured by Shimadzu Corporation), a length of carbon nanotubes was measured. Thereupon, in order to measure a length of only isolated and dispersed carbon nanotubes, about 1 nm was selected by a height profile in advance, and a length thereof was measured. When lengths of 100 isolated and dispersed carbon nanotubes were measured like this, an average length was 1.1 μm.
(Carbon Nanotube Electrically Conductive Composite)

The above-obtained carbon nanotube dispersion of the supernatant after centrifugation was diluted 1.5-fold using ion-exchanged water and a small amount of ethanol, and the diluted dispersion was coated on a polyethylene terephthalate (PET) film (manufactured by Toray Industries, Inc., 188 μm, light transmittance 90.2%, 15 cm×10 cm) having a polyester resin surface resin layer (dry thickness 140 nm) using a bar coater (No. 5, coating thickness 7.5 μm, carbon nanotube coating amount 6.8 mg/m$^2$), air-dried, rinsed with distilled water and, thereafter, dried in a dryer at 120° C. for 2 minutes to immobilize the carbon nanotubes. A surface resistance value of the resulting coated film was $4.81 \times 10^2$ Ω/□, and a light transmittance was 82.6% (light transmittance of electrically conductive composite at 550 nm (82.6%)/light transmittance of substrate at 550 nm (90.2%)=92%), and high electrical conductivity and high transparency were exhibited.

Example 17

According to the same manner as that of Example 16 except that carboxymethylcellulose sodium as a dispersant was used at a 3-fold amount relative to a weight of carbon nanotubes in Example 16, Example 17 was implemented.

Example 18

According to the same manner as that of Example 17 except that ammonium polystyrenesulfonate (Aldrich 561258) was used as a dispersant at a weight which is 3-fold a weight of carbon nanotubes, and adjustment of a pH with nitric acid was not performed in Example 17, Example 18 was implemented. Upon coating in preparation of an electrically conductive composite, ethanol was not used.

Example 19

According to the same manner as that of Example 18 except that a dispersing time was 60 minutes in Example 18, Example 19 was implemented.

Reference Example 7

According to the same manner as that of Example 17 except that single-walled carbon nanotubes (average outer diameter 2 nm) manufactured by Nanotechport Co., Ltd. were used in Example 17, Reference Example 7 was implemented. However, since a concentration of the dispersion was dilute, a recoating was performed plural times until a light transmittance at 550 nm became around 80%.

Reference Example 8

According to the same manner as that of Example 17 except that multi-walled carbon nanotubes (average outer diameter 10 nm) manufactured by Nanocyl S.A. were used in Example 17, Reference Example 8 was implemented. However, since a concentration of the dispersion was dilute, a recoating was performed plural times until a light transmittance at 550 nm became around 80%.

Reference Example 9

A powder (10 mg) obtained by once drying oxidation-treated carbon nanotubes in the wet state containing water obtained in Reference Example 4, and 100 mg of an aqueous solution of ammonium polystyrenesulfonate (Aldrich 561258, 30 wt % aqueous solution) were weighed in a 20 mL container, and ion-exchanged water was added to 10 g. Using an ultrasound homogenizer, dispersing treatment was performed at an output of 25 W for 20 minutes under ice-cooling to prepare a carbon nanotube liquid. During dispersing, a liquid temperature was adjusted to 10° C. or lower. The resulting liquid was centrifuged with a high speed centrifuge at 10000 G for 15 minutes to obtain 9 mL of the supernatant. The remaining liquid at that time was filtered using a filter having a pore diameter of 1 μm and, thereafter, the filtration product obtained by sufficient washing was dried in a dryer at 120° C. When a weight was measured, it was found to be 6.0 mg. Therefore, it was seen that 9.0 mg (1.00 mg/mL) of carbon nanotubes were dispersed in the supernatant. The dispersion was diluted 50-fold with water, and an average particle diameter was measured using a particle size distribution measuring apparatus (Otsuka Electronics, Co., Ltd. ELS-Z2). Thereupon, a refractive index and a viscosity of water were inputted in advance, and measurement was performed three times at a set temperature of 25° C. Analysis by a cumulant method was performed, and an average particle diameter of the resulting three times measurements was 162 nm. Operation thereafter was performed as in Example 18.

Results of Examples 16 to 19 and Reference Examples 7 to 9 are summarized in Table 1.

TABLE 1

| | Average diameter (nm) Average diameter (nm) | Combustion peak temperature (° C.) | Dispersant | Dispersant weight/ carbon nanotube weight | Dispersing time (min) | Average particle diameter (nm) | Dispersion concentration (mg/ml) | Volume resistance (Ω · cm) | Light transmittance at 550 nm of electrically conductive composite (%) | Surface resistance value of electrically conductive composite (Ω/□) |
|---|---|---|---|---|---|---|---|---|---|---|
| Example 16 | 1.6 | 720 | Carboxymethylcellulose sodium | 1 | 20 | 560 | 1.36 | $1.6 \times 10^{-3}$ | 82.6 | 481 |
| Example 17 | 1.6 | 720 | Carboxymethylcellulose sodium | 3 | 20 | 372 | 1.32 | $2.5 \times 10^{-3}$ | 83.2 | 406 |
| Example 18 | 1.6 | 720 | Ammonium polystyrenesulfonate | 3 | 20 | 252 | 1.31 | $8.5 \times 10^{-3}$ | 82.9 | 426 |
| Example 19 | 1.6 | 720 | Ammonium polystyrenesulfonate | 3 | 60 | 210 | 1.40 | $5.0 \times 10^{-3}$ | 82.8 | 424 |
| Reference Example 7 | 2 | 564 | Carboxymethylcellulose sodium | 3 | 20 | 159 | 0.22 | $3.2 \times 10^{-2}$ | 81 | 18600 |
| Reference Example 8 | 10 | 622 | Carboxymethylcellulose sodium | 3 | 20 | 480 | 0.41 | $6.0 \times 10^{-1}$ | 80.8 | 32500 |
| Reference Example 9 | 1.6 | 720 | Ammonium polystyrenesulfonate | 3 | 20 | 162 | 1.00 | $1.7 \times 10^{-2}$ | 80.1 | 1050 |

Examples 20, 21 and Reference Example 10

Figure 14:
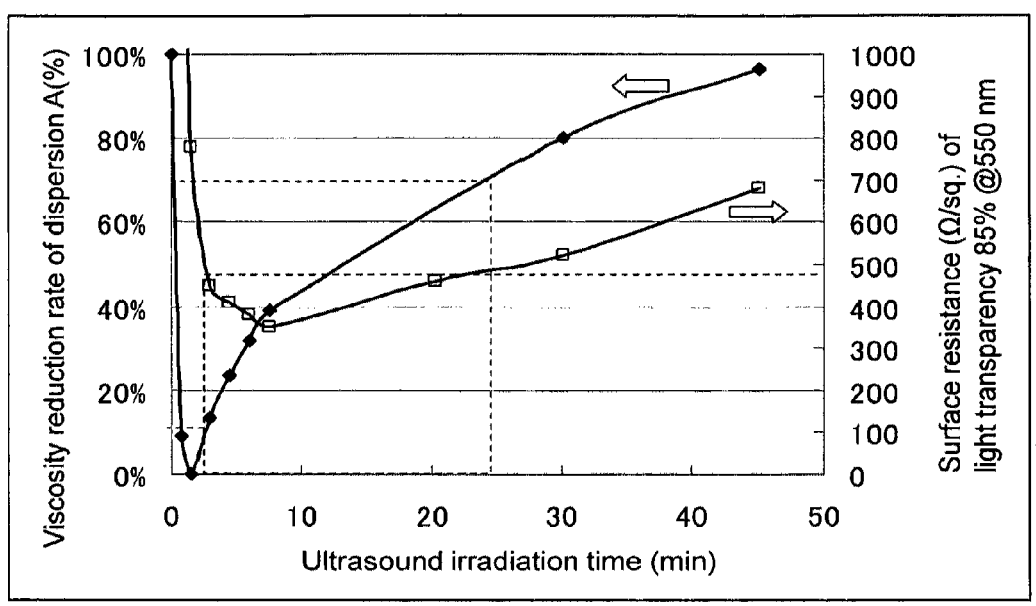
FIG. 14 shows a graph plotting the relationship of a rate of reduction in a viscosity, and a surface resistance value, relative to an ultrasound dispersing time, as measured in Example 20, Example 21, and Reference Example 10.

According to the same manner as that of Example 17 except that carbon nanotubes obtained in Reference Example 5 were used as carbon nanotubes, and a dispersing time varied in the range of from 1 minute to 45 minutes, a carbon nanotube dispersion was obtained. Measurement of a viscosity of a dispersion at each dispersing time at that time was performed as follows. In a cone-plate system rotation viscometer (RE-80L manufactured by Toki Sangyo Co., Ltd.) placed 1 ml of the dispersion, each shear rate and each shear stress when a rotation number was changed to 10 rpm, 20 rpm, 50 rpm, 20 rpm and 10 rpm were measured, and a gradient when a root of a shear stress relative to a root of a shear rate was plotted, that is, a viscosity was calculated. As a result, it was seen that a viscosity shows a maximum at a dispersing time of 2 minutes. Then, letting a viscosity of a composition of a dispersion from which carbon nanotubes have been removed (only a dispersing medium and a dispersant) to be $\eta 0$, letting a viscosity of a dispersion at 2 minutes dispersing at which a viscosity becomes a maximum to be $\eta 1$, and letting a viscosity at x minutes dispersing to be $\eta x$, a viscosity decrease rate:
A (%)=$(\eta 1-\eta x)/(\eta 1-\eta 0) \times 100$ was plotted against a dispersing time x minutes, and the result was as shown in FIG. 14. Further, results of measurement of a surface resistance value of a coated film when these dispersions were coated on a substrate so that a light transmittance at 550 nm became 85% as in Example 16 are also shown in FIG. 14. From this, it is seen that transparent electrically conductivity property of a dispersion having a highest viscosity of the dispersion is bad and, when a viscosity decrease rate became 10% to 70%, a dispersion exhibiting excellent transparence electrical conductivity property is obtained. In addition, an average particle diameter and an average length by AFM measurement of the dispersion at a dispersing time 7.5 minutes (Example 20), 20 minutes (Example 21), and 45 minutes (Reference Example 10) were as in Table 2. A viscosity decrease rate at a dispersing time 7.5 minutes was 39%, and a surface resistance value at a light transmittance 85% of an electrically conductive composite obtained by coating this dispersion was 350Ω/□ (light transmittance at 550 nm of electrically conductive composite (85%)/light transmittance at 550 nm of substrate (90.2%)=94.2%), showing high electrical conductivity. On the other hand, it was seen that by adopting a dispersing time of 45 minutes, an average particle diameter was small as 185 nm, and a surface resistance value at a light transmittance of 85% was 680Ω/□, being deteriorated as compared with other dispersing time. In addition, when a viscosity decrease rate A of the dispersion obtained in Example 17 was measured similarly, A was 70%.

TABLE 2

| | Dispersing Time min | Average particle diameter nm | Average length μm | Viscosity decrease rate % | Surface resistance value at light transmittance 85% Ω/□ |
|---|---|---|---|---|---|
| Example 20 | 7.5 | 549 | 1.8 | 39 | 350 |
| Example 21 | 20 | 325 | 1.1 | 63 | 460 |
| Reference Example 10 | 45 | 185 | 0.8 | 96 | 680 |

Example 22

According to the same manner as that of Example 16 except that carbon nanotubes obtained in Reference Example 6 were used as carbon nanotubes, carboxymethylcellulose sodium was used as a dispersant at an amount which is 6-fold a weight of carbon nanotubes, and a dispersing time was 7.5 minutes, a carbon nanotube dispersion was obtained. An average particle diameter of this dispersion was 1082 μm, and a viscosity decrease rate was 23%. A light transmittance at 550 nm of a film obtained by coating this dispersion was 85.2%, and a surface resistance value was 194Ω/□, high electrical conductivity and high transparency were exhibited.

DESCRIPTION OF REFERENCE SIGNS

401 Electric furnace
402 Quartz sintering plate
403 Reactor
404 Catalyst body layer
405 Thermometer
406 Gas discharge tube
407 Mass flow controller
408 Mixed gas introducing tube
A: Hydrocarbon
B: Inert gas
C: Before burning
D: After burning
E: After nitric acid treatment
601 Heater
602 Quartz sintering plate
603 Reactor
604 Layer of composition containing carbon nanotubes
605 Thermometer
606 Gas discharge line
607 Mass flow controller
608 Gas supply line
←: Direction of gas flow
F: Air
G: Nitrogen
100 Reactor
101 Quartz sintering plate
102 Closed-type catalyst supplying machine
103 Catalyst placement line
104 Raw material gas supply line
105 Gas discharge line
106 Heater
107 Inspection opening
108 Catalyst

The invention claimed is:
1. A composition containing carbon nanotubes which meets all of the following conditions (1) to (4);
   (1) when observed via transmission electron microscopy, 50 or more of 100 carbon nanotubes are double-walled carbon nanotubes;
   (2) the carbon nanotubes have an average outer diameter in the range of 1.0 to 3.0 nm;
   (3) by thermogravimetric analysis under atmosphere at a temperature increase rate of 10° C./minute, a high temperature combustion peak is at 700 to 850° C., and the relationship between low temperature weight loss (TG (L)) and high temperature weight loss (TG(H)) is TG(H)/(TG(L)+TG(H))≥0.75; and
   (4) the composition containing carbon nanotubes has a volume resistance value of $1.0 \times 10^{-2}$ Ω·cm or less and $1.0 \times 10-4$ Ω·cm or more.
2. The composition containing carbon nanotubes according to claim 1, wherein a ratio (G/D ratio) of a height of the G band and a height of the D band by Raman spectroscopic analysis at a wavelength of 633 nm is 30 or more.

* * * * *